United States Patent [19]

Risberg et al.

[11] Patent Number: 5,339,392
[45] Date of Patent: Aug. 16, 1994

[54] APPARATUS AND METHOD FOR CREATION OF A USER DEFINABLE VIDEO DISPLAYED DOCUMENT SHOWING CHANGES IN REAL TIME DATA

[76] Inventors: Jeffrey S. Risberg, 3249 Morris Dr., Palo Alto, Calif. 94303; Marion D. Skeen, 3826 Magnolia Dr., Palo Alto, Calif. 94306

[21] Appl. No.: 636,044

[22] Filed: Dec. 28, 1990

Related U.S. Application Data

[63] Continuation-in-part of Ser. No. 632,551, Dec. 21, 1990, which is a continuation-in-part of Ser. No. 601,117, Oct. 22, 1990, Pat. No. 5,257,369, which is a continuation-in-part of Ser. No. 386,584, Jul. 27, 1989, Pat. No. 5,187,787.

[51] Int. Cl.⁵ .................... G06F 15/62; G06F 15/16
[52] U.S. Cl. ............................ 395/161; 395/155; 364/408
[58] Field of Search .................... 364/144–149, 364/155, 161, 408, 411, 412, 419; 358/84

[56] References Cited

U.S. PATENT DOCUMENTS

| | | | |
|---|---|---|---|
| 4,486,853 | 12/1984 | Parsons | 364/408 X |
| 4,642,790 | 2/1987 | Minshull et al. | 364/900 |
| 4,750,135 | 6/1988 | Boilen | 364/514 |
| 4,845,645 | 7/1989 | Matin et al. | 364/521 |
| 4,868,866 | 9/1989 | Williams, Jr. | 364/408 X |
| 4,901,221 | 2/1990 | Kodosky et al. | 364/200 |
| 4,914,568 | 4/1990 | Kodosky et al. | 364/200 |
| 4,914,587 | 4/1990 | Clouse | 364/408 |
| 4,943,866 | 7/1990 | Barker et al. | 358/335 |
| 5,058,185 | 10/1991 | Morris et al. | 382/41 |
| 5,126,936 | 6/1992 | Champion et al. | 364/408 |

FOREIGN PATENT DOCUMENTS 2161003A 1/1986 Fed. Rep. of Germany .......... G06F 15/16

OTHER PUBLICATIONS

Advertising Brochure: "LabVIEW 2, The Complete Instrumentation Software System", Copyright 1990, National Instruments Corp.

Graphics interfaces make knobs and switches obsolete, T. Williams, Computer Design, vol. 29, No. 15, Aug. 1, 1990, Tulsa, Okla., U.S. pp. 78–94.

(List continued on next page.)

Primary Examiner—Heather R. Herndon
Attorney, Agent, or Firm—Ron Fish

[57] ABSTRACT

A software program providing a facility for a user to compose a custom active document using tools provided by the program. The active document can be comprised of one or more sheets each of which is composed in a custom manner by the user and each of which can show real time data and the changes therein generated by any complex system. The user can select which real time data is to be displayed, where it is to be displayed and in what format and style it is to be displayed. The user can control the "look" of the active document through full control of the fonts, colors, pen etc. The user may also define alarm limits against which real time data updates are compared as well as scripts of commands to be performed in case an alarm limit is exceeded. Scripts of commands to be performed written by the user may also be invoked from a menu option. The tools provided for a financial analysis embodiment of the invention allow the user to layout each sheet of the active document with: quotes of prices, volume etc. on various financial instruments such as stocks, bonds, etc., tickers showing trade data, graphs over time of various values or superimposed graphs of changes over time of several real time data values, bar graphs of some aspect of a set of financial instruments, segments defined by the user of pages selected by the user of page-based financial services like telerate, and groups of real time data. "Buttons" can be programmed to perform any user defined script of actions. Metadata and style maps are used to offload some of the work of specifying the format of the displayed objects from the user to the machine itself.

46 Claims, 35 Drawing Sheets

OTHER PUBLICATIONS

Knowledge-Based System for Financial Applications, D. Leinweber, IEEE Expert, vol. 3, No. 3, Fall 1988 New York, N.Y., US pp. 18–31.

The Electronic Arsenal of Program Traders, G. Christopoulos, Wall Street Computer Review, vol. 4, No. 2, Nov. 1986, US pp. 50–56.

Software Stockpickers, M. Asner, Canadian Business, vol. 57, No. 9, Sep. 1984, CA pp. 138–142.

All About Buttons, D. Goodman, The Complete Hypercard Handbook, 1988, New York, N.Y., US pp. 161–183.

User-Tailorable Systems: Pressing the Issues with Buttons, A. Maclean et al, Human Factors in Computing Systems, Proceedings of CHI'90, Apr. 1990, pp. 175–182.

Comprehensive Support for Graphical, Highly Interactive User Interfaces, B. A. Myers et al, Garnet, Computer, vol. 23, No. 11, Nov. 1990, Los Alamitos, Calif., US pp. 71–85.

Effective Application Development for Presentation Manager Programs, S. M. Franklin & A. M. Peters, IBM System Journal, vol. 29, No. 1, 1990, Armonk, N.Y., US pp. 44–58.

A General Methodology for Data Conversion and Restructuring, N.Y. Lum, et al, IBM Journal of research and development, vol. 20, No, 5, Sep. 1976, pp. 483–497.

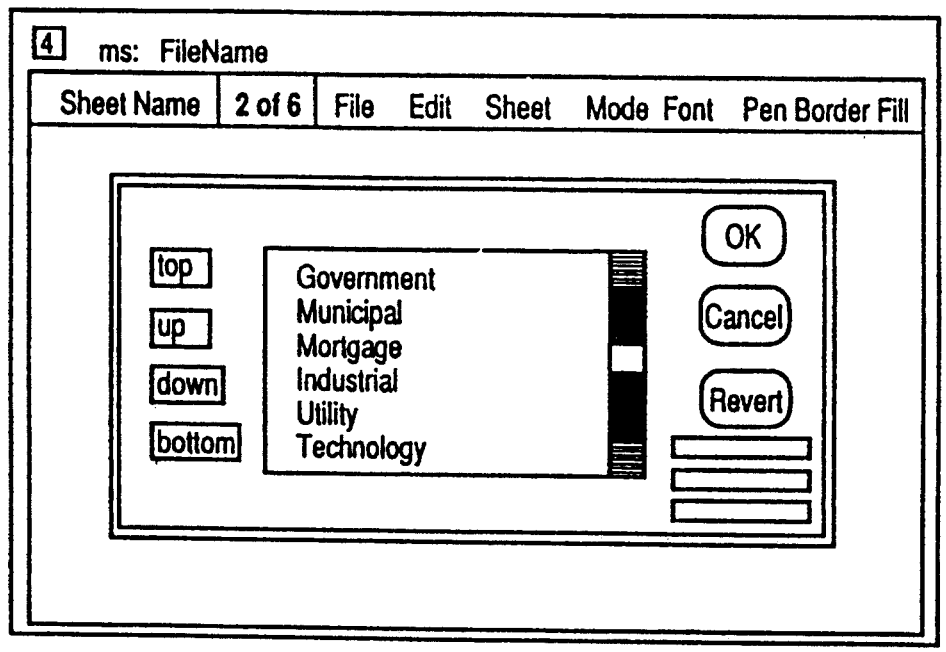
FIG. 14
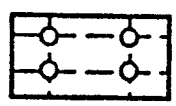
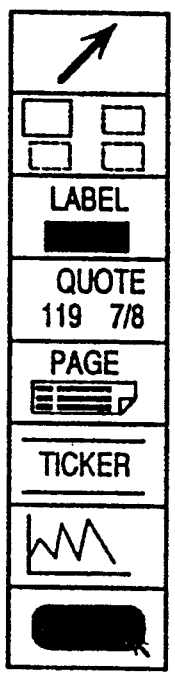
FIG. 15

EXAMPLE FORM CLASS DEFINITIONS

PLAYER_NAME: CLASS 1000
    RATING: FLOATING_POINT CLASS 11
    AGE: INTEGER CLASS 12
    LAST_NAME: STRING_20_ASCII CLASS 10
    FIRST_NAME: STRING_20_ASCII CLASS 10

FIG. 22

PLAYER_ADDRESS: CLASS 1001
    STREET: STRING_20_ASCII CLASS 10
    CITY:    STRING_20_ASCII CLASS 10
    STATE:  STRING_20_ASCII CLASS 10

FIG. 23

TOURNAMENT_ENTRY: CLASS 1002
TOURNAMENT_NAME: STRING_20_ASCII CLASS 10
PLAYER: PLAYER_NAME CLASS 1001
ADDRESS: PLAYER_ADDRESS CLASS 1001

FIG. 24

STRING_20_ASCII: CLASS 10
    STRING_20 ASCII
INTEGER: CLASS 12
    INTEGER_3
FLOATING_POINT: CLASS 11
    FLOATING_POINT_1/1

FIG. 25

INSTANCE OF FORM OF CLASS TOURNAMENT_ENTRY
CLASS 1002 AS STORED IN MEMORY

238 ~ [1002]  [3] ~ 240
242 ~ [10] [U.S. OPEN] ~ 248
244 ~ [1000] [4] ~ 250
252 ~ [11] [3.5] ~ 260
254 ~ [12] [40] ~ 262
256 ~ [10] [BLACKETT] ~ 264
258 ~ [10] [BUZZ] ~ 266
246 ~ [1001] [3] ~ 268
270 ~ [10] [100 UNIVERSITY] ~ 276
272 ~ [10] [PALO ALTO] ~ 278
274 ~ [10] [CALIFORNIA] ~ 280

FORMAT OPERATION

DEC TO ETHERNET™

| FROM | TO |
|---|---|
| 11 | 15 |
| 12 | 22 |
| 10 | 25 |
| ⋮ | ⋮ |

FIG. 29

ETHERNET™ TO IBM

| FROM | TO |
|---|---|
| 15 | 31 |
| 22 | 33 |
| 25 | 42 |
| ⋮ | ⋮ |

FIG. 30

GENERAL CONVERSION PROCEDURES TABLE

| FROM | TO | CONVERSION PROGRAM |
|---|---|---|
| 11 | 15 | FLOAT I _ ETHER |
| 12 | 22 | INTEGER I _ ETHER |
| 10 | 25 | ASCII _ ETHER |
| 15 | 31 | ETHER _ FLOAT 2 |
| 33 | 22 | ETHER _ INTEGER |
| 42 | 25 | ETHER _ EBCDIC |
| ⋮ | ⋮ | ⋮ |

FIG. 31

PERSON _ CLASS: CLASS 1021

LAST: STRING _ 20 ASCII

FIRST: STRING _ 20 ASCII

CLASS DEFINITION

CLASS DESCRIPTOR STORED
IN RAM AS A FORM

APPARATUS AND METHOD FOR CREATION OF A USER DEFINABLE VIDEO DISPLAYED DOCUMENT SHOWING CHANGES IN REAL TIME DATA

This is a continuation-in-part application of a prior co-pending U.S. patent application entitled "APPARATUS AND METHOD FOR PROVIDING DECOUPLING OF DATA EXCHANGE DETAILS AND PROVIDING HIGH PERFORMANCE COMMUNICATION BETWEEN SOFTWARE PROCESSES", Ser. No. 07/632,551, filed Dec. 21, 1990, which was a continuation-in-part of a prior co-pending U.S. patent application entitled "APPARATUS AND METHOD FOR PROVIDING DECOUPLING OF DATA EXCHANGE DETAILS AND PROVIDING HIGH PERFORMANCE COMMUNICATION BETWEEN SOFTWARE PROCESSES", Ser. No. 07/601,117, filed Oct. 22, 1990, now U.S. Pat. No. 5,257,369, which was a continuation-in-part of a prior co-pending U.S. patent application entitled "APPARATUS AND METHOD FOR PROVIDING DECOUPLING OF DATA EXCHANGE DETAILS AND PROVIDING HIGH PERFORMANCE COMMUNICATION BETWEEN SOFTWARE PROCESSES", Ser. No. 07/386,584, filed Jul. 27, 1989, now U.S. Pat. No. 5,187,787.

BACKGROUND OF THE INVENTION

The invention pertains to the field of application programs for monitoring and managing complex systems with many variables having values which vary in real time. More specifically, the invention pertains to the field of software systems which permit the user to create custom active documents with the layout, look and content defined by the user and displayed on a video display. Changes in the values of real time data which are included in the active document defined by the user are reflected immediately on the display.

In the management of complex systems such as the financial community, airplanes, semiconductor fabrication processes, etc. it is often useful for a user such as a financial trader to be able to look at only some subset of the total data available to him or her or to arrange the available data in a style which best suits the user's management and/or analysis style. In the prior art for the financial community, the Quotron product fills some portion of this need, but is inadequate in many respects. The Quotron product has a video display where three basic areas are available for customization by the user. One area is reserved for stock quotes where individual stock prices are displayed in a block. The user can customize to the extent of defining which of the many stocks for which quotes are desired. The current price of the stock is then displayed in each block or window devoted to that stock by network access of a service that provides stock quotes. Changes in the stock price are reflected on the display when they occur. Another area of the display is reserved for so-called "tickers", i.e., streams of trade data for various stocks defined by the user with the stream for all the trade data moving across a common window. A third area of the display is reserved for a market monitor display where a plurality of stock prices are displayed as a group in a single window. With the content of the group, i.e., the stock prices selected for display selected by the user.

The Quotron product is inadequate in many respects. For example, it is useful for a user to be able to be able to define a multi-sheet, completely custom document with whatever data he or she desires on each sheet arranged in whatever groupings, locations, format, color, font, pen desired with changes in real time data being reflected immediately on the display. Further, it is useful for the user to be able to set upper and/or lower alarm limits for any or all real time data displayed on any sheet and to define scripts of actions to take if the value of the real time data exceeds these limits. Further, it is useful to be able to publish any or all the data shown on any sheet of the active document on a network to which other users and/or automated processes are coupled via their respective hosts. Finally, it is useful to be able for a user to define and layout certain areas which will appear on all sheets such as one to four margins, headers or footers with text, a common "button" or a set of buttons, i.e., display objects with user programmable text labels and a "push" operation with a programmable action which occurs every time upon a "push" of the button such as by selection of the button with a mouse, touch screen, voice designation or by the keyboard etc.

SUMMARY OF THE INVENTION

An apparatus and method according to the teachings of the invention provides a computer facility (hereafter the application or program) whereby a user, using a collection of layout tools may define an active document. "Active document" as that term is used herein means a video displayed document of one or more "sheets" of the user's design which incorporates text, displays of real time data in user definable style, e.g., color, font, background, pen size etc. and format, e.g., quote, ticker, graph etc., alarms, and alarm scripts, i.e., user defined scripts of commands to be processed (much like a word processing or spreadsheet macro)when an alarm limit is exceeded. The program automatically accesses the network to which the host is connected through network interface software which establishes the proper subscriptions for the desired real time data with the appropriate information service and the server upon which this service process is running. Real time data is then passed to the program from whatever network communication process is being used and is immediately displayed in the format, style and location previously specified by the user. Although the invention will hereafter be described in the preferred embodiment for use in a financial environment such as a trading floor of a broker such as Dean Witter etc., the invention is not limited to such applications. Any complex system which generates real time data which control operators must monitor are subject to being monitored and controlled using the teachings of the invention.

The user defines each sheet of the document using a variety of tools which can be used to create display objects such as simple quotes or tickers to sophisticated graphs and tables. The user may also use the tools to create text fields such as customized help screens which help other users understand the active document which has been created. All the tools share a common set of commands which are located in an menu typically displayed at the top of each sheet. Preferably, the tools are symbolized by icons and the menu options, when invoked, cause pop-up menus to appear with other options. The menu options are used to set the symbols for stock prices to be monitored, changing display characteristics and selecting which of the multiple pages to view. The location and type of menu display and the location and type of system used to display and/or invoke the layout tools is not critical to the invention. Similarly, the type of input device used to select tools, specify locations, specify symbols or the source of real time data to display at any particular display object, or to direct the program where on a sheet to display a particular display object is not critical to the invention. A mouse, trackball, digitizer, keyboard, voice processor and map coordinate system, touchscreen, or any other present or future device may be used such as a thought processor.

The tools provide access to information from any source including other programs running on the same host 0 or somewhere else on the network, ticker plants, information services or databases. In the preferred embodiment, the program can support data feeds from Reuters Market Feed 2000/IDN, Telekurs Ticker, CMQ Telerate MarketFeed, Canquote, and Quotron. In addition, the program (known commercially as the MarketSheet TM facility or program) can accept prices extracted from paged market data feeds such as Telerate TDPF, Reuters RDCDF, FBI and RMJ. These types of data are first extracted by Page Shredder TM, another program available from the assignee of the present invention, but the particular manner in which the prices are extracted from page feeds is not critical nor is it part of the invention and the invention may be practiced without this facility or with any prior art method of extracting prices.

In the preferred embodiment, the tools available for defining an active document are as follows. A label tool allows the user to enter static text to label or annotate the active document or to create his or her own personalized help screens. A quote tools displays the value of an issue, including a user defined set of other fields pertaining to that particular company in a display style specified by the user. For example, a brief style displays only the price where a comprehensive style displays all the available fields. A ticker tool can be used as a selective or block ticker, and can show data in any display style. Upticks and Downticks can be shown in color and volume information can be included. A page fragment tool displays a region of a page-based feed such as Telerate or Reuters. Any region of the page designated by the user can be displayed from a single character to a full page. Highlighting modes are provided to highlight that has changed. A time based graph tool can be used to create graph display objects to graphically display the changes in value of a variable such as price per time. The time and price axes may be scaled to minutes or seconds, and the price value may be set to any unit such as ⅛ or 1/32 of a dollar. Above and below channel segments can be drawn on the graph. Graphs may be merged to show two issues against the same time axis. A data set graph tool can be used to create graph display objects which display the values of multiple instruments such as stocks or bonds or other subscribed values in real me such as a yield curve in a semiconductor processing application environment. Graphs may be merged to show two different sets of issues against each other to indicate market opportunities. A table tool can be used to create display objects which show position blotters, currency lookup tables, and names of commonly used pages securities. A publisher tool publishes information constructed using the invention or entered the user onto the network using the network communication process running in the environment in the invention is running. The published information can be used by other processes linked to the network or as a bulletin board for use by her traders. A button tool can be used to create splay objects that execute scripted actions when the button is "pushed", i.e., selected in any way on the splay such as by clicking on the button by a mouse. The scripted actions are entered by the user in whatever sequence is desired in a language such as the MarketScript TM command language comprised of all commands at the invention can execute. In the preferred embodiment, the scripted command sequence can also include commands to the operating system, the network communication software and other processes running on the same host or elsewhere on network. Buttons can be programmed to carry out commonly performed operations such as moving quickly to an important page or performing an operation to be carried out when an alert condition occurs. The buttons allow creation of hypertext links between different sheets, and the alert scripts can perform operations such as changing a color, flashing an object, sounding an audible alarm or executing an external program. The latter capability provides great flexibility by enabling clients to program features such as the ability to telephone a beeper service when an alert occurs. A "glossary" facility allows users to add new operations, i.e., commands, to the scripting language and customize the menus as needed.

For ease of learning the system, new users are supported by providing short and full menu sets. New users can use the short set while working with existing templates and tutorial files. After the system has been learned, the user can graduate to the full menu set.

In the preferred embodiment, the program is used in a distributed system architecture embodied in a local area network coupling workstations and personal computers such that the right amount of processing power can be dedicated to each user and application. The distributed system architecture also allows critical applications to be supported by redundant or complementary equipment such that the system is sufficiently reliable to continue to operate even if a market data feed or server should fail.

In the preferred embodiment, the program according to the teachings of the invention is ported to work with the TIB ® suite of network communication programs available from the Teknekron Software Systems in Palo Alto, Calif. The TIB ® software is described in U.S. patent applications having Ser. Nos. 386,584, filed Jul. 27, 1989 (now U.S. Pat. No. 5,187,787), 07/601,117, filed Oct. 22, 1990 (now U.S. Pat. No. 5,257,369) and Ser. No. 07/632,551, filed Dec. 21, 1990, the specifications and drawings of which are included herewith. The TIB ® software supports subject based addressing, network architecture decoupling, communication protocol decoupling, data decoupling and separation of information sources from consumers. The TIB ® software subject based addressing capability frees applications such as the program according to the teachings of the invention from the need to know exactly where on the network information of a particular type can be obtained. For example, a trader can reference "long bond yield" as the subject of a desired real time data subscription without the need to know the specific physical location on a specific page of a specific information service running on a specific server. Then, if the source of the information changes, users need not change their screens and programmers need not change their programs.

The separation of information sources and consumers allows users to add or change market data sources without changing the application that use the data. The users can also add and change applications without impact on the existing sources of information. For example, data values from fixed format pages of market data can be combined with data from elementized feeds in a real-time spreadsheet. The spreadsheet can compute a result, e.g., the theoretical value of a derivative security, and publish it on the network through the TIB ® software. The program of the invention can then graph the value in real time. None of these application programs need ever be aware of the existence or operation of the others. New application programs can be added to a firm's computing repertoire at any time, building on each other to create a total information environment.

The menu of commands allows the user to display an index of the sheets which have been defined for a particular active document file, and to select the sheet to view. The menu options also include commands to manage sheets and sheet files, and to control the appearance of the display and the objects within it. The menu also includes commands to rearrange the location of the display object windows or boxes (the term boxes will be used herein to avoid confusion with the term windows in which separate processes may be running in multitasking environment or DOS windows environments). In the preferred embodiment, the display object boxes may be layered on top of each other, and the menu includes options to change the order of the layers and move any particular box to the top of a stack. In the preferred embodiment, only one sheet is shown on the display at any particular time, but in alternative embodiments, several sheets may be shown in separate "windows" or layers on the display.

BRIEF DESCRIPTION OF THE DRAWINGS

FIG. 14 is an example of the dialog box to select the index of interest.

FIG. 15 is the tools icon menu.

FIG. 22 is an example of a form-class definition of the constructed variety.

FIG. 23 is an example of another constructed form-class definition.

FIG. 24 is an example of a constructed form -class definition containing fields that are themselves constructed forms. Hence, this is an example of nesting.

FIG. 25 is an example of three primitive form classes.

FIG. 29 is a target format-specific table for use in format operations.

FIG. 30 is another target format-specific table for use in format operations.

FIG. 31 is an example of a general conversion table for use in format operations.

DETAILED DESCRIPTION OF THE PREFERRED EMBODIMENT

Figure 1:
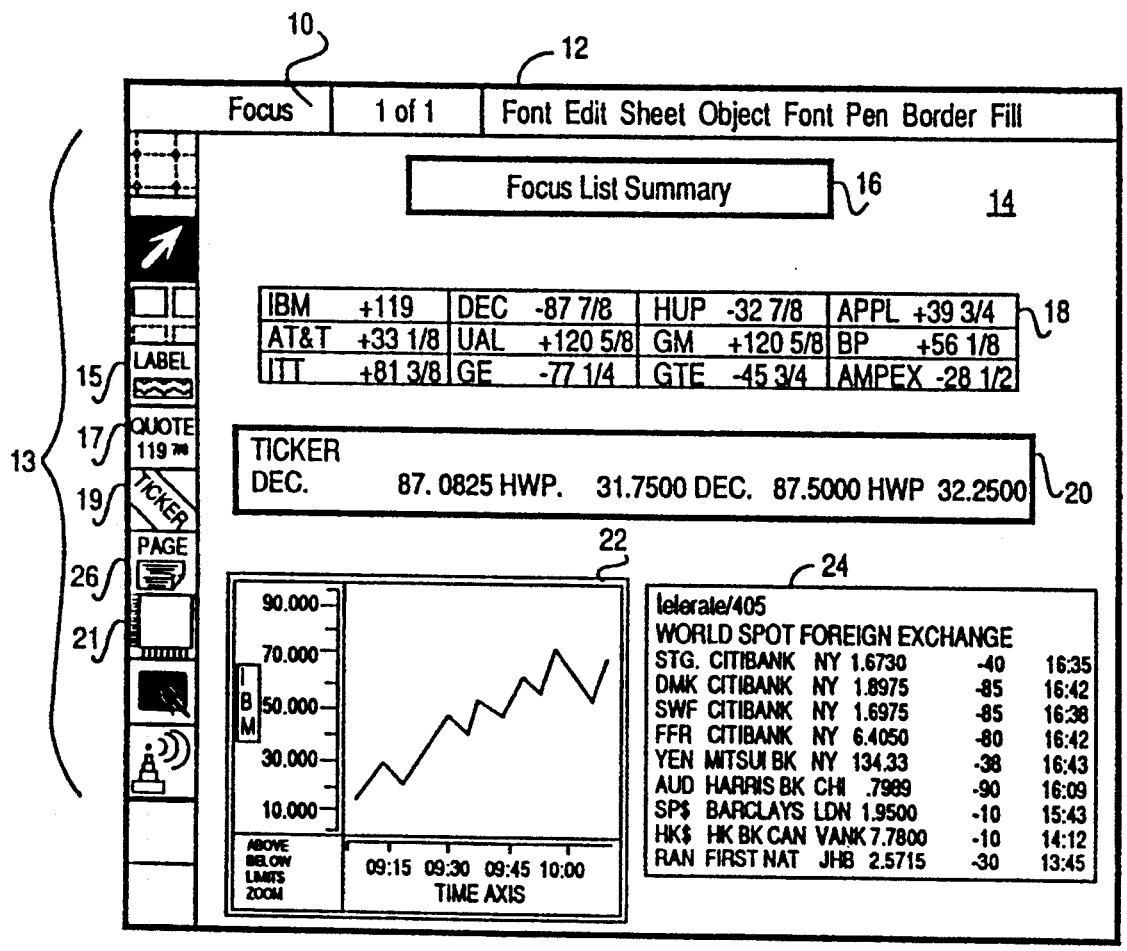
FIG. 1 is a typical sheet layout in an active document containing one or more user defined sheets constructed with a program according to the teachings of the invention.

Referring to FIG. 1, there is shown one example of a user defined sheet in an active document constructed using a program according to the teachings of the invention. At the top left corner of the sheet is the file name, in this case FOCUS, naming the file in which the active document of which the user programmed sheet of FIG. 1 is a part. A menu of commands, i.e., functions which can be invoked by the user through whatever input device is being used, is shown at 12. In the preferred embodiment, the menu choices shown at 12 each "overlie" a "pop-up" menu displaying further command choices related to the overlying command choice. Those pop-up menus will be detailed in a later figure. The menu lets the user display an index of sheets within the active document and to select the sheet to view. The menu 12 also includes options to manage sheet composition and active document files. The menu 12 also includes commands to control the appearance of the display and the display objects associated with the Active Objects programmed by the user into a sheet.

Icons representing the tools that are available to the user to define the Active Objects which are to appear on any particular sheet of an active document are shown at 13. Each tool, when invoked, allows the user to create an Active Object on the programmable portion of the display at a location specified by the user using some input device. Each tool can be used to define an instance of a particular class of Active Objects or to carry out an operation such as publish or display a grid for alignment or layout of the sheet. The general classes of Active Objects are labels, quotes, tickers, time graphs, data set graphs, page segments and buttons. The tools may also be invoked by name rather than graphically by selecting an icon representing that tool using a pointing device. Further description of the various tools will be provided below.

The user programmable display area proper is shown at 14. At the top of the display area in this example, the user has created an instance 16 of a label class Active Object with text entered by the user to define what the particular sheet being displayed is. This label Active Object was created by invoking the label tool represented by icon 15.

The program according to the teachings of the invention use objected oriented programming style. Although the preferred embodiment of a program according to the teachings of the invention has been written in C language for easier portability among machines using programming conventions to make the C language act like an object oriented programming language, it is easier to construct the program using object oriented programming languages such as C++.

The middle of the display area contains several instances of quote class Active Objects in different display formats generated by invoking the quote tool represented by icon 17. Each three, four, or five letter individual symbol in the box 18 and the number next to it represents an individual quote where the user specified the symbol based upon the stock issue he or she wanted to monitor.

The middle of the display also shows an instance 20 of a ticker class Active Object showing all trades in a specified set of issues that exceed a minimum volume set by the user. This particular criteria for display was programmed by the user using the ticker tool represented by icon 19.

At the bottom of the display is an instance 22 of a graph class of Active Object. The program allows graphing of trades, volumes, spreads, indexes or any other value. Two different types of graph tools are provided although only graph icon 21 is shown in FIG. 1. In the preferred embodiment, another graph icon is present in area 13 representing a tool to create Active Object instances of data set graphs. These types of graphs are usually bar graphs where each bar represents some real time value about a different stock issue designated by the user although in different embodiments, each bar can represent the real time value of any variable in a complex system.

An instance of a user designated portion of a standard financial page such as Telerate, page 8 has been created at 24 using the page fragment tool represented by icon 26.

"Active document" as that term is used herein means a video displayed document of one or more "sheets" of the user's design which incorporates text, displays of real time data in user definable style, e.g., color, font, background, pen size etc. and format, e.g., quote, ticker, graph etc., alarms, and alarm scripts, i.e., user defined scripts of commands to be processed (much like a word processing or spreadsheet macro) when an alarm limit is exceeded. The program automatically accesses the network to which the host is connected through network interface software which establishes the proper subscriptions for the desired real time data with the appropriate information service and the sever upon which this service process is running. Real time data is then passed to the program from whatever network communication process is being used and is immediately displayed in the format, style and location previously specified by the user. Although the invention will hereafter be described in the preferred embodiment for use in a financial environment such as a trading floor of a broker such as Dean Witter etc., the invention is not limited to such applications. Any complex system which generates real time data which control operators must monitor are subject to being monitored and controlled using the teachings of the invention.

The attributes of the Active Objects which are used to compose an active document are as follows.

A label Active Object is just a fixed character string placed in a position on a sheet entered by the user. Labels are used to identify sheets, regions on sheets, and individual monitoring Active Objects as well as in script files to generate messages when an alarm event occurs or to generate customized help screen for a particular active document. A label does not change in real time. Its attributes are: String (field) which is the text string to be displayed in the label object; and, Alignment (radio button list) which is one of three formatting options—left, center and right.

A quote object is a familiar market price quotation. Any number of quotes may be placed on a sheet. Attributes of the particular instance record for a quote Active Object determine not only what issue is quoted, but also what items of information from the total comprehensive record for a particular issue are displayed. Different types of quotes may have different formats. The attributes of a quote are:

Market Type (list)

Defines the type of information being received from the source in this quote, such as equity, option, future or shredder output. This choice is used to determine the information source, the available styles and the internal record formats.

Display Style (list)

Defines what display format is to be used for this quote. Each market type has one or more styles defined, which typically show different collections of fields from the received information. Most market types have a "brief" or "regular" style, which shows simply symbol and price information, and other styles may also be present which show more detail.

Symbol (field)

Defines the specific symbol, i.e., stock, to be used for this quote instance. The symbol may have a suffix which indicates the exchange to use. These suffixes may be translated into a longer exchange name through translations set up by the System Adminstrator. Also note that for user convenience, character entered will automatically be put into upper case (if lower case letters are needed, such as for a class or warrant, the shift key can be used).

Alter Field (command button)

Pops up a dialog box containing a list of numeric fields in records for this market type. Used to select which field to use in alert calculations. This dialog box also contains areas to enter four different scripts, which are executed under different conditions, as explained below.

Limits (2 buttons and fields)

These are used to set above and below limits for an alert. Also, the above and below limits can be activated and deactivated by clicking on the check boxes. When the value of the real time data goes above or below the limits, the object is shown in reverse video.

The choices listed in the Market Type and Style lists are defined in configuration files. Other types and styles can be set up by the System Administrator.

Quote objects are traversable, which means that the user can transverse to the quote object and enter a new symbol simply by entering it from the keyboard.

Figure 2:
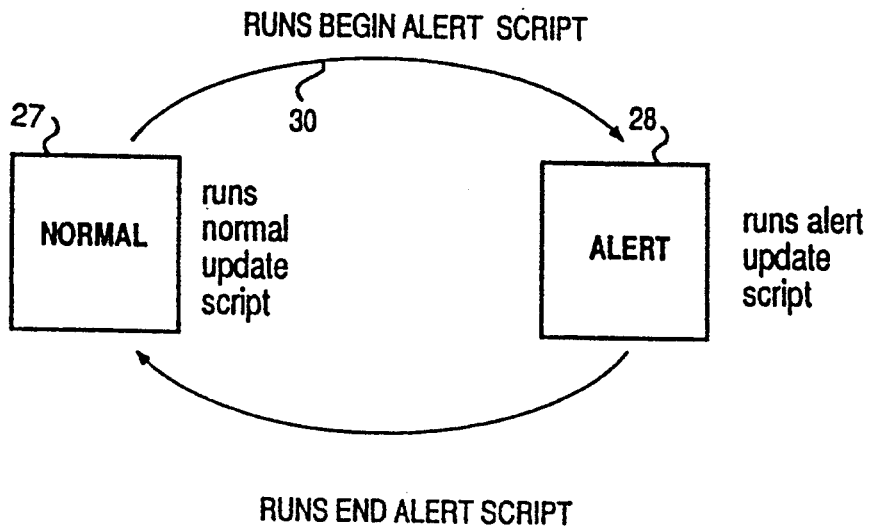
FIG. 2 is a state diagram for the normal and alert states to illustrate the operation of alert scripts.

Quotes have four different scripts which are run for different reasons with respect to alerts. FIG. 2 illustrates states behind this concept. A quote is either in the normal state 27 or the alert state 28. When a real time data update comes into a normal state quote and does not trigger an alert, the "normal update" script is run. A script is a user defined string of commands that are executed in sequence. They can be commands that the program of the invention understands, commands to the operating system or other processes operating in the environment or commands to any other process running anywhere else on the network. The script language also has a glossary facility facility whereby the user can define new commands and add them to the script language. When an update comes in which triggers an alert, the "begin alert" script 30 is run. This script takes the quote object into the alert state 28 where the "alert update" script is run. Additional updates which are in alert run will continue to run the "alert update" script. Then when an update comes in which is back in the normal range, the "end alert" script will be run, followed by the "normal update script. Thus, the four scripts provide a way of checking for changes in the state, or for staying in the same state.

The ticker tool is a continuously shifting display of trades in a specified list of issues. In addition to attributes, the dialog box for a ticker displays the current list of securities being tracked and some commands for manipulating the list. The dialog box is used to change or add to the securities on the list. The ticker attributes are:

Create (command button)

Adds a security to the list. A mouse click on a Create Button, i.e., the icon 19 in FIG. 1, will cause the Subscription Entry dialog box to appear. The subscription for the desired real time data is edited using the dialog box and is completed with a mouse click on the OK button. Another subscription can be entered with another click on the Ticker icon 19.

Delete (command button)

Deletes the currently selected item from the list.

Edit (command button)

To edit items which are already on the list, one pointing device click on the item selects it. Then a click on the Edit button, and the Subscription entry dialog box will appear.

Copy From (command button)

Replaces the current ticker list with a copy of the one from another ticker. A dialog box will pop up requesting the name of the source ticker.

Add From (command button)

Like Copy From but adds to the current ticker list instead of replacing it.

Name Sort (button)

Sorts the securities listed in the selection list by their symbol names.

Type Sort (button)

Sorts the securities listed in the selection list by their market type.

The subscription entry dialog for the ticker tool is as follows:

Market Type (list)

Used to select the Market Type for the security.

Ticker Style (list)

Used to select the display format for trades or updates to the ticker subscription instance. There are generally several styles, similar to those defined for the Quote object. The styles are generally different for the different market types.

Symbol (field)

Used to enter the security symbol. The same conventions are used as for entering the symbol into the Quote dialog box.

Volume (field)

the minimum number of shares in trades to be displayed. Note that this dialog box field will only be shown for Market Types which have an associated volume field. For instance, most equity fields have a volume but RTSS results do not.

Composite or "wild card" tickers can be created simply by entering for the symbol a period followed by the name of the exchange code. The ticker object will then show every update reported by the feed on that exchange.

The ticker object will show new data each time it receives an update from the data feed which includes either a new volume value, or a new value for one of the fields in the specified style. Thus, if the display style shows the symbol, the last price, and the trade volume, updates will appear when there is a change of the last price or the trade volume. If the display style shows the symbol and the bid and ask price, updates will appear when there is a change of the bid price, ask price, or the volume field. In this way, the ticker can handle information from source which do not have the standard field, such as output from the Shredder, an application that "shreds" data from page format into its individual elements.

The Page Fragment tool, represented in FIG. 1 by the icon 26, is a user selectable rectangular section of a page from a page-based market data service. The user constructs a page fragment interactively, using a pointing device to designate the fragment to be extracted and its destination on the sheet being composed. This can be done starting from a page-based service application, or entirely within the program of the invention. The user can then modify these and other attributes using the page fragment dialog box and the menu commands.

To make a page fragment Active Object to be displayed, the following process is performed:
1. Move the cursor to a window, i.e., a page-based display, containing the source page.
2. Position the cursor at the upper left corner of the region the user wish to select.
3. Click and hold down the left mouse button and move the cursor to the right and down to the lower right corner of the region the user wishes to select. The fragment can be as small as two characters or as large as the entire page.
4. Release the mouse button. The fragment will appear in reverse video.
5. Select the Page Fragment tool from the toolbox by clicking on icon 26 or typing the name of the tool or using any other input device to select the tool.
6. Click the mouse button where the page fragment is to be located on the sheet being composed and drag to the lower right.

To make a page fragment with no source page:
1. Select the Page Fragment tool from the toolbox.
2. Drag the region where the page fragment is to be positioned on the sheet being composed.
3. The page fragment will be blank except for the title. Use the dialog box to define the service, page and region to be displayed in the page fragment. The default region will be the full page.

The dialog box for a page fragment will display the full source page, and draw the region being extracted for the fragment. The program according to the teachings of the invention draws display objects by invoking the functions of the commercially available XWINDOWS system in the preferred embodiment although other embodiments can be ported to any other commercially available or research screen rendering library, program or toolbox. The XWINDOWS system is available from a consortium of universities and commercial vendors known to those skilled in the art. To change the region in which the page fragment is displayed, the mouse or pointing device can be used to designate the upper left corner of the new region, and then drag to the lower right corner. The dialog box can also be used to set the following attributes:

Service (field)

The name of the page-based source, such as Telerate. Click on this field to bring up a dialog box to change the service. If another page fragment is also displaying that service and page, it will be Immediately shown in full source page display. If not, the user must confirm the dialog box to request the page from the service.

Page (field)

Page Number (or name), such as 7677. Click on this field to bring up a dialog box to change the page. If another page fragment is also displaying that service and page, it will be immediately shown in full source page display. If not, the user must confirm the dialog box to request the page from the service.

Title Position (radio button list)

Used to specify that there should be no title, or that there should be a title indicating the service and page number, and the highlighting mode. The default is that there is no title, in order to pack page fragments closely together.

Page Fragments are traversable. The user can traverse to a page fragment object, and enter a new page name or number simply by typing it from the keyboard.

The Graph tool allows creation of graph Active Objects with associated display objects which track the real time variations in a variable in a complex system such as market value. The graph object is a composite of several simpler objects: a graph/time axis, a price axis, and a graph area. Each of these areas can be independently selected for changes to colors, fonts, and borders. The outermost portion is the frame for all of the graph sub-objects, and must be selected in order to perform edit operations such as move, resize, or front-/back restacking operations.

Each axis has its own attributes controlled by a separate dialog box. Because the graph object is a composite object, it may not be duplicated with the Duplicate tool.

When the user clicks and holds a mouse button anywhere inside the graph area, the value for the Price Axis is shown in the upper left hand corner of the Graph Display Area and the value for the Time Axis is shown in the upper right hand corner. This feature is useful in identifying numeric values for any point of the Graph Lines.

The Graph/Time axis dialog box allows the user to edit attributes of the overall graph as well as the attributes of the times axis. The attributes this dialog box currently supports are divided into the following categories.

SCALING ATTRIBUTES

Type (radio button list)

Selects the type of time axis. The time axis currently support two types of scales: time and ticks. The default is time.

Precision (radio button list)

When the scale type is set to time, the precision of the scale mark labels can be set to minutes or seconds. When the scale is set to ticks, precision is not adjustable.

Lock Scale (option button)

Freezes the time axis minimum and maximum values to their current settings, disabling automatic rescaling. When this option has been selected, a lock icon will be shown on the axis.

TIME AXIS LIMIT ATTRIBUTES

Maximum (field)

The upper limit of the time scale.

Minimum (field)

The lower limit of the time scale.

Step Value (field)

The increment to show when drawing hash marks and numbers on the time axis. Axis limits can be changed manually in the dialog box or can be changed using scaling commands Draw Grid Lines (option button)

If selected, the tick marks on the times axis are drawn across the graph area.

CHARACTERISTICS

Axis Position (radio button list): selects position of time axis as either above or below the graph area.

New Price Axis (command button)

Creates a new additional price axis and positions it to the right of the existing axis.

GRAPH PRICE AXIS

Each graph can one or more price axis, each corresponding to a different instrument being graphed.

NAME

Symbol Name (field)

Defines the specific symbol to be used for this price axis, such as IBM or GOLD. This may be followed by an exchange code. The same conventions used in the Quote symbol name apply here.

PRICE AXIS LIMITS

Max Value (field)

Upper limit of price scale.

Min Value (field)

Low limit of price scale.

Step Value (field)

The increment to show when drawing hash marks and numbers on the price axis. Axis limits can be changed manually in the dialog box or can be changed using scaling commands.

Draw Grid Lines (option button)

If selected, the tick marks on the time axis are drawn across the graph area.

PRICE AXIS COMMANDS

Delete Axis (command button)

Deletes the selected price axis unless it is the only price axis.

Copy Axis (command button)

Copies the selected price axis and places it on the screen to the right of the existing axes Clear Trends (command button)

Removes all trend lines related to the current price axis

Price Axis Attributes

Line Width (field)

Determines the width of the Graph Plot Line. Width of 0 is recommended for optimum repainting time Retain Count (field)

The number of data points that are kept for the given axis. The default is 150, this means that the system keeps track of least 150 "ticks". Once 151 is plotted, the first tick is dropped off.

Point Size (field)

The size of the Point drawn when a new data value is plotted.

Precision (field)

The number of decimal places to show on the Price Axis (Y-axis) has marks.

Connect Points (radio button list)

If "Yes", will draw lines between data points; If "No", will only plot data points (be sure to set Point Size to greater than 1 if lines aren't drawn).

Direction (radio button list)

Places the current Price Axis on the Left or Right hand side (default is left).

Lock Scale (option button)

Freezes the price axis minimum and maximum values to their current settings, disabling automatic rescaling. When this option has been selected, a lock icon will be shown on the axis.

GRAPH TREND LINES

Trend Lines may be drawn on a graph to indicate support and resistance levels.

CREATING TREND LINES

1. Move the cursor to the point on the Graph where the Trend Line should begin.
2. Hold the Shift Key down and click the left mouse button. This creates one trend point. The user can move the trend point before releasing the button by moving the mouse to the desired location.
3. Click the left mouse button a second time on the first trend point, hold it down, and drag the cursor to a second trend point. The user will see a temporary trend line "following" the mouse cursor as the user drags it into position.
4. Release the Mouse Button to complete the line. It will appear as a dotted line.

EDITING TREND LINES

Insert Trend Points/Segments

Press and hold the left mouse button on one of the trend points. A new trend point will be created that can be dragged to the desired location.

Move Trend Point

Press and hold the right mouse button on the trend point to be moved and drag it to the desired location.

Delete Trend Point

Hold the shift key down, and click on the trend point with the right mouse button.

Move Trend Line

Hold down the Shift and Control keys together. Press and hold the right mouse button on any trend point on the line. Then drag the trend line to the desired location.

DELETING TREND LINES

Hold down the Shift and Control keys together and click the left mouse button on and trend point on the line. All trend lines can be deleted by using the clear trends command in the Price Axis Dialog Box.

GRAPH SCALING

The dynamic graph application provides very flexible scaling functions as follows:

Settable min, max, and step values

The minimum, maximum, and step values of the axes can be set via the dialog boxes discussed in the Price Axis sections. They can also be changed via the rescaling methods described below (zooming, and moving trend lines).

Automatic Rescaling

Axes can be rescaled automatically when new data points arrive. Unless scale is fixed, the graph adjusts periodically to accommodate the current shape of the line.

Fixed Scaling

The automatic rescaling feature can be turned off by setting the lock scale attribute to true. This attribute can be set via the dialog box.

Zoom Function

The graph object provides the capability to zoom in on a rectangular section of the graph. The same action can be accomplished by setting the axis limits manually, but it is much easier to perform such an operation using the mouse. To initiate a zoom, hold down the CONTROL key, click the LEFT mouse button at one corner of the desired zooming rectangle, drag the cursor to the opposite corner of the rectangle, and then release the button. The axes will rescale such that the specified rectangular viewing region takes up the whole graph viewing region. To zoom back such that all points are visible, hold down the CONTROL key and click the RIGHT mouse button anywhere on the graph view area.

Rescaling via trend line drawing

There is a potentially useful side effect of drawing trend lines that can be utilized as a quick method for rescaling the axes to the desired values. When dragging a trend line point, the user may move the point outside of the visible graph window. If the user releases the button while the point is outside, and the appropriate axes are not "fixed," then the axes will rescale automatically to accommodate the new point within the graph area. Thus to extend the time axis further to the right, instead of changing the max value via the dialog box, the user may move a trend line point the desired distance beyond the right boundary of the graph view. When the user releases the mouse button, the time axis will extend its scaling to include the new trend line point.

GRAPH ALERTS

The graph alert facility provides a notification if a data point moves outside a region defined by two active trend lines. At any given time, at most two trend lines can be active. If two trends are active, then activating a new trend line will deactivate the last recently activated trend line of the two. Activation and deactivation of trend lines is done via an abbreviated "move" trend point operation, i.e. clicking on any point of the trend line with the right mouse button without any mouse movement between press and release. Clicking on an inactive trend line activates it while clicking on an active trend line will deactivate it. An active trend line is drawn in the color of the graph plot with which it is associated. Inactive trend lines appear in a lighter color.

If two trend lines are active, any new point that comes in through the subscription will be checked to see if it falls between the values specified within the time range of the two trend lines. An alert is triggered when a graphed value goes outside the bounds of the active trend lines.

To use the alert facility:
1. Make sure the correct price axis is highlighted for the security for which the user wishes to set an alert.
2. Create two trend lines that define upper and lower limit ranges (a "channel") for the security.
3. Activate the trend lines by clicking on any trend point with the right mouse button. An active trend line is shown as a dotted line the color of the graph plot line. An inactive trend line is shown as a lightly colored line. The right mouse button is a toggle between active and inactive.
4. If the security value goes above or below the channel formed by the two trend lines, the graph will alert. The alert is shown by the new trend point flashing as a large square.
5. The alert will continue to flash until a new trend point alerts, or if the user clicks on the alert with the left mouse button.

There are two scripts associated with graph objects, one for normal updates and one for alert updates.

BUTTON

A button is an object which the user can interact with, and will cause a script to be carried out when clicked on. For instance, the button might perform the equivalent of a Sheet Next command, or transfer the user to a specific sheet. Buttons allow the user to determine the dynamic action of the sheets, as well as their appearance. These scripts are expressed in the MarketScript TM language.

Each button is created using the button tool, and the user can use the font fill, and pen menus to specify the appearance of the button (the border menu does not operate on buttons). However, since a button carries out its operation when clicked on with the left mouse button, the user must use the middle or right mouse buttons to bring up the dialog box to set the button attributes. The "Script" entry of the button dialog box allows the user to enter the script to be carried out.

BUTTON STYLES

Style include rectangular, rounded, shadow, check box, and radio button. In most cases, the check box and radio button styles are used when there are groups of buttons. Note that for check box and radio button styles, the alignment choice does not apply.

SCRIPTING LANGUAGE

Scripts are composed of one or more actions, which are entered as a sequence. The actions can perform operations such as selection of objects, editing of selected objects, navigation to sheets, and editing of the current sheet. Note that these commands must be entered exactly as shown with respect to case. The currently supported scripting commands are:

| | |
|---|---|
| Object Selection Commands: | |
| all select | selects all objects on current sheet |
| none select | selects no objects on current sheet |
| self select | selects the object which is running the script |
| <item_name> find select | selects all items of given name |
| <class_name> class select | selects all times of given class |
| <region_bounds> region select | selects all items in region |
| Editing of Selected Items: | |
| front | restacks selected items to front |
| back | restacks selected items to back |
| hide | hides selected items |
| show | shows selected items |
| clear highlight | clear highlight of selected page fragment objects |
| <color_name> pen | sets pen color of selected items |
| <color_name> borderColor | sets border color of selected items |
| <integer> borderWidth | sets border width of selected items |
| <color_name> fill | sets fill color of selected items |
| toggle visibility | inverts hide/show of selected items |
| Move and Resize of Selected Items: | |
| <xXy> move | move of selected items to x, y |
| <dxXdy> move | relative move of selected items |
| <widthXheight> size | resizes selected items to width, height |
| <dwidthXdheight> rsize | relative resize of selected items |
| <x> alignLeft | aligns left edge of selected items to x |
| <y> alignRight | aligns right edge of selected items to x |
| <y> alignTop | aligns top edge of selected items to y |
| <y> alignBottom | aligns bottom edge of selected items to y |
| Sheet Navigation Commands: | |
| first sheet | transfer to first sheet |
| prev sheet | transfer to previous sheet |
| next sheet | transfer to next sheet |
| last sheet | transfer to last sheet |
| index sheet | active index dialog |
| <sheet_name> find sheet | transfers to next sheet with given name, wraps back to front if needed, beeps if name not found. |
| push sheet | pushes current sheet onto stack |
| pop sheet | pops entry off of sheet stack and goes to that sheet |
| Editing of Current Sheet: | |
| <color_name> background | sets sheet color background to named color |
| on gridLines | turns on drawing of gridlines |
| off gridLines | turns off drawing of gridlines |
| toggle gridLines | toggles the drawing of gridlines |
| Execution Control | |
| beep | beeps the workstation |
| <UNIX command> execute | runs UNIX command in background |
| <milliseconds> pause | pause for specified amount of time |
| Environment Control: | |
| on toolBox | shows the toolbox |
| off tollBox | hides the toolbox |
| toggle toolBox | inverts hide/show sense of toolbox |
| on gridTool | turns on grid tool |
| off gridTool | turns off grid tool |
| toggle gridTool | toggles activation of grid tool |

SCRIPTING EXAMPLES

Sheet operations are most useful when creating new traversal options on a set of sheets. The "find sheet" command is most useful to transfer to a specific sheet, and will search from the first sheet to the last to find one which matches the give name.

The object selection commands provide ways to select all objects, no objects, all of a given class, all of a given name, or all in a region. For instance, if the user created a set of Quote objects, and had some display elements of the Dow-Jones Industrials and the others display the Dow-Jones Utilities, assign the name "INDU" to all of one group, and assign the name "UTIL" to the other group.

Then use a button script of "INDU find select red fill" to turn all of the Industrials red, and "UTIL find select blue fill" to turn all of the Utilities blue under button control. Another useful example would be to use "Quote class select green fill" to change all quotes to have a green fill color.

A common use of scripts and pop-up objects is to annotate a sheet with a number of extra label objects which describe what is being monitored or graphed. Make sure that the label objects are in front of the other objects, and then give them all the name "DETAIL". Now create a button with the script "DETAIL find select show", and another with the script "DETAIL find select hide". Executing these two buttons will turn the detail on and off on your sheet.

SCRIPTING NOTES

If an item name, sheet name, command, or color name contains a space, it must be contained within quotation marks. Either single or double quotes may be used. Names containing single quotes may be contained in double quotes, and vice versa.

When setting up alert scripts for a group of Quotes, set up the scripts on the first one, and then use the Duplicate tool to make the others. The scripts will be copied into each one made.

There are roughly 80 pixels per inch on a workstation screen. All of the x, y, width, and height measures in the scripting language are in pixels.

It is common for scripts to select objects to operate on, but if scripts are run at unexpected times (such as due to Quote updates), they could change the selection status of the objects the user is trying to edit. For this reason, the selection status of the objects is saved at the start of the script execution, and is restored afterwards. Thus if a script begins with an "all select" phrase, it is not necessary to end with a "none select phrase".

Figure 3:
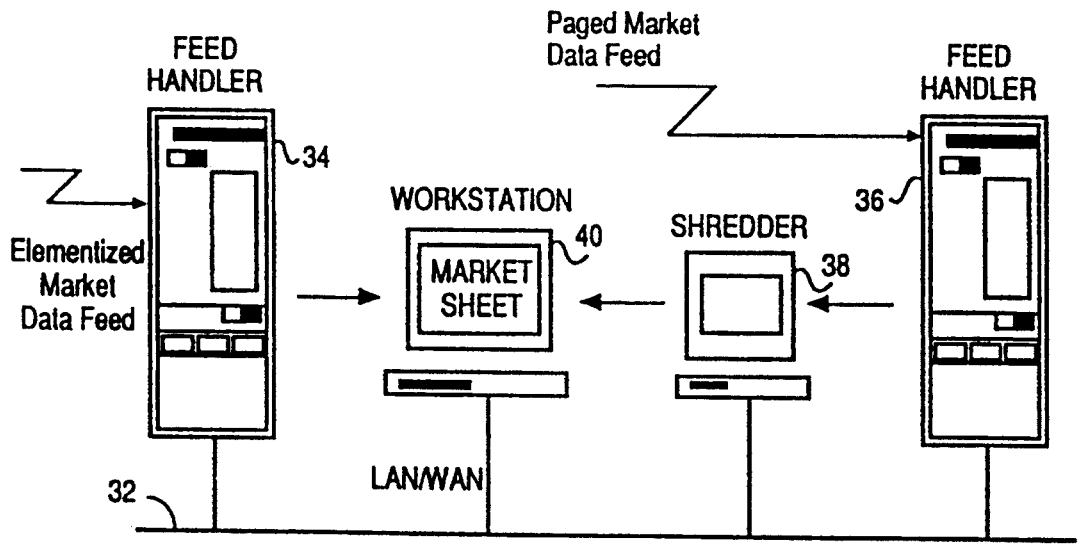
FIG. 3 is a diagram of a typical environment in which the program of the invention operates.

Referring to FIG. 3, there is shown a typical network environment in which the preferred embodiment of the invention would be employed. Elementized data feeds are received via a LAN/WAN (Local Area Network/-Wide Area Network) 32 and handled by a feed handler 34. Paged market feeds are received via the network 32 and handled by a feed handler 36. A workstation 38 running a shredder process breaks up the pages of the paged feeds into their constituent elements. A workstation 40 running a program according to the teachings of the invention is used by a user to compose an Active Document to manage financial information in real time. As the various quotes, tickers, graphs etc. are created, subscription requests for the required data are passed to the network communication software running on the workstation 40. If the TIB ® network communication software is being used, the subscription requests are filled using subject based addressing. The subscription requests result in properly formatted service request transmissions on the network 32 to the proper service and server in the proper protocol to request the desired data. The server or servers then transmit the data back to the workstation 40 where it is displayed in the Active Document defined by the user.

Figure 4:
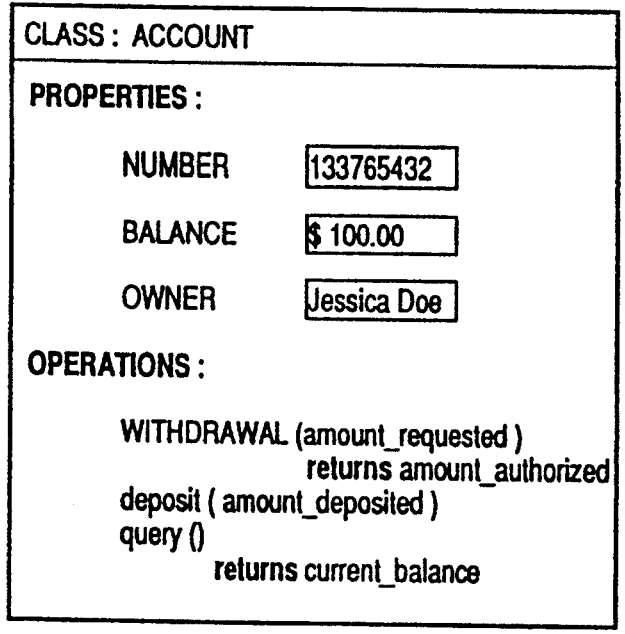
FIG. 4 is an example of an instance of an Active Object class.

Referring to FIG. 4, there is shown a typical example of an "object" as that term is used in the object oriented programming world. An object is an entity which has both properties and associated operations which can be invoked by a user to change the values of various properties of the object. In the simple example chosen, the object is an entity representing a class of objects in the form of bank accounts. The particular instance in this class is a bank account for Jessica Doe. The properties of each object in this class or the account number, the balance and the owner name. The operations that can be invoked are withdrawal, deposit and query. Each operation can be invoked by entering a command to identify the object and start the operation (typically the name of the operation) followed by the argument. The operation then uses the argument to change the properties of the object. For example, the command Doe. Deposit(100) would invoke the deposit operation and add 100 units to the balance property of the Doe bank account.

Figure 5:
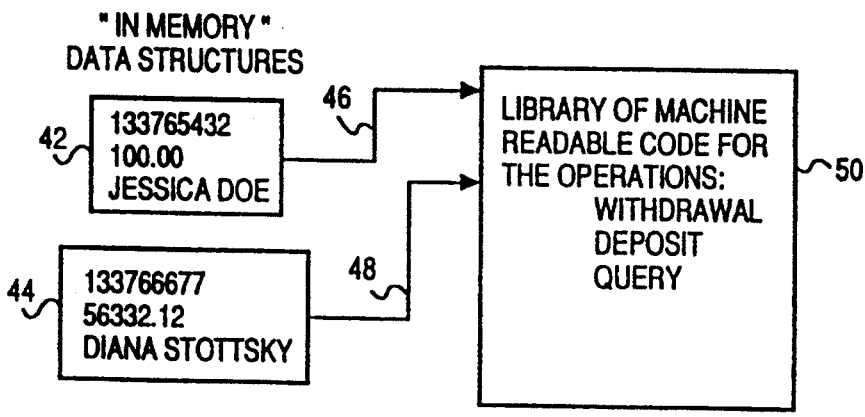
FIG. 5 illustrates how the properties of an Active Object are stored as data structures in memory, and how libraries of programs are linked to these data structures to carry out the operations associated with each instance of an Active Object.

Typically, an object is represented in memory by a record containing the values for each of the properties and a link or pointer to a library of programs which carry out the operations associated with that object. This structure is shown in FIG. 5. In FIG. 5, two data records 42 and 44 represent the values of the properties for two instance of bank account class objects. Each record has a link or pointer, 46 and 48, respectively, to a library 50 of programs which carry out the operations associated with this class of objects.

Figure 6:
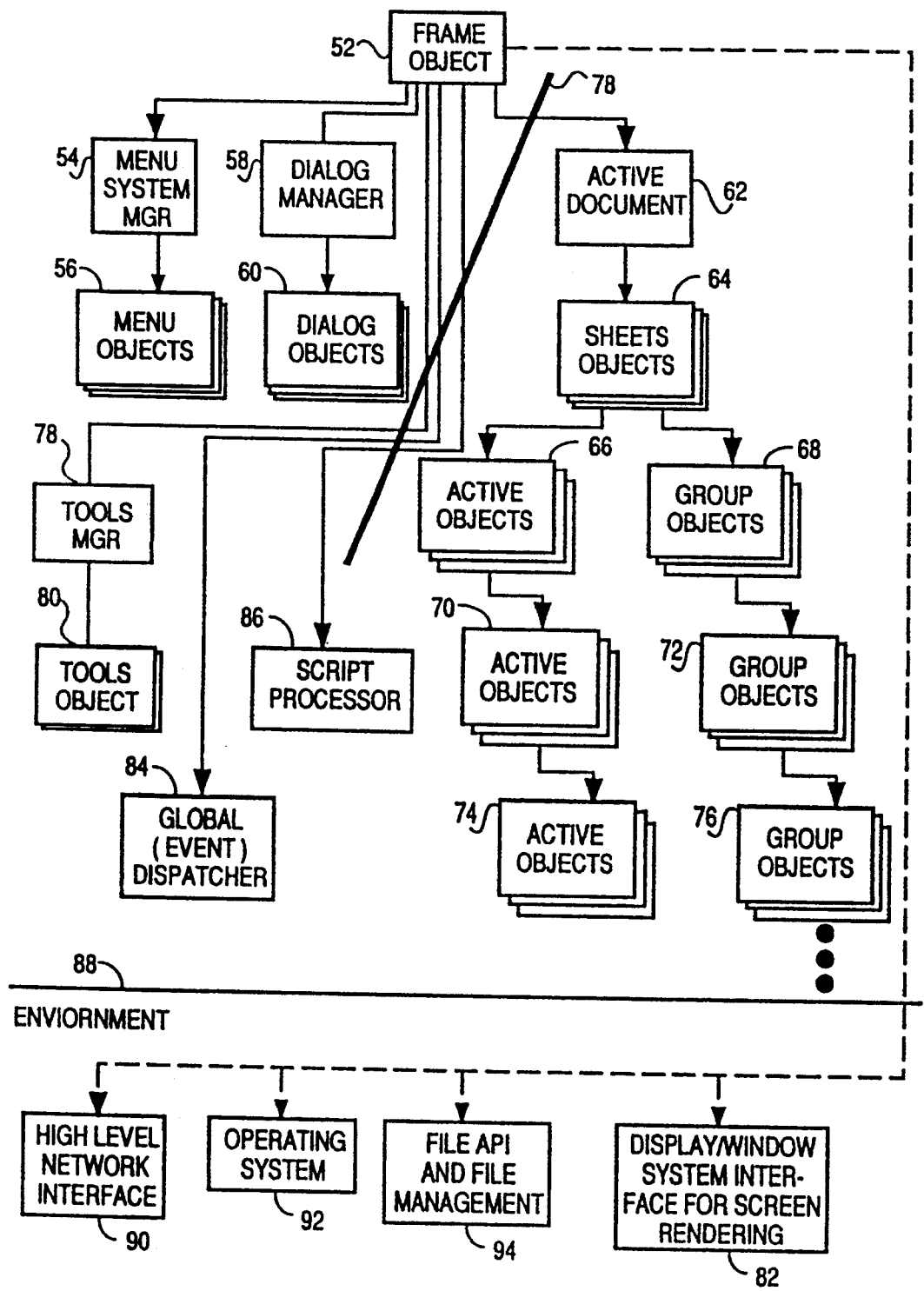
FIG. 6 is a block diagram of the parts of a program according to the teachings of the invention, and the components of the computing environment in which the program, according to the teachings of the invention, operates.

Referring to FIG. 6, there is shown a diagram of the hierarchy of the parts of a typical program according to the teachings of the invention. A Frame Object 52 "contains" all the other Active Objects that will be manipulated by the system. The Frame Object contains menus, dialog boxes and exactly one Active Document. The menus are software automatically of a menu system 54 and a plurality of menu objects shown generally at 56. The menu system 54 handles user inputs from whatever input device is being used for selection of commands, i.e., menu options. The dialog boxes are implemented by a dialog manager 58 and a series of dialog objects shown generally at 60. The dialog manager 58 handles user input associated with user selection of desired values for editing properties of Active Object instances which have been created on a Sheet using a tool. It is also used to specify commands which are specific to certain types of Active Objects. Generally, the menu options shown at 12 in FIG. 1 are generic operations which can be applied to any Active Object. However, certain Active Objects have associated properties and operations which are specific to that class of Active Objects alone. These specific properties and operations are embodied in the instances of dialog objects shown at 60 in FIG. 6. For each class of Active Object which has specific properties and operations, there is one or more dialog object(s) which can be used in a user dialog to set specific properties of an instance of that class of Active Object and to invoke operations which are specific to that class of Active Object. A graph class of Active Object is an example of a type of Active Object which has more than one dialog box. There is one dialog box to set the properties of the x-axis and one dialog box to set the properties of the Y-axis. Some of these dialog boxes "pop-up" supplementary dialog boxes.

An Active Document object 62 "contains" a plurality of other objects. They are: a plurality of Sheet Objects which have been composed by the user using the tools described above and shown generally at 64; a plurality of Active Objects the instances of which are created using the tools described above and shown generally at 66; and group objects shown generally at 68. Group objects are essentially "containers" for other objects and can contain a plurality of Active Objects such as are shown generally at 70 instances of which are created using the tools, and one or more other group objects shown generally at 72 each of which may contain a plurality of Active Objects such as shown at 74 or other group objects such as are shown at 76.

Some of the properties of each Sheet Object are: whether a grid used for alignment of various Active Objects thereon is or is not displayed; grid size; background fill pattern, e.g., solid blue, dollar signs, etc.; a list of contained objects; scripts associated with the Sheet that handle alerts for any objects on the Sheet; whether the grid is being used; edit mode status, i.e., whether the user will be allowed to edit (unlocked) or not be allowed to edit (locked) the Active Document; etc. Some of the operations/commands associated with each Sheet Object are: toggle grid setting; change grid size; change background fill pattern; align an Active Object to the grid; change the edit mode status; etc.

The Active Document object 62 has various properties including: the current Sheet to display; the list of Sheets in the Active Document; the file name under which the Active Document is stored; the number of Sheets; etc. Some of the associated operations include: open an Active Document file; add a Sheet or Sheets from another Active Document to this Active Document; close an Active Document file with save or do not save options; go to next Sheet; go to previous Sheet; etc.

The properties and operations associated with each Active Object on a Sheet are as defined above in the descriptions of Active Objects created with the tools.

The pop-up or pull-down menus under the main menu options of the menu bar are menu objects as are the main menu options of menu bar 12 in FIG. 1.

The dialog manager 58 insures that the proper dialog object is selected to make the proper dialog box appear when a tool is invoked which requires a dialog to set the attributes of an instance of an Active Object being placed on a Sheet by a user. The dialog objects are the objects which actually embody the dialog boxes. The dialog objects contain text attributes that define the user's options and associated operations or commands which the user can invoke, e.g., graphically by clicking on an icon representing that operation, to change the properties or attributes of the Active Object to which the dialog box is associated.

The Active Objects such as those shown at 66 consist of labels, quotes, tickers, buttons, graphs etc. Label objects are "active" even though they are text because they can, for example, be changed as part of a script of commands which are executed as a result of an alarm condition.

All the objects on the right side of the line 78 are stored in memory using the same structure as any Active Object with properties and associated operations. Some properties or operations may be nullities however so that the same structure can be used for all types of objects to the right line 78.

A tool manager 79 manages a plurality of tools objects shown generally at 80. The tools manager 79 handles the user input events which are associated with selection of the class of the next type of Active Object to be created. It is also used to edit the existing Active Objects. The tools objects have associated Display Objects which invoke the display/windows system through the applications interface 82 to render the computer display of the computer having the program described herein in execution thereon. In the preferred embodiment, the XWindow system is used to render the icons which represent each tool. Each tool object has operations associated therewith which implement the operations defined above in the descriptions of the tools. The XWindow system is available commercially from the XWindow consortium of universities headed by MIT. It is also available through most workstation vendors such as Sun Microsystems. In other embodiments other window systems such as Microsoft Windows 3.0 or the Macintosh toolbox in the Macintosh operating system may also be used, or a screen rendering system can be programmed for custom screen rendering.

A global event dispatcher 84 receives event information such as real time data updates from subscriptions and user input events and dispatches the data to the appropriate object or manager or other portion of the system to cause appropriate processing.

A script processor 86 interprets the commands of scripts entered by a user defining the desired processing to be performed in the case where an Event Triggering that script has occurred. Such an event could be the activation of a button or a real time data update which exceeds an alarm limit programmed by the user. Basically, the script processor handles requests to process scripts generated by the instances of the Active Objects programmed onto the various Sheets by the user.

Program systems according to the teachings of the invention operate in an "environment" comprised of various other support processes (programs in execution on the host computer). The environment for a system according to the teachings of the invention is shown below the line 88. A high end network interface 90 receives requests for data from the system and communicates on the network (not shown) to obtain the requested data. In the preferred embodiment, the network interface is the TIB® network communication software commercially available from Teknekron Software Systems in Palo Alto, Calif. but other network communication software may also be used. For example, the IBM Datatrade® system, DEC's DECTrade® system or other high level network interfaces developed in the future may be used. The TIB® software automatically maps subscription requests on particular subjects, e.g., IBM equity prices, into the appropriate network addresses for the appropriate service and server that provides this information and selects and carries out the appropriate service discipline and network protocols to communicate with the selected server over the particular network LAN/WAN system to which the host running the system according to the invention is connected.

An operating system 92 is also part of the environment and carries out host traffic direction and computer resource management duties necessary to support the system according to the teachings of the invention.

A file application programmers interface and file management process 94 is also part of the environment and typically runs on a file server, although in some embodiments, it may be part of the operating system.

Finally, the environment includes the display/window systems application programmer's interface for screen rendering. The preferred embodiment of a system according to the teachings of the invention utilizes the commercially available XWindow screen rendering system. This system can receive commands to draw various objects such as line, point, box or other primitives and text, font and color codes etc. from an application program and then render the screen accordingly. Any known screen rendering system can be used in other embodiments, or the screen rendering function can be programmed as part of the program system according to the teachings of the invention.

Figure 7:
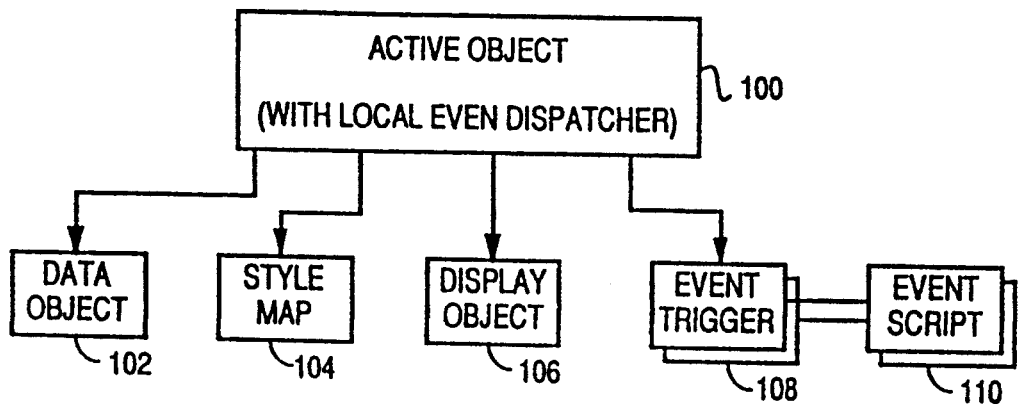
FIG. 7 is a block diagram of the parts of an Active Object.

Referring to FIG. 7, there is shown a diagram of the parts of an Active Object. An instance of an Active Object 100 contains a data object 102, a Style Map 104, a Display Object 106, one or more Event Triggers shown generally at 108 and one or more Event Scripts of commands to be performed sequentially if an Event Trigger condition occurs. These Event Scripts are shown generally at 110. The Active Object 100 includes a local event dispatcher which dispatches events, e.g., user commands, to the various Active Object components for processing. For example, data updates from a network or database are dispatched to the Data Object 102, and "display frame" or display related events are dispatched to the Display Object 106. Events handled by the local dispatcher can be internally generated, such as a "change notification" event from the Data Object, which is dispatched to the Display Object so that the displayed representation can be updated.

The Data Object contains the internal representation of the data being manipulated by the Active Object, i.e., a full listing of all the data which is available about a particular subject, only some of which does the user desire to view. For example, typically a quote object will have a Data Object with a large number of fields of data about a particular company and the trading activity in that company's stock.

The Style Map 104 contains a human readable specification defined by the user via selections from a dialog box which popped up when the instance of the quote Active Object was created which specify which of the data fields in the Data Object to display in a display frame or box shown on the display to represent the Active Object and where to display the selected fields in the display frame. The Style Map also contains data which specifies certain display characteristics such as what color to display the object when the price is going up and what color when the price is going down. The Style Map is simply a specification. It does not do any of the actual work of rendering the Active Object instance or screening and selecting data from the Data Object to be displayed.

The Active Object 100 tells the Display Object 106 what Style Map to use. Then a style processor (not shown) in 25 and the Display Object do the work of extracting the proper data from the Data Object and sending the proper commands to the screen rendering system to display the desired data in the user selected format and style. The Display Object 106 encapsulates the data and operations required to display the data object in the "style" requested by the user. That is, the Display Object contains the internal representation of the actual data to be displayed for this Active Object in the location on the current Sheet specified by the user and a style processor. This internal representation is sent to the screen rendering system by the style processor to actually draw the display seen by the user. The style processor is actually implemented in a library and the Display Object 106 contains a pointer to this library and receives a pointer to the style map 104 such that the Data Object can be processed by the style processor library programs in 5 accordance with the style map.

The Event Trigger is a specification of conditions under which the user wishes to do extra processing on the Active Object. For example, the user can set alarm limits such as a certain price or trading volume for a particular quote Active Object, and when a real time data update indicates that the limit has been exceeded, an alarm condition exists to transfer the Active Object from the normal update state to the alert state. The Event Script of commands to execute upon occurrence of the specified alarm condition is specified in the Event Script specifications shown generally at 110. The things that can be scripted to happen upon occurrence of an alarm condition are limited only by the imagination of the user. Minimally, the script may specify an audible beep and/or a change in color of an Active Object. More exotic scripts may issue commands on the network to start another process running to dial a beeper, issue a sell order, issue a buy order, etc. Other scripts may publish some or all the data on one or more sheets of an active document on the network, etc. The commands in the scripting language generally include all the commands understood by the script processor as well as commands defined by the user and can, in some embodiments, include commands to the operating system, the high level network interface or other processes running on the network. Generally the commands understood by the script processor will include the name of the object, the desired operation and an argument, i.e., what value to set etc.

The Active Object 100 also has associated operations such as "move yourself", "change the data using the real time network data update or a database update"; etc. Most operations are done by the local dispatcher. For example, data update events cause the local dispatcher to send the data to the Data Object 102. Programs according to the teachings of the invention are written for "event driven" processing style. An "event" as that term is used here can mean a user caused event such as an input from the keyboard, pointing device or other input device or it could be generated by the program itself, the network interface, or any other process in the environment or elsewhere on the network. The event dispatchers in the system match each event with some operation to call. The Active Objects have their own event dispatchers and there is a global event dispatcher which deals with input events from the network, the input devices, the operating system or a database which is used to store pricing information so that when a subscription is entered, the user may get the most recent data immediately and does not have to wait for the next update.

Figure 8:
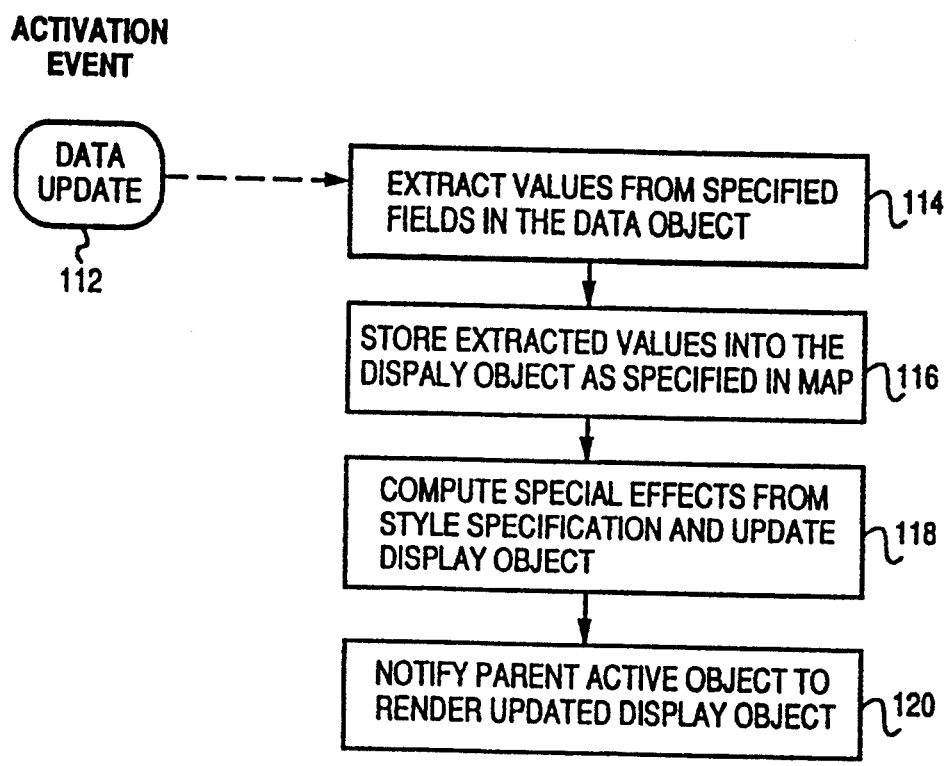
FIG. 8 is a flow diagram of processing after a real time data update.

Referring to FIG. 8, there is shown a flow chart of the processing performed by the style processor for each) Active Object upon the occurrence of a data update event. A data update event, represented at 112 causes the style processor in the Display Object 106 in step 114 to extract the values from the user specified fields from Data Object 102. The extracted values are then stored in step 116 in; the Display Object in accordance with the specifications set by the user in the Style Map 104. The value of the data fields are then compared to any event trigger specifications set by the user and stored in the Event Trigger specification 108. Step 118 represents the process of making this comparison and computing any special effects specified in the Style Map such as color changes, blinking etc. Step 118 may result in an update to the Display Object 106 if any special effects are triggered. Step 120 represents the process of notifying the parent Active Object to send the appropriate commands to the screen rendering system to render the Display Object 106 in the preferred embodiment. In other embodiments, the style processor itself can send the commands to the screen rendering system.

Figure 9:
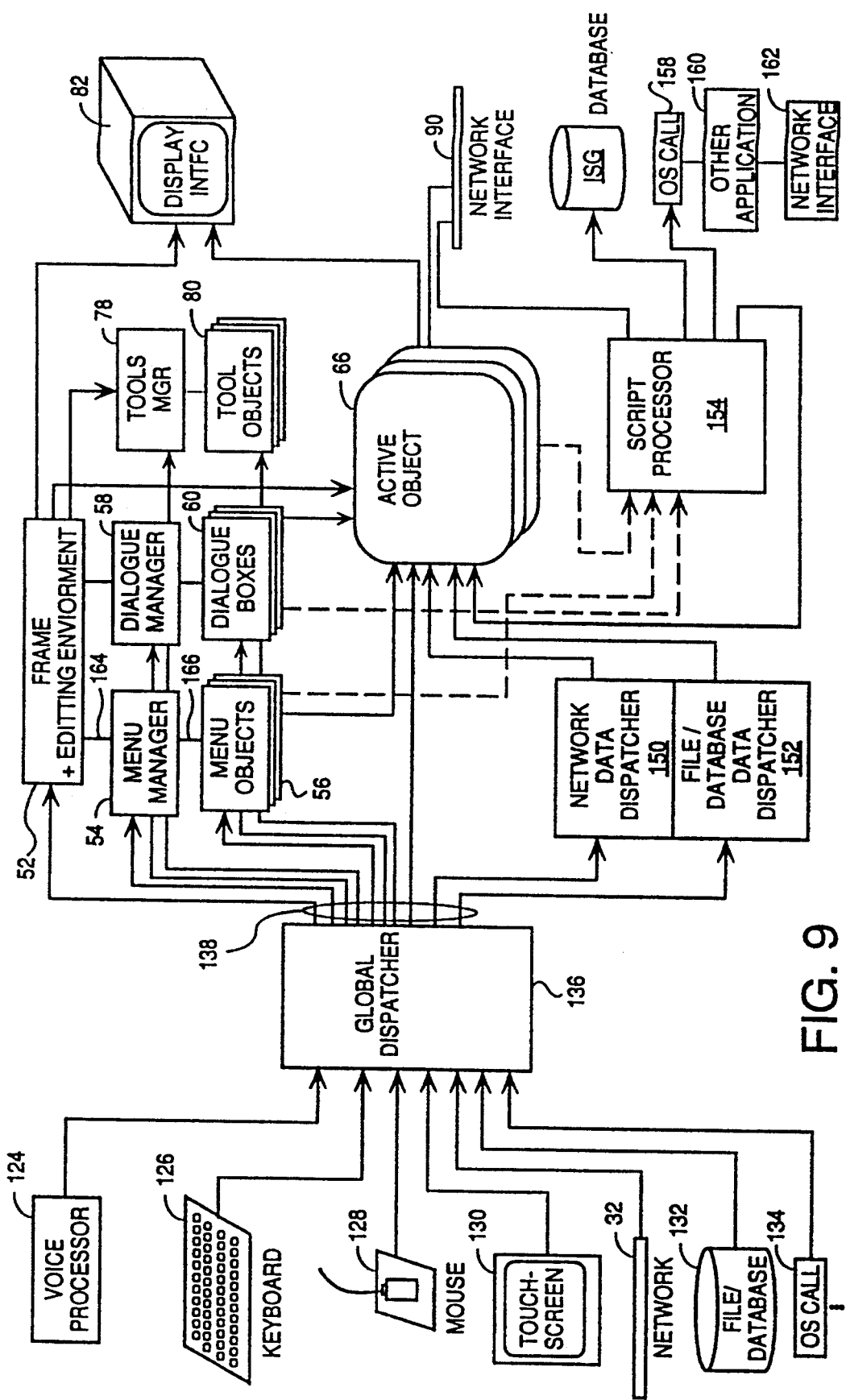
FIG. 9 is a diagram of event processing flow in a program according to the teachings of the invention.
Figure 10:
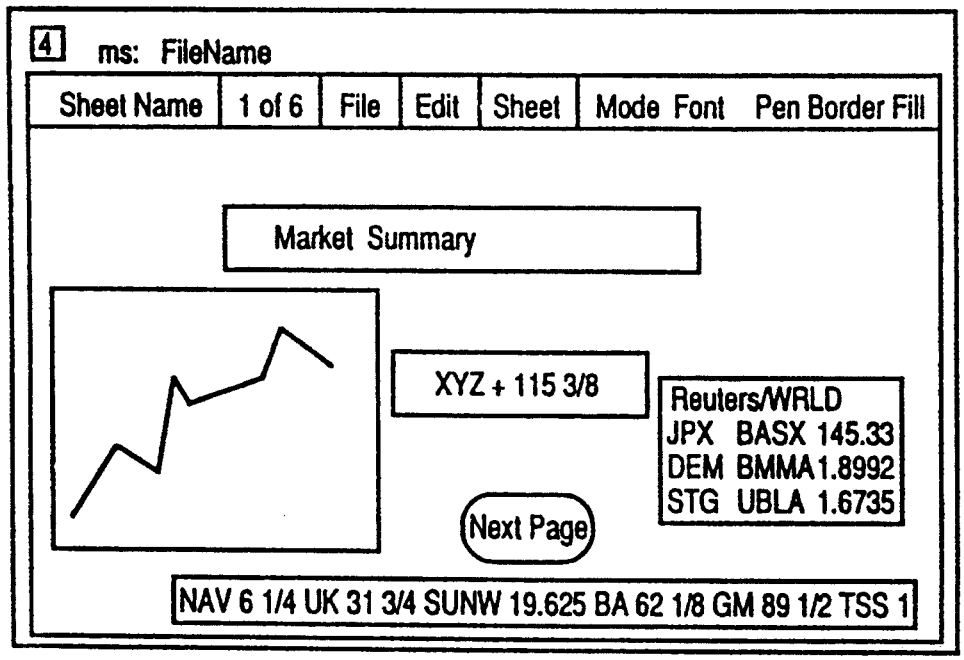
FIG. 10 is a drawing illustrating the basic display of a program according to the teachings of the invention.

Referring to FIG. 9, there is shown a diagram of the event architecture of a program according to the teachings of the invention. At the left are shown symbols for some of the input event generators. User events can be generated using a voice processor 124, a keyboard 126, a mouse 128, or a touchscreen 130 or any other user manipulated device. Other input events can originate from the network 32, a file/database 132 or from the operating system 134. The file/database stores real time data as it comes in from the network so that users requesting a price etc. can immediately have access to the latest information and need not wait for the next update of the requested information. An event originating from the network or the database is usually the data returned after a request generated by the creation of an Active Object such as a quote, ticker, graph etc.

A global dispatcher 136 receives the event and determines which object in the appropriate object to process the event as symbolized by the lines of event flow 138.

After the environment is initialized, the global dispatcher 136 has control of the system. It then waits for an event and processes each event appropriately. For example, a mouse event in the form of a click on a frame object icon such as a window meaning move this window to the top of the stack will be dispatched to the frame object 52 by calling the appropriate operation to move this window to the top of the stack. A mouse click on a menu bar option as shown at 12 in FIG. 1 would be dispatched to the menu manager 54 as a call to the operation to display the appropriate pop-up menu for the suboptions of the selected menu option.

Typically, the global dispatcher 136 will dispatch an event to the dialogue manager 58 when the user takes an input action to create an Active Object which requires a dialogue box. A typical sequence would be for the user to click the mouse on a tool to create an instance of an object. This event would be dispatched to the tools_i manager 78 which would select the appropriate one of the tool objects 80. The user would then move the mouse to where the instance of this class of object is to be displayed. This event would be dispatched to the appropriate tool object which would then create an instance of that type of Active Object at the desired location. A display object representing that object is created and commands are sent to the rendering system to draw the display object. The user then clicks the mouse on this displayed Active Object and the appropriate one of the dialogue boxes 60 pops up. The user may then select the various options in the dialogue box to invoke operations to set up the properties of the Active Object represented by one of the Active Object boxes at 66. After the user is done specifying the Active Object desired, the dialogue box performs an update operation when the save button is "pushed" to set the properties of the Active Object as specified by the user.

A network event is dispatched by the global dispatcher to a network data dispatcher 150. This dispatcher examines the type of data it is and sends it to the appropriate Active Object. The network data dispatcher can "fan" the data out to more than one Active Object if more than one Active Object exists with an interest in this type of data. A file/database data dispatcher 152 does the same thing as the network data dispatcher except it does it for data events originating from the file/database 132 after read I/O operation.

Some events can originate within and are locally dispatched from the Active Objects themselves or from the menu objects. For example, the user may click on a font change option from one of the menu objects 56, and this event will be dispatched as an update to the style map of the currently selected Active Object. Likewise, a data update to an Active Object may cause the value of some variable to exceed the alarm limits for that variable set by the user. In such a case, the local dispatcher of the Active Object making the transition into the alert state will invoke a script processor 154 and send the user specified script for the appropriate alarm event to the script processor. The script processor then processes the script to carry out the commands specified in the script in the order specified in the script. If one of the commands in the script is to change a color or a font, the script processor will call the style map of the Active Object specified in the script (it may be different than the Active Object which triggered the script processing) and update the style map of that Active Object. If the script calls for publishing some data, the style processor calls the high level network interface 90, invokes a publish function and sends the appropriate data to be published on the network. Likewise, if the script calls for sending data to a database 156, this also can be done. The script may also call for invoking some function of the operating system through an operating system call 158, and can invoke other applications 160 running in the same environment. Further, the script processor may also cause; the other application to perform some function and may even cause the other application to access the network through the network interface 162 of the other application to either send or receive some data specified by the script.

Of course the Active Objects all may dispatch rendering commands to the display rendering software interface to render their respective display objects.

The script processor 154 may also be called by the menu objects 56 or the dialogue boxes 60. This allows the; user to directly cause scripts previously defined by that user or some other user to be run by selection of a menu or dialogue box option to that effect and designating the desired script to run.

The objects of the Active Document are arranged in a hierarchy, and escalation of events within the hierarchy is allowed. For example, the line 164 represents the fact that the frame object manages the menu manager, and the line 166 represents the fact that the menu manager manages the menu objects. An example of an escalation of an event would be where the user selects the close option to close the active document. This event would first be escalated from the appropriate menu object to the menu manager 54 to make the menu disappear and then would be escalated to the frame object 52 because the menu manager does not have an operation associated with it to close an active document. Only the frame object has that capability.

Similar hierarchy exists for the frame object, dialogue manager and dialogue boxes. A similar hierarchy exists within the Active Objects themselves although this is not shown. The Active Objects are also managed by sheet objects which are not shown in FIG. 9 but which can be seen in FIG. 6. The sheet objects are managed by the frame object. An example of escalation of an event in this hierarchy is when the user invokes a "delete yourself" command to delete an Active Object. The will cause an event escalation from the selected Active Object to the corresponding sheet object on which the Active Object appeared to cause the sheet object to delete the Active Object from its list of current Active Objects.

Simultaneous event processing is allowed. For example, if the user is dragging an Active Object to another location with the mouse, a series of mouse move events are occurring which are being dispatched to the frame object 52 which contains the code for processing mouse moves. These events result in event dispatches to the selected Active Object to tell it to move itself. Simultaneously, a network update event can come in to cause a value in the Active Object to be changed and this may cause an alarm and the associated script processing.

In alternative embodiments, the tools may be represented as menu selections or simply be invoked by typing or speaking their names rather than through graphic selection of icons with a mouse, touchscreen, trackball or through keyboard navigation with the arrow or tab keys. In some embodiments, a map-like coordinate system could be used, and the user could select tools, menu options or Active Objects by speaking their coordinates. Their must be one input device however, although it may be connected to the host running the program according to the teachings of the invention through the network or through another application with an interprocess communication mechanism such as shared memory, Unix pipes, etc.

In some embodiments, the program itself may specify the placement of Active Objects and automatically fit them together after the user specifies what he or she wants in the active document.

Button objects provide great flexibility. A button object can be scripted to pop up on a user written help screen, make another Active Object appear or disappear, or do any other commands or sequence of commands within the scripting language.

The menu bar 12 in FIG. 1 includes a hide/show toggle option wherein Active Objects can be hidden, i.e., not displayed, although an internal representation of the display object is maintained so that at any time, the object may be displayed once again. This is especially helpful for user defined help screens which the user does not want visible at all times.

MARKETSHEET ® APPLICATION

The MARKETSHEET ® software is a Teknekron Software Systems application that allows traders, brokers, and others to customize the presentation and monitoring of market information. An "object oriented" approach provides a state of the art user interface and display environment; users and system administrators define customized market data information pages or "sheets." A sheet is an arbitrary arrangement of objects, each of which displays an item or group of related items in a pre-defined way. There are standard sheets which come with the product, shared sheets used throughout a department or entire firm, and specialized sheets used by an individual or small group. The MARKETSHEET ® software gives the user complete flexibility to organize, format, and display information as the user needs it.

The MARKETSHEET® software receives its market data from the Teknekron Information Bus™ (TIB®) component, a powerful suite of communication protocols that separate information sources, like MarketFeed 2, Ticker III, or Telerate TDPF from information consumers, like the MARKETSHEET® software or Teknekron's Real Time Spreadsheet. This means the user can add market data feeds without obsoleting your applications and the user can add applications without changing feeds.

The MARKETSHEET® application is a member of the Teknekron Trader Workstation System family of applications. As such, it employs a number of concepts which are described in the Trader Workstation Introduction manual. Thus it is particularly important to read that manual first.

The following sections are organized as follows: An introduction introduces the features and primary objects of the MARKETSHEET® software. Then a Tutorial explains how to use the MARKETSHEET® software, covering many of the basic operations. Finally, a Reference section describes the menus, objects, and scripts in detail. Most of this detail is not needed for a first reading but will be useful after becoming familiar with the program.

This version of the MARKETSHEET® program corresponds to Versions 2.1 and 2.2 of the product. These versions differ only in which feeds are supported. Version 2.1 does not support MarketFeed 2 in order to load faster and operate with less memory. No differences are seen by the users.

INTRODUCTION

Features

Features of the MARKETSHEET® application include:

Display

The display consists of objects on sheets. The user has complete control over the appearance of each object. All objects have characteristics such as foreground color, background color, font, and border which can be changed to suit user requirements and preferences.

Menus

The MARKETSHEET® software uses a pull-down menu system. The Menu Bar is always displayed across the top of the window, displaying the names of the available menus. Clicking on a menu title causes the menu to appear below the bar. Selections from these menus are the "commands" that drive the MARKETSHEET® software.

Dialog Boxes

Pop-up dialog boxes are used to input characteristics associated with each object or sheet, such as market symbol, exchange, graph axis limits, etc. Dialog boxes are also used to specify more detail in many of the commands.

Layout

There are a number of helpful facilities for arranging items on a sheet, such as user-specifiable grids for objects to the front or to the back. Objects can be aligned to the grid either on creation or at any later time. The grid can be adjusted through the sheet edit dialog box, and the grid size is maintained separately for each sheet. Layout commands are consistent among the different tools.

Scripts

The user can define a sequence of actions to be carried out when a button is pressed or a price update occurs. These actions are expressed in a macro language called MarketScript~. This facility greatly increase the flexibility and generality of the program.

Alerts

The system monitors for alerts (such as upper and lower limits) in each quote or dynamic graph. The alerts can execute scripts in order to change the appearance of monitor items on the screen. The scripts can even run other programs, such as a program to play a sound file for audio alerts, or to log the alert in a file.

Display Styles

Each Quote and Ticker object uses a display style to format its output. These display styles indicate which fields to show (symbol, price, bid, ask, etc.), how wide to make each field, and what colors to use. The flexibility of the style facility allows formats to resemble the Quotron screen displays, or the Equity 2 terminal. The user cannot edit the styles, but a number of standard formats are provided, and the MARKETSHEET® Administrator's Manual describes how to edit the styles and add new ones.

Files

The user can create multiple MARKETSHEET® files that can be saved and reopened, much like the files in the RealTime Spreadsheet. Each file can contain many sheets.

OBJECTS AND TOOLS

The application displays "sheet" or market information. Users can create any number of sheets, which are then organized into an index for each access. Each sheet displays "objects" created by tools in the "toolbox." Available types of objects include:

Label

Labels provide status text to enhance or annotate the display, such as "Market Summary" placed at the top of a sheet.

Quote

Quotes display securities prices and other TIB® subjects in numeric format, with prices changing in real-time. Data can be displayed from any elementized feed (such as MarketFeed 2), from shredded page-based services (such as Telerate or Reuters), or form any TIB® subject published on the network (such as a calculation published from the RealTime spreadsheet or a C program).

Dynamic Graph

Dynamic graphs chart securities prices and other TIB® subjects in real-time. Multiple subjects can be included in a graph and simple arithmetic operations can be performed on the axes, such as spreads. Graphs can also be merged, meaning that two prices can be shown against one time axis.

Ticker

Tickers display a list of securities prices and other TIB® subjects that scroll as the subjects change in real-time. The user can specify the securities and exchanges to be included in the ticker and set volume thresholds.

Page Fragments

Page Fragments are "cut-and-paste" sections from page-based data sources (such as Telerate TDPF or Reuters RDCDF) and displayed as objects in the MARKETSHEET® software$. The fragments update in real-time.

Buttons

Buttons are triggers for scripts which are carried out when clicked. These scripts are expressed in the MarketScript TM language. In most cases, these actions are similar to those inaccessible through the menus, but these triggers can be placed on the sheets themselves. For instance, the user can create a button which will bring up a particular sheet when clicked on. This allows the creation of "hypertext links" between related information, such as a security and its options pricing. Available tools include:

Grid

When this tool is active, all creation, movement, and resizing of objects will be adjusted to match the current sheet grid settings.

Selection

This tool is used to select one or more objects for editing, or to move or resize the objects.

Duplicate

This tool is used to make copies of an existing object. The copies are arranged in a grid. This tool is very useful for creating monitor lists or grids.

TUTORIAL

Getting Started With MARKETSHEET®

This section discussed MARKETSHEET® informally, introducing concepts in the sequence the user might encounter when experimenting with the program on your own workstation. The Reference section is more structured and covers many of the same topics in more detail.

Basic Display

The MARKETSHEET® display shows a rectangular region, called a Sheet, in the application window, on which any number of objects may be placed.

Sheet Name

FIG. 1 shows a sample MARKETSHEET® display. At the top left of the screen is the Title Bar. Below it is a line containing the Sheet Name indicator, the Index Position indicator and the Menu Bar. The Sheet Name indicator is used to show the name of the Sheet currently being displayed. It can also be used for quick access to sheet attributes. Double-clicking on the Sheet Name indicator opens the Sheet Editor dialog box.

Besides the Name, the attributes of a sheet are the background color, the grid size, how the sheet should be changed when the application is resized, and whether the grid should be shown. These characteristics can be modified by the user.

Index Position

Next to the Sheet Name indicator is the Index Position indicator. This indicates how many sheets are in the current file and which sheet number is showing. It can also be sued for quick access to index information. A double click on the Index Position brings up the Index dialog box, which displays a list of the sheets in your MARKETSHEET® file.

Menu Bar

Figure 11:
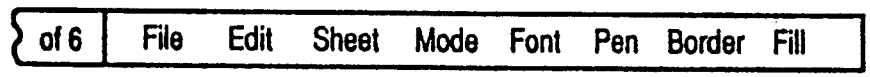
FIG. 11 is an illustration of the menu bar.

To the right of the Index Position indicator is the Menu Bar shown in FIG. 11. The menus pull-down by pressing and holding down on the menu choice using the left Mouse button. The menus are the main way of carrying out commands in the system. Commands provided in the menus support changing and editing the contents of the sheets.

Pressing the left button while you're pointing to a menu title causes the title to be highlighted and the menu to appear. While holding the button down, drag the pointer down through the entries of the menu. As the user drags through a menu, each usable command is highlighted in turn. If the user changes your mind about choosing a command, move the pointer off the menu and release the mouse button. Nothing is chosen unless the user releases the mouse button while one of the commands is highlighted.

Some menu commands will be shown in gray rather than black. These commands are not available right now. For instance, if there is only one sheet, the command to move to the next sheet is not available. Some menu commands are shown with three dots after their name. These are commands which will bring up a dialog box for further specification of information. For instance, the Create command under the sheet menu brings up a dialog box so that the user can enter the name of the sheet to be created.

Many menu items have a keyboard shortcut which is a way of selecting them without using the mouse. The more commonly used commands have a diamond and a letter to their right. This indicates that the command can also be selected by holding down the diamond key (to the left and right of the space bar), and pressing the specified letter. Note that the title of the menu containing the command will flash when the command is selected, but the menu will not be shown.

Objects

The sheet in FIG. 1 contains the following objects: At the top is a label which displays the text "Market Summary." Below it is a short quote showing the last trade in XYZ. Below that are a graph (not shown in full detail) and a fragment of the Reuters WRLD page. Near the bottom of the sheet are a button and a ticker.

DIALOG BOXES

Dialog boxes are used in several places where information must be specified about an object or an operation. For instance, double-clicking on an object brings up a dialog box in which its characteristics are shown. A typical dialog box contains the following kinds of items:

labels and grouping boxes
text entry areas
buttons
lists.

Figure 12:
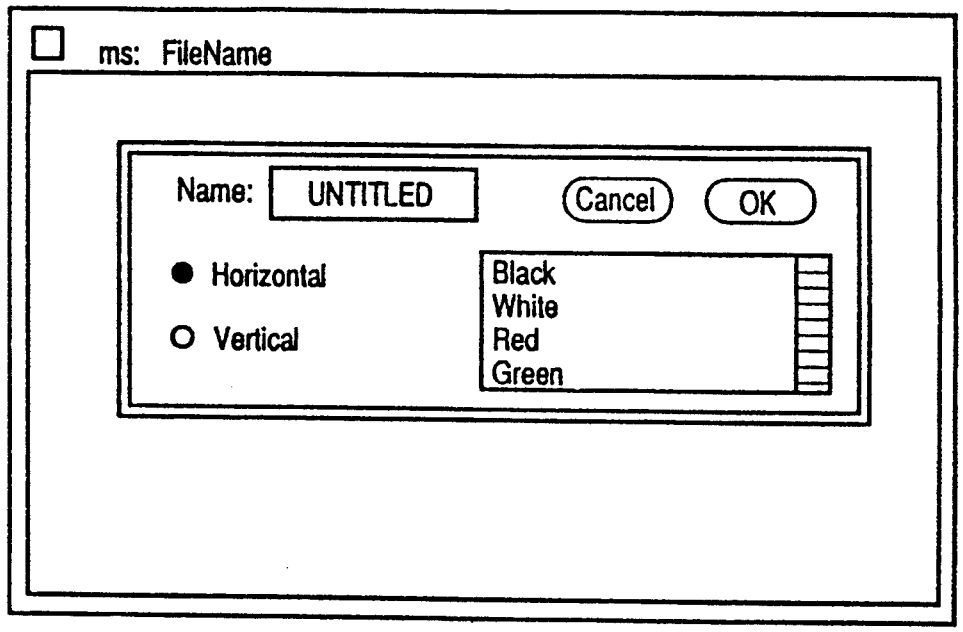
FIG. 12 is a dialog box example.

In the example of FIG. 12, "Name" is a label, and to its right is a text entry area. To change or enter information in a data entry field, click the left mouse button within the field. A small typing cursor appears at the point of text insertion. Use the Back Space key to delete old text. Type in the next text. The user can also select the text to be replaced by dragging through the characters with the mouse. The characters dragged through will be highlighted, i.e., shown in white on black. The next character typed will replace the selected text.

To select an option via a selection button, click the left mouse button within the square box next to the name of the option. Some options are "toggles" which turn on and off individually each time the user clicks them. Others are "radio buttons," a list of alternatives of which only one will be active at any time.

To use a list, clock with the mouse on an entry of the list. These are typically used for lists of color names or sheet names. The Scroll Bar to the right of the list indicates what portion of the list is visible, if not all the entries are showing. Click on the up or down arrows of the scroll bar to see more items. The center part of the scroll bar will indicate what portion of the full list is being shown. Clicking and dragging the mouse on it will enable quick scrolling to the beginning or end of the list.

One item on the dialog box has the Input Focus at any time. This concept is similar to how the Control Panel selects which application window has the input focus. The focus is indicated by drawing a black rectangle around the item. For instance, when a dialog box first appears, the item in the upper left will have the focus. To shift the focus, use the arrow keys to move it left, right, up, or down. In addition, the Tab key can be used to move to the next item, the Shift-Tab key can be used to move to the previous item, and the Keypad Home key can be used to move to the item in the upper left. When a button is traversed to, it may be "clicked on" by typing the space bar.

When a text entry field is traversed to, its entire contents are highlighted so that the user can easily enter another string. In order to simply edit the existing text, click in the text to specify the insertion point. Alternately, the following keyboard equivalents are available for setting and moving the insertion point through keyboard commands:

| | |
|---|---|
| Control-F | moves the insertion point forward |
| Control-B | moves the insertion point backward |
| Control-A | moves the insertion point to the beginning |
| Control-E | moves the insertion point to the end |

To conclude a dialog box operation, click the left mouse button on an action button. These are command names surrounded by a rounded border and, on a color monitor, shaded in color. Most dialog boxes have "OK" or "Cancel" buttons to accept or reject the dialog box action and exit the dialog box. Dialog boxes may also be exited by pressing the Return key which is equivalent to OK, or by pressing the Escape key which is equivalent to Cancel.

MANIPULATING SHEETS

Figure 13:
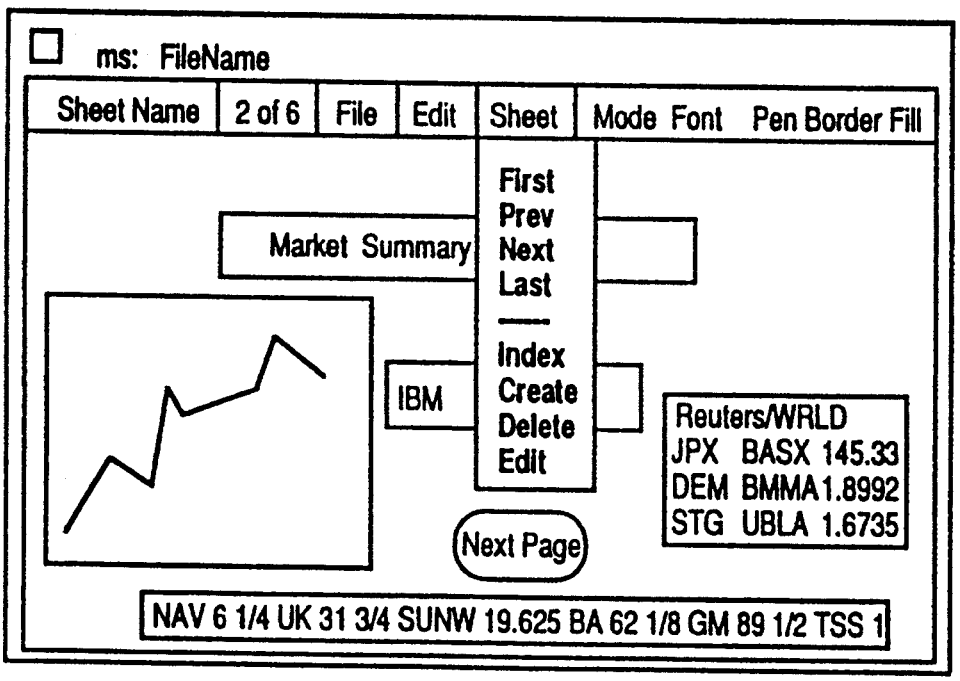
FIG. 13 is an example of the pull-down sheet menu.

A MARKETSHEET® file is organized into a list of sheets, or pages, of which only one sheet is shown at a time. Hence, the most common operations are to change which sheet is showing. Operations to show the First, Previous, Next, and last sheets are provided in the Sheet menu as shown in FIG. 13, below. These will navigate through the ordered set of sheets in the system.

An alternative way of navigating to other sheets is to use the Page UP and Page Down keys. On the Sun keyboard, these are R9 and R1, corresponding to the placement of the Page Up and Page Down keys on the keypad of an IBM PC.

Yet another way to change sheets is to display the Index dialog box, using the Index operation on the Sheet menu. This is shown in FIG. 14, below. The dialog box contains a list which holds the names of all of the sheets.

To display a sheet, select it and then click on OK, or as a shortcut, double click on its Index entry. The scroll bars may be used if there are more sheets than will fit on the display. The buttons to the left of the list are used to change the ordering of the sheet in the list of sheets.

CREATING AND DELETING SHEETS

Besides moving around to the different sheets, the user can also create, delete, rename, and change the order of the sheets. The Sheet Create menu command is used to add a blank sheet. A dialog box will appear in which the sheet name may be entered.

The name of the new sheet defaults to "No Name," and the new sheet will be placed after the current sheet in the index. Note that it is allowable for more than one sheet to have the same name.

To change sheet characteristics such as the name, the background color, or the grid sizes (to be explained below), use the Sheet Edit operation or double-click on the Sheet Name indicator. Complete the dialog entry by clicking on the OK button.

The Sheet Delete menu command is used to delete the current sheet. A dialog box will appear, indicating the name of the current sheet and requiring that the user confirm the deletion. Note that when there is only one sheet, it may not be deleted.

The Sheet Index menu command is used to change the current sheet, as seen previously, and it can also be used to change the order of the sheets. Bring up the dialog box and then click on a sheet name which is not the top one. Clicking on the button marked "Top" will then move that sheet to the top of the list. Click on "OK," and the selected sheet will be moved to the first position. There are also buttons to move a selected sheet forward one position, backward one position, or to the end, and to create, delete, and rename sheets while the index dialog is active.

MANIPULATING OBJECTS

Toolbox

The Toolbox is a vertically arranged set of icons or buttons along the left side of the display sheet as shown in FIG. 1. It is initially not shown. Using the Show Tool-box command in the Edit menu will cause it to appear on the left side of the Display.

The Toolbox contains an icon to indicate whether the Grid tool is active, then a gap, then an icon to represent the Selection tool (or arrow), then an icon to represent the DuPlication tool, and then an icon for each of the available object types. Only one of the tools can be active at any time. It is shown in reverse video. The Grid tool is a toggle, either on or off.

The Toolbox is used to select the next object to be created. After picking a tool (such as a Quote), click and drag to draw a rectangle on the current sheet. The selected type of object will be created, and the Toolbox will reselect the Selection or tool.

If the Grid tool icon is lit, the corners of the drawn rectangle will automatically be adjusted to the grid sizing for the sheet, whether or not the grid is actually being shown. This is a useful page layout feature when creating an array or similar items on a sheet.

SELECTING OBJECTS

Figure 16:
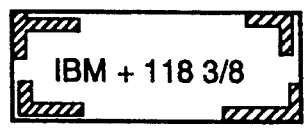
FIG. 16 is an example of how the display for an Active Object changes when the object has been selected.
Figure 17:
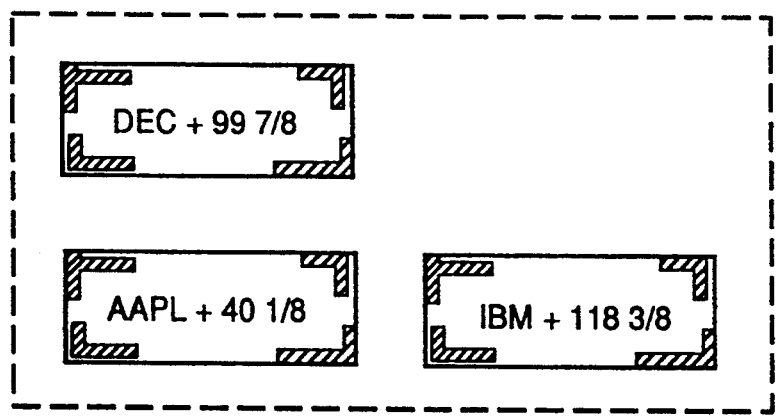
FIG. 17 is an example of the display for multiple Active Objects when they have been selected.

Editing operations provided by the menu system will operate on Selected Object(s) on the current sheet. Selected objects are indicated by a "picture frame corners" around the object, as shown in FIG. 16. To select an object, single click on the object with the mouse. A way to select more than one object at a time is to draw a large rectangle (using the Select tool) around the desired objects, as shown in FIG. 17.

Holding down the Shift key acts as an "extend selection" feature similar to many programs for the Apple Macintosh, allowing the user to select and highlight more than one object, by clicking on each one of them. If the user clicks on a selected object, it is unselected.

If the user draws the selection rectangle with the Shift key held down, any objects in the selection rectangle will be toggled, reversing the selection state of all affected objects. The user can unselect all objects by clicking the left mouse button on an empty area of the sheet.

Another way to select objects is to select all of them, by using the Select All command in the Edit menu.

USING KEYBOARD TRAVERSAL

The keyboard traversal facility allows the user to change which object is receiving keyboard input, much like the Control Panel function keys are used to change which application receives the keyboard input. This is also the same facility which is used for navigation in dialog boxes. Not all objects can accept the keyboard traversal—currently only the Quote, Page Fragment, and Button objects do.

Figure 18:
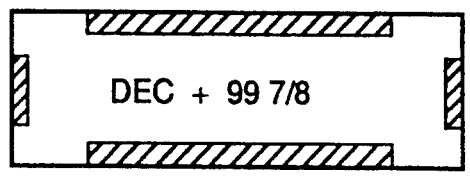
FIG. 18 is an example of an object which has been selected by keyboard transversal.

The object which has the traversal focus will be shown with highlighting market along the sides, not the corners. This is shown in FIG. 18. Note that selection and traversal are two distinct operations and are indicated by two distinct highlights. When an object is both selected and traversed to, the highlights will merge to form a complete border.

Use the arrow keys to navigate in direction such as up, down, left and right. The Tab key will move to the next item, and the Shift-Tab will move to the previous item. The tabbing sequence is the same as the stacking order, which defaults to the order in which the items were made. This can be altered using editing operations described below.

When there are more than one selected object, one is marked as the Traversal object, meaning that keyboard input will be sent to it. This facility is mostly used for quick editing of the symbols in Quote objects, or the current page shown in a Page Fragment, which are explained in more detail below.

DUPLICATING OBJECTS

The Duplicate tool may be used to make copies of objects on a sheet, which will be arranged into a grid of copies having the same size as the original.

To use the Duplicate tool, first create an object, and set up its characteristics, such as size, colors, font, and other attributes. Place the object in the upper left of the region to be filled with copies. Then click on the Duplicate tool icon in the toolbox. Now click with the left button on the object to be duplicated, and drag right and/or down to define the region to be filled. As the mouse is dragged, the outlines of the copies to be created will be shown. When the region is complete, release the mouse, and the copies will be made. The Selection tool will be made active again so that the user can operate on the copies.

Note that the Duplicate tool cannot be used to make copies of Graph objects, due to their composite structure.

EDIT MENU OPERATIONS

Once an object is selected, the user can perform editing operations using commands from the Edit Menu.
Cut (Delete) the object
Front brings the object to the front of the overlap list
Back sends the object to the back of the overlap list.

Since objects can overlap each other, the user may want to bring one object to the foreground, or push one object to the background.

Objects are normally shown, but the user can temporarily hide them, using the Edit Menu.
Hide the object
Show the object.

These operations are often used to create pop-up objects on the sheet which are not visible until the user shows them. In most cases, button scripts are used to automatically pop up and down the hidden objects, in order to display help or additional information. This is explained further in the Buttons section.

Figure 19:
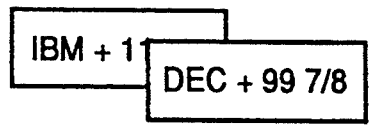
FIG. 19 is an example of overlapped Active Objects.
Figure 20:
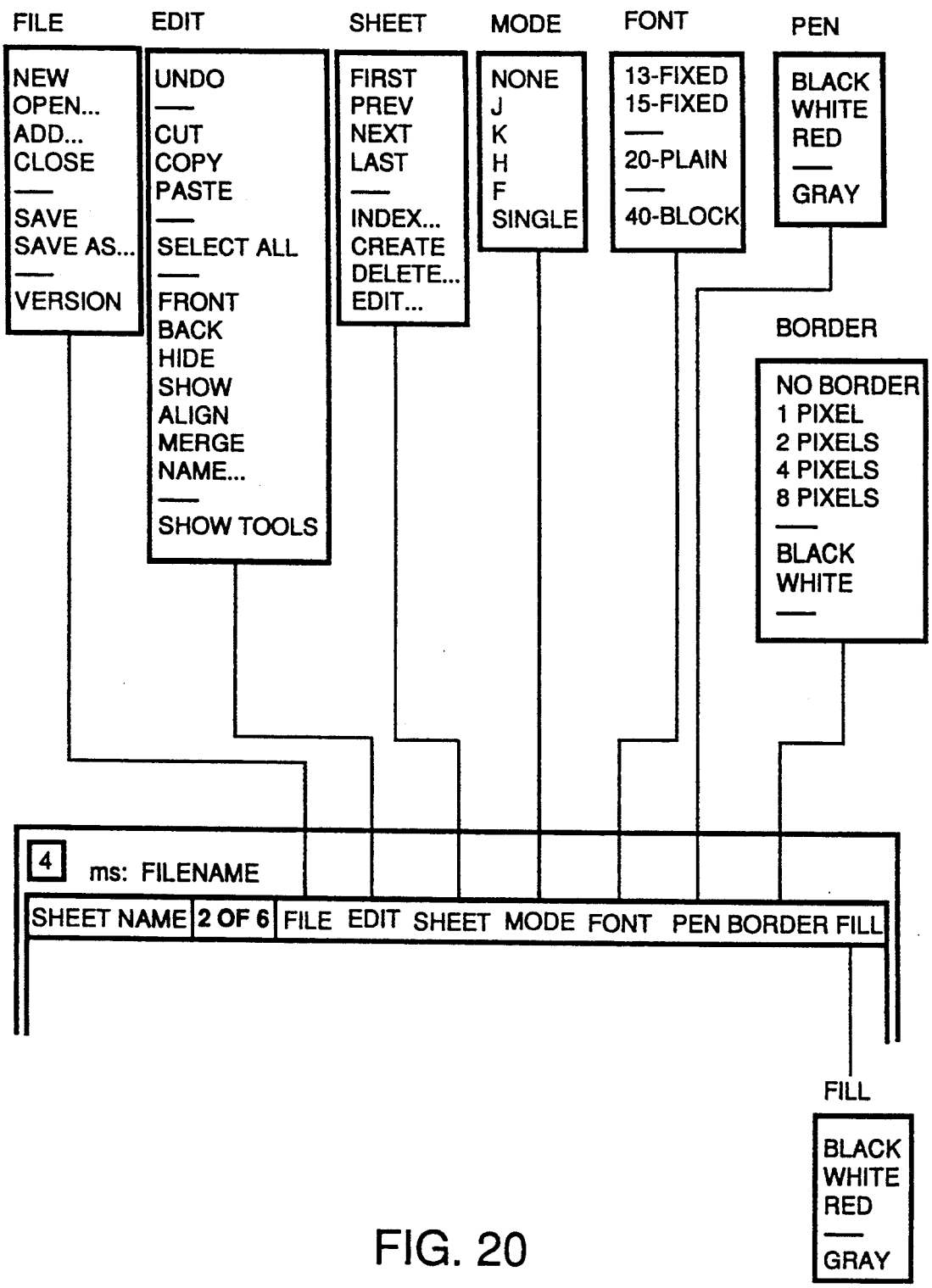
FIG. 20 shows the pull-down menu structure for all menu options on the menu bar.

To make page layout easier, the user can fit objects to the Grid or overlap objects as shown in FIG. 19. To see the grid, use the Sheet Edit command to bring up the Sheet Editor Dialog Box. Change the Grid Size by single-clicking anywhere in the Grid Size box. Once the user has created the desired grid size, click on the Draw Gridlines button and close the Dialog Box. The Grid lines will now be drawn on the sheet.

Aligning objects will automatically resize their borders to the size of one grid box, or multiples of the grid box size, if the object is large. When the user has selected the objects to be aligned, choose
Align
to resize to the grid. Selected objects will align to the grid. Other objects will not move.

In order to refer to specific objects or collections of objects in the MarketScript ® language used by the scripts, objects can be given names. Note that the name of a label, for instance, is different from the text shown by the label. Choose
Name . . .
to display or change the na.e A dialog box will appear, indicating the name of the first selected object. The name can also be changed through this dialog box. The name change will apply to all of the selected objects.

MOVE AND RESIZE OPERATIONS

Some editing operations do not require the use of the Edit Menu. The user can move or resize an object using the mouse to specify what the user wants to do.

Objects can be Moved by Selecting them, pressing down and holding the left mouse button, and then dragging the objects to a new location on the sheet. To Resize an object, press and hold the left mouse button on any one of the corners of the Selected object(s). Some degree of precision is required, since the mouse cursor must be within 2 pixels of the corner.

Note that while moving or resizing, the mouse cursor will change into an arrow indicating the movement or direction of resizing.

FONTS, COLORS, AND BORDERS

Besides editing a selected object or group of objects, the user can also change their display characteristics. These display characteristics are accessed from the Menu Bar, and include:
Mode: changes the highlighting mode for page fragment objects. This is described in more detail below.

Font: changes the font size and style.

Pen: changes the color for the text and border.

Border: changes the width for the border of the object.

Fill: changes the color which fills the background of the object.

Note that the user cannot change the border of Button objects, as their border is drawn internally to provide different shapes.

DIALOG BOXES

To edit the detailed characteristics of an object, such as to change a label's text or a quote's subscription information, double click on the object. A dialog box will appear showing that the object's attributes. The dialog boxes are different for the different types of objects, but all have OK, Cancel, and Revert buttons.

For a label, for instance, there is a text entry area for the label's text, and a set of radio buttons to specify the alignment mode of the text.

The specific attributes of the different classes are described more fully in the Reference section of this manual.

INTRODUCTION TO SCRIPTS

The script facility in the MarketSheet ® software is primarily for advanced users, so only a brief introduction will be given here. Scripts may be used to go to the next page, to a specific page, or to alter the appearance or layout of objects. They are composed of one or more actions, which are entered as a sentence. For instance, one script would be "Governments find sheet", which would find the sheet named Governments and show it on the screen. This would be faster than bringing up the index dialog box, searching through the list, and selecting the entry for Governments. Thus, scripts can be thought of as a macro facility for commonly performed functions. Scripts can chain together several operations, such as "next sheet next sheet", which would go to the next sheet, and then the sheet after that.

The section on scripts in the Reference part of this manual describes the available operations.

ALERT FACILITIES

The dialog box for a Quote object allows the user to set upper and lower limits for a specified field. When its limits are reached, a Quote object is shown in reverse colors (i.e., its pen and fill colors are reversed).

When a Quote reaches a limit value, it will run one more scripts, which the user can enter. There are four scripts associated with each quote, which are run at the start of an alert, the end of an alert, during a normal update, and during an alert update. This is explained in more detail in the section on Quotes in the Reference Part.

For a Graph, alerts are triggered when the plot line of the instrument moves outside the channel created by an upper or lower trend line.

LOADING AND SAVING SHEETS AND SHEET SETS

Only one set of sheets (one file) is active in MarketSheet ® at any time. File menu operations New, Open Add, Close, and Save are used to create a new sheet set, open (read) an existing one, add another file's sheets to the current file, close the current one, and save the current one. Version shows the Version Number for Market Sheet. Note that while a file is open, the New and Open operations are disabled, and while no file is open, the Save and Close operations are disabled.

The Open and Add operations will bring up a dialog box which lists the files already saved in this account. To select one of these names, simply click on it, or type a new name into the text edit box and MarketSheet ® will search the site-wide accounts as well.

Note that the current file name is shown in the application window title bar and will also appear on the icon window title.

The file name that the user types will automatically have the suffix ".ms" added to it. This avoids the possibility that the file will overwrite one of the system files on the disk, which will have a different suffix.

ON-SCREEN HELP

There are two ways to obtain on-screen help with MARKETSHEET ®. The user can select Help from the Trader Workstation Teknekron Menu and then select MarketSheet from the list of help subjects. Or, the user can click on the Help gadget in the upper right corner of the MarketSheet window frame. In either case, a MarketSheet Help Menu will appear listing subjects for which help is available. Some of these subjects invoke subsidiary help menus. Once the user selects an item for which help text is available a help window appears on the screen, overlapping other windows. It displays a page of text on the chosen subject. Click the Close gadget in the upper right corner of the help window to erase the window and return the display to its state when the user requested help.

REFERENCE

Menus

FIG. 2 shows the basic MarketSheet ® display and the menus that the user can select from the main menu bar.

Menu items shown in bold type are active in the current product release. The notation "—" appears on the screen as shown in the figure and serves as a logical separator between related groups of menu items. Menus which contain the notation ". . . " as an item are lists of fonts or colors. What appears on your screen will be a longer, somewhat different list.

Menu items that consist of a command name followed by ". . . " display a dialog box when selected.

FILE MENU

Use the File Menu to create new collections of sheets ("files"), to select files, and to save changes the user has made to files. File Menu commands are:

New

The File New command creates a new file. Once the user has made a new file, the New and Open commands are disabled until the user closes the file.

Open

The File Open command displays a dialog box in which the user enters the name of a previously created file with which the user wishes to work. The dialog box will contain a list of files which are already saved under your account. When the user accepts the dialog box, the file the user named will replace the currently active file. Once the user has opened a new file, the New and Open commands are disabled until the user closes the file.

Add

The File Add command copies the sheets from a file and adds them to the currently displayed file. The additions are temporary until the user saves the current file. Add displays a dialog box into which the user types the name on the source file. The dialog box will contain a list of files which are already saved under your account. Dialog box command Add executes the operation. Cancel exits the dialog box without performing an operation.

Close

The File Close command removes all sheets from the application, terminating access to the current file. Once the user has closed the file, the Close, Save, and Save As commands are disabled until the user opens a file or create a new file.

Save

The File Save commands saves the current file. Changes the user has made becomes permanent. The name of the file does not change. Note that if the current file has not been changed, this item is disabled.

Save As

The File Save As command saves the current file. It displays a dialog box into which the user enters the name of the file. When the user creates a new file the user must save it with Save As in order to assign it an initial name. Later the user can save it again with Save, preserving its name. To create a new file that is similar to an old one, Open the old file, make your changes, and then use Save As to save the new version with a new name.

Version

The File Version command displays the current software version number in a dialog box. This information is needed when reporting a problem with the software. Click on OK to remove the dialog box.

EDIT MENU

Use the Edit Menu to manipulate objects on the current sheet. Edit Menu operations are:

Undo (not implemented in the current release)

Cut

The Edit Cut command deletes all currently selected objects from the sheet.

Copy (not implemented in the current release)

Paste (not implemented in the current release)

Select All

Selects all the objects on the current sheet.

Front

The Edit Front command moves all selected objects to the top of the overlap stack so they become fully visible. Objects that overlap the selected objects will move to the back.

Back

The Edit Back command moves all selected objects to the bottom of the overlap stack so they do not obscure any other objects. Objects that overlap the selected objects will move to the front.

Hide

The Edit Hide command makes all selected objects invisible on the screen. This command is often combined with the Edit Show command to make objects pop up and down on the sheet.

Show

The Edit Show command makes all selected objects visible on the sheet. This command is often combined with the Edit Hide command to make objects pop up and down on the sheet. To select a hidden object for use in this command, use the Select All command, or use the mouse to drag a selection rectangle around the space where the object should be.

Align

The Edit Align command adjusts the positions of all selected objects to align with the current grid.

Merge

The Edit Merge command merges graphs. Select the price axes of two graphs and then execute the Merge command. The first graph disappears and its price axis is added to the second selected graph, creating a multiple axis graph.

Name . . .

The Edit Name . . . command is used to display or change the names of the selected objects. This allows the objects to be tagged so that they can be referenced in button scripts. A dialog box will appear, showing the name of the first selected object, and if a new name is entered, all selected objects will be renamed. Another use of the Name command is to assign a name to a ticker so that its selection list can be copied when defining other tickers.

Show [Hide] Tools

The Edit Show Tools command causes the toolbox to appear on the left side of the display area. Use the toolbox to create objects and to control the grid. When the toolbox is displayed, this command becomes Hide Tools. Hide Tools turn off display of the toolbox.

SHEET MENU

Use the Sheet Menu to create, delete, and modify sheets and to navigate among existing sheets. Note that it is allowable for more than one sheet to have the same name. This allows the "find sheet" scripting operation to navigate through a series of sheets.

First

The Sheet First command transfer to the first sheet in the list of sheets in the current file.

Prev

The sheet Prev (Previous) command transfers to the previous sheet in the list of sheets in the current file.

Next

The sheet Next command transfers to the next sheet in an the list of sheets in the current file.

Last

The Sheet Last command transfers to the last page in an the list of sheets in the current file.

Index

The Sheet Index command brings up the Index dialog box. This can be used to review the names of the sheets, to select a different sheet, or to change the order of sheets in the file. A short-cut for bringing up the Index dialog box is to double-click on the index position indicator.

Create

The Sheet Create command brings up a dialog box which allows the user to create a new sheet containing no objects and having the name "Untitled". Change the name with the Sheet Edit command or double click on the Sheet Name indicator.

Delete

The Sheet Delete command brings up a dialog box which allow the user to delete the sheet that is currently displayed. The user must confirm the deletion as a safeguard.

Edit

The Sheet Edit command displays a dialog box that lets the user enter a sheet name and background color, turn display of grid lines on and off, and adjust the grid size. A short-cut for bringing up the Sheet Edit dialog box is to double-click on the sheet name.

MODE MENU

Use the Mode Menu to change the highlighting mode in Page Fragment objects. Each page fragment implements the basic highlighting facilities used in Telerate displays to indicate which characters on the source page have changed. The available modes are:

None

No highlighting of changes is performed.

Mode J—Numeric Highlighting

The numeric characters which have changed in the most recent update within the region shown by this fragment are shown in reverse colors.

Mode R—Line Highlighting

The line containing the most recent change within the region shown by this fragment is shown in reverse colors.

Mode H—Accumulated Numeric Highlighting

The numeric characters which have changed since the last mode change or highlight clear are shown in reverse colors.

Mode F—Accumulated Line Highlighting

The lines which have changed since the most recent mode change or highlighting clear are shown in reverse colors.

Mode Single—used for single fields

The numeric characters which have changed in the most recent update anywhere on the source page are shown in reverse colors.

In general, use the Modes J through F when showing a large region of the source page. The highlighting will therefore apply to just this region, and will not be affected by updates outside this region. Use the Single Mode when showing a page broken up into a number of small page fragments, such as one for each price. This way the highlighting will be based on the most recent update anywhere on the source page (if the user had selected mode J for the small fragment, the highlights would remain until there was another update in that same small region).

Note that the highlighting is cleared for the selected objects whenever the mode menu is used. For instance, if Mode H is in effect and a number of highlights have accumulated, select Mode H again to clear the highlights and preserve the mode.

Clearing of highlights can also be accomplished through a script, see the Scripts section for more detail.

Font Menu

Use the Font Menu to change the font used in selected objects. The default font is a small fixed-width font. The elements of the font menu are defined by your system administrator, and may be changed when other fonts become available. Not all fonts are provided on all X Window System implementations. Therefore, the program determines which of the requested fonts are not available, and indicates those in gray (disabled) items. The current font is indicated by a black dot next to its name.

Note that if the selected object was made on another system which had a different set of fonts in the font menu, there may be no current font indicated on the menu.

Pen Menu

Use the Pen Menu to specify the foregoing color of selected items. The default color is black. This is the color of the text or lines in the object. The current foreground color is indicated by a black dot next to its name.

Border Menu

Use the Border Menu to specify the size of the border around selected items. The default is one pixel. Wider borders waste some screen space but they are more attractive and easier to manipulate with the mouse. The current border size is indicated by a black dot next to its name. The lower portion of this menu specifies the border color of the object. The current border color is indicated with a black dot next to its name.

Note that the border color and width of buttons cannot be changed.

Fill Menu

Use the Fill Menu to specify the background color of selected items. The default color is white. The current background color is indicated by a black dot next to its name.

Note on Use of Variable-Width Fonts

Font are divided into two types: fixed and variable. Fixed width fonts have all characters on the same size, while variable width fonts are spaced proportionally. Using variable width fonts on Quotes, Tickers, or Page Fragments will have some unusual effects, because each of those objects are organized around a row-column grid, or matrix, or characters.

The character grid layout facility must allocate space for a grid of characters big enough to hold the biggest character in the font, such as the letter 'W'. Thus it will often make itself wider than it appears to need to be. Likewise, if the width of one of those types of objects is reduced, the character grid layout facility will compute how many columns of the biggest character will fit, and show only that number of character. This can often be deceptive.

It is preferable to use only fixed-width fonts on these types of objects. Not only will this avoid the above effect, but multi-line page fragments and quotes will continue to have their character columns lined up, as on the source page. Since fonts vary from system to system, contact the System Administer for information on which fonts are variable-width.

HOW TO BUILD THE MARKETSHEET® PROGRAM

OVERVIEW

There are two stages. The first stage builds the Widget get, called Strata, which is used by the application. This stage relies only on availability of the standard XIIR3 distribution of the X Window System API library and the X Window System X Toolkit API library, both of which are distributed by the MIT X Consortium, and the TIP® API libraries.

The second stage is to build MARKETSHEET® itself, which uses the Strata widget get library, the TBI® API libraries, and the X Window System libraries.

FIRST PHASE

The following files are used to build the Strata library:

```
Axis.c
Axis.h
AxisP.h
Basic.h
BasicP.h
Box.c
Box.h
BoxP.h
Button.c
Button.h
ButtonP.h
CharGrid.c
CharGrid.h
CharGridP.h
Converters.c
Converters.h
DBoard.c
DBoard.h
DBoardP.h
Dialog.c
Dialog.h
DialogP.h
Gadget.c
Gadget.h
GadgetP.h
GraphData.c
GraphData.h
GraphDataP.h
GraphMgr.c
GraphMgr.h
GraphMgrP.h
GraphView.c
GraphView.h
GraphViewP.h
Highlight.c
Label.c
Label.h
LabelP.h
List.c
List.h
ListP.h
Manager.c
Menu.c
Menu.h
MenuBar.c
MenuBar.h
MenuBarP.h
MenuP.h
Primitive.c
Reader.c
Reader.h
Selection.c
TextEdit.c
TextEdit.h
TextEditP.h
Traversal.c
Writer.c
Writer.h
Makefile for First Phase (using GNUmake program):
lib_name = libstrate.a
lib_members = Primitive.o Manager.o Traversal.o Highlight.o
              Selection.o
\
              Converters.o Reader.o Writer.o Gadget.o
              Label.o
Button.o\
              Box.o DBoard.o Dialog.o MenuBar.o Menu.o
              List.o
TextEdit.o\
              CharGrid.o Axis.o GraphView.o GraphData.o
              GraphMgr.o
S(lib name): S(lib_members)
```

SECOND PHASE

The following files are used to build the MarketSheet application:

```
Box.c
Box.h
BoxP.h
Button.c
Button.h
ButtonP.h
CharGrid.c
CharGrid.h
CharGridP.h
DSAxis.c
DSAxig.h
DSAxisP.h
DSGraphData.c
DSGraphData.h
DSGraphDataP.h
DSGraphView.c
DSGraphView.h
DSGraphViewP.h
Fragment.c
Fragment.h
FragmentP.h
Manager.c
PlaneMgr.c
PlaneMgr.h
PlaneMgrP.h
Publisher.c
Publisher.h
PublisherP.h
Quote.c
Quote.h
QuoteP.h
Reader.c
Subscription.c
Subscription.h
SubscriptionP.h
TBAxis.c
TBAxis.h
TBAxisP.h
TBGraphData.c
TBGraphData.h
TBGraphDataP.h
TBGraphView.c
TBGraphView.h
TBGraphViewP.h
Table.c
Table.h
TableP.h
Ticker.c
Ticker.h
TickerP.h
TimeGrid.c
TimeGrid.h
TimeGridP.h
bits.arrow
bits.button
bits.clone
bits.dsgraph
bits.fragment
bits.global
bits.grid
bits.label
bits.publisher
bits.quote
bits.table
bits.tbgraph
bits.ticker
bricks.bits
button.c
dsgraph.c
files.c
fragment.c
global.c
items.c
label.c
menus.c
mondrian.bits
meney.bits
```

-continued

```
ms.h
ms23.c
msDefaults.cf
msEmpty.cf
msNTIB ®.cf
page.h
pagehandler.c
pagemap.c
pagemap.h
publisher.c
quote.c
script.c
sheets.c
stylemap.c
stylemap.h
table.c
tbgraph.c
TIB ®.c
TIB ®.h
ticker.c
time.c
Makefile for Second Phase (using GNUmake program):
objects =   Reader.o Manager.o PlaneMgr.o TimeGrid.o
            CharGrid.o Box.o Button.o\
            TIB ®.o time.o menus.o sheets.o items.o tools.o
            files.o\
            script.o stylemap.o label.o Subscription o.
            Quote.o quote.o
\
            Ticker.o ticker.o pagemap.o pagehandler.o\
            Fragment.o fragment.o\
            TBAxig.o TBGraphView.o TBGraphData.o\
            tbgraph.o DSAxig.o
            DSGraphView.o
            DSGraphData.o dsgraph.o Publisher.o
publisher.o\
            Table.o table.o button.o global.o
libs =   —Inrti —Irti —ITIB ®info —Imdp new —Imdsg
         —Imsa —Isags —Iforms
            Ichan\
            —IeventX —Iciutil —Istrate —Itss —Iutil —Ixt
            —IX11
ms23: $(objects) $(libs)
```

DETAILED DESCRIPTION OF THE TIB ® NETWORK COMMUNICATION SOFTWARE FOR PERFORMING SUBJECT BASED ADDRESSING AND MANIPULATION OF SELF DESCRIBING DATA OBJECTS

There is provided a method and apparatus for providing a structure to interface foreign processes and computers while providing a degree of decoupling heretofore unknown.

The data communication interface software system according to the teachings of the TIB ® software consists essentially of several libraries of programs organized into two major components, a communication component and a data-exchange component. Interface, as the term is used herein in the context of the TIB ® software, means a collection of functions which may be invoked by the application to do useful work in communicating with a foreign process or a foreign computer or both. Invoking functions of the interface may be by subroutine calls from the application or from another component in the communications interface according to the TIB ® software.

Data format decoupling is provided such that a first process using data records or forms having a first format can communicate with a second process which has data records having a second, different format without the need for the first process to know or be able to deal with the format used by the second process. This form of decoupling is implemented via the data-exchange component of the communication interface software system.

The data-exchange component of the communication interface according to the teachings of the TIB ® software includes a forms-manager module and a forms-class manager module. The forms-manager module handles the creation, storage, recall and destruction of instances of forms and calls to the various functions of the forms-class manager. The latter handles the creation, storage, recall, interpretation, and destruction of forms-class descriptors which are data records which record the format and semantic information that pertain to particular classes of forms. The forms-class manager can also receive requests from the application or another component of the communication interface to get a particular field of an instance of a form when identified by the name or meaning of the field, retrieve the appropriate form instance, and extract and deliver the requested data in the appropriate field. The forms-class manager can also locate the class definition of an unknown class of forms by looking in a known repository of such class definitions or by requesting the class definition from the forms-class manager linked to the foreign process which created the new class of form. Semantic data, such as field names, is decoupled from data representation and organization in the sense that semantic information contains no information regarding data representation or organization.

The communication interface of the TIB ® software implements data decoupling in the semantic sense and in the data format sense. In the semantic sense, decoupling is implemented by virtue of the ability to carry out semantic-dependent operations. These operations allow any process coupled to the communications interface to exchange data with any other process which has data organized either the same or in a different manner by using the same field names for data which means the same thing in the preferred embodiment. In an alternative embodiment semantic-dependent operations implement an aliasing or synonym conversion facility whereby incoming data fields having different names but which mean a certain thing are either relabeled with field names understood by the requesting process or are used as if they had been so relabeled.

The interface according to the teachings of the TIB ® software has a process architecture organized in 3 layers.

Architectural decoupling is provided by an information layer such that a requesting process can request data regarding a particular subject without knowing the network address of the server or process where the data may be found. This form of decoupling is provided by a subject-based addressing system within the information layer of the communication component of the interface.

Subject-based addressing is implemented by the communication component of the communication interface of the TIB ® software by subject mapping. The communication component receives "subscribe" requests from an application which specifies the subject upon which data is requested. A subject-mapper module in the information layer receives the request from the application and then looks up the subject in a database, table or the like. The database stores "service records" which indicate the various server processes that supply data on various subjects. The appropriate service record identifying the particular server process that can supply data of the requested type and the communication protocol (hereafter sometimes called the service discipline) to use in communicating with the identified server process is returned to the subject-mapper module.

The subject mapper has access to a plurality of communications library programs or subroutines on the second layer of the process architecture called the service layer. The routines on the service layer are called "service disciplines." Each service discipline encapsulates a predefined communication protocol which is specific to a server process. The subject mapper then invokes the appropriate service discipline identified in the service record.

The service discipline is given the subject by the subject mapper and proceeds to establish communications with the appropriate server process. Thereafter, instances of forms containing data regarding the subject are sent by the server process to the requesting process via the service discipline which established the communication.

Service protocol decoupling is provided by the service layer.

A third layer of the distributed communication component is called the communication layer and provides configuration decoupling. This layer includes a DCC library of programs that receives requests to establish data links to a particular server and determines the best communication protocol to use for the link unless the protocol to use for the link unless the protocol is already established by the request. The communication layer also includes protocol engines to encapsulate various communication protocols such as point-to-point, broadcast, reliable broadcast and the intelligent Multicast TM protocol. Some of the functionality of the communication layer augments the functionality of the standard transport protocols of the operating system and provides value added services.

One of these value added services is the reliable broadcast protocol. This protocol engine adds sequence numbers to packets of packetized messages on the transmit side and verifies that all packets have been received on the receive side. Packets are stored for retransmission on the transmit side. On the receive side, if all packets did not come in or some are garbled, a request is sent for retransmission. The bad or missing packets are then resent. When all packets have been successfully received, an acknowledgment message is sent. This causes the transmit side protocol engine to flush the packets out of the retransmit buffer to make room for packets of the next message.

Another value added service is the Intelligent Multicast Protocol. This protocol involves the service discipline examining the subject of a message to be sent and determining how many subscribers there are for this message subject. If the number of subscribers is below a threshold set by determining costs of point-to-point versus broadcast transmission, the message is sent point-to-point. Otherwise the message is sent by the reliable broadcast protocol.

Figure 21:
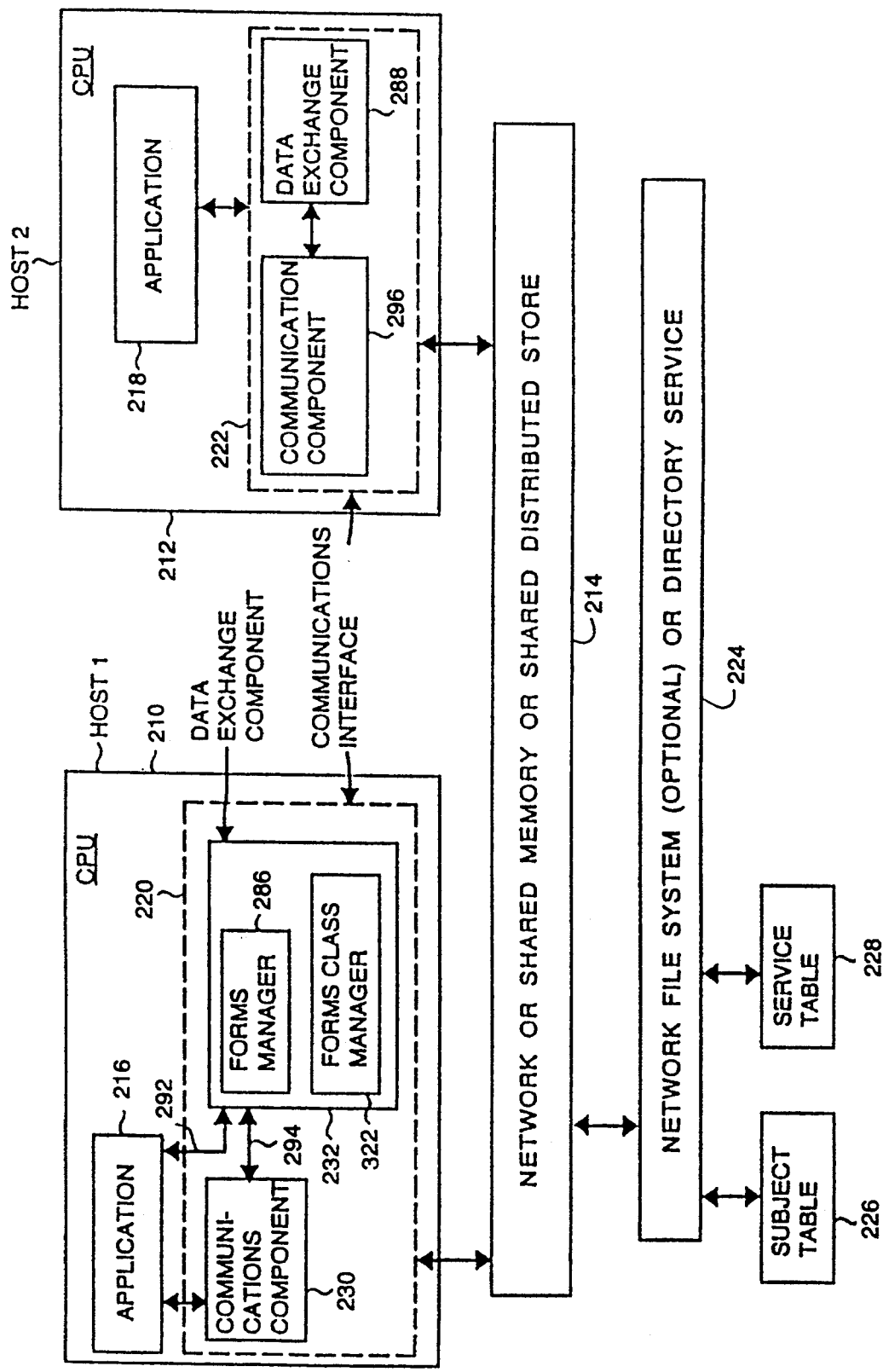
FIG. 21 is a block diagram illustrating the relationships of the various software modules of the communication interface of one embodiment of the invention to client applications and the network.

Referring to FIG. 21 there is shown a block diagram of a typical system in which the communications interface of the TIB ® software could be incorporated, although a wide variety of system architectures can benefit from the teachings of the TIB ® software. The communication interface of the TIB ® software may be sometimes hereafter referred to as the TIB ® or Teknekron Information Bus in the specification of an alternative embodiment given below. The reader is urged at this point to study the glossary of terms included in this specification to obtain a basic understanding of some of the more important terms used herein to describe the TIB ® software. The teachings of the TIB ® software are incorporated in several libraries of computer programs which, taken together, provide a communication interface having many functional capabilities which facilitate modularity in client application development and changes in network communication or service communication protocols by coupling of various client applications together in a "decoupled" fashion. Hereafter, the teachings of the TIB ® software will be referred to as the communication interface. "Decoupling," as the term is used herein, means that the programmer of client application is freed of the necessity to know the details of the communication protocols, data representation format and data record organization of all the other applications or services with which data exchanges are desired. Further, the programmer of the client application need not know the location of services or servers providing data on particular subjects in order to be able to obtain data on these subjects. The communication interface automatically takes care of all the details in data exchanges between client applications and between data-consumer applications and data-provider services.

The system shown in FIG. 21 is a typical network coupling multiple host computers via a network or by shared memory. Two host computers, 210 and 212, are shown in FIG. 21 running two client applications 216 and 218, although in other embodiments these two client applications may be running on the same computer. These host computers are coupled by a network 214 which may be any of the known networks such as the ETHERNET TM communication protocol, the token ring protocol, etc. A network for exchanging data is not required to practice the TIB ® software, as any method of exchanging data known in the prior art will suffice. Accordingly, shared memory files or shared distributed storage to which the host computers 210 and 212 have equal access will also suffice as the environment in which the teachings of the TIB ® software are applicable.

Each of the host computers 210 and 212 has random access memory and bulk memory such as disk or tape drives associated therewith (not shown). Stored in these memories are the various operating system programs, client application programs, and other programs such as the programs in the libraries that together comprise the communication interface which cause the host computers to perform useful work. The libraries of programs in the communication interface provide basic tools which may be called upon by client applications to do such things as find the location of services that provide data on a particular subject and establish communications with that service using the appropriate communication protocol.

Each of the host computers may also be coupled to user interface devices such as terminals, printers, etc. (not shown).

In the exemplary system shown in FIG. 21, host computer 210 has stored in its memory a client application program 216. Assume that this client application program 216 requires exchanges of data with another client application program or service 218 controlling host computer 212 in order to do useful work. Assume also that the host computers 210 and 212 use different formats for representation of data and that application programs 216 and 218 also use different formats for data representation and organization for the data records created thereby. These data records will usually be referred to herein as forms. Assume also that the data path 214 between the host computers 210 and 212 is comprised of a local area network of the ETHERNET ™ variety.

Each of the host processors 210 and 212 is also programmed with a library of programs, which together comprise the communication interfaces 220 and 222, respectively. The communication interface programs are either linked to the compiled code of the client applications by a linker to generate run time code, or the source code of the communication programs is included with the source code of the client application programs prior to compiling. In any event, the communication library programs are somehow bound to the client application. Thus, if host computer 210 was running two client applications, each client application would be bound to a communication interface module such as module 220.

The purpose of the communications interface module 220 is to decouple application 216 from the details of the data format and organization of data in forms used by application 218, the network address of application 218, and the details of the communication protocol used by application 218, as well as the details of the data format and organization and communication protocol necessary to send data across network 214. Communication interface module 222 serves the same function for application 218, thereby freeing it from the need to known many details about the application 216 and the network 214. The communication interface modules facilitate modularity in that changes can be made in client applications, data formats or organizations, host computers, or the networks used to couple all of the above together without the need for these changes to ripple throughout the system to ensure continued compaTIB ®ility.

In order to implement some of these functions, the communications interfaces 220 and 222 have access via the network 214 to a network file system 224 which includes a subject table 226 and a service table 228. These tables will be discussed in more detail below with reference to the discussion of subject-based addressing. These tables list the network addresses of services that provide information on various subjects.

A "network," as the term is used herein, means the underlying "transport layer" (as the term is used in the ISO network layer model) and all layers beneath the transport layer in the ISO network model. An application can send or receive data across any of the networks to which its host computer is attached.

The communication interface according to the teachings of the TIB ® software, of which blocks 220 and 222 in FIG. 21 are exemplary, includes for each client application to which it is bound a communications component 230 and a data-exchange component 232. The communications component 230 is a common set of communication facilities which implement, for example, subject-based addressing and/or service discipline decoupling. The communications component is linked to each client application. In addition, each communications component is linked to the standard transport layer protocols, e.g., TCP/IP, of the network to which it is coupled. Each communication component is linked to and can support multiple transport layer protocols. The communications component cooperates with the transport layer to provide reliable communications protocols for client applications as well as providing location transparency and network independence to the client applications.

The data-exchange component of the communications interface, of which component 232 is typical, implements a powerful way of representing and transmitting data by encapsulating the data within self-describing data objects called forms. These forms are self-describing in that they include not only the data of interest, but also type or format information which describes the representations used for the data and the organization of the form. Because the forms include this type or format information, format operations to convert a particular form having one format to another format can be done using strictly the data in the form itself without the need for access to other data called class descriptors or class definitions which give semantic information. Semantic information in class descriptors basically means the names of the fields of the form.

The ability to perform format operations solely with the data in the form itself is very important in that it prevents the delays encountered when access must be made to other data objects located elsewhere, such as class descriptors. Since format operations along typically account for 25 to 50% of the processing time for client applications, the use of self-describing objects streamlines processing by rendering it faster.

The self-describing forms managed by the data-exchange component also allow the implementation of generic tools for data manipulation and display. Such tools include communication tools for sending forms between processes in a machine-independent format. Further, since self-describing forms can be extended, i.e., their organization changed or expanded, without adversely impacting the client applications using said forms, such forms greatly facilitate modular application development.

Since the lowest layer of the communications interface is linked with the transport layer of the ISO model and since the communications component 230 includes multiple service disciplines and multiple transport-layer protocols to support multiple networks, it is possible to write application-oriented protocols which transparently switch over from one network to another in the event of a network failure.

A "service" represents a meaningful set of functions which are exported by an application for use by its client applications. Examples of services are historical news retrieval services such as Dow Jones New, Quotron data feed, and a trade ticket router. Applications typically export only one service, although the export of many different services is also possible.

A "service instance" is an application or process capable of providing the given service. For a given service, several "instances" may be concurrently providing the service so as to improve the throughput of the service or provide fault tolerance.

Although networks, services and servers are traditional components known in the prior art, prior art distributed systems do not recognize the notion of a subject space or data independence by self-describing, nested data objects. Subject space supports one form of decoupling called subject-based addressing. Self-describing data objects which may be nested at multiple levels are new. Decoupling of client applications from the various communications protocols and data formats prevalent in other parts of the network is also very useful.

The subject space used to implement subject-based addressing consists of a hierarchical set of subject categories. In the preferred embodiment, a four-level subject space hierachy is used. An example of a typical subject is: "equity.ibm.composite.trade." The client applications coupled to the communications interface have the freedom and responsibility to establish conventions regarding use and interpretations of various subject categories.

Each subject is typically associated with one or more services providing data about that subject in data records stored in the system files. Since each service will have associated with it in the communication components of the communication interface a service discipline, i.e., the communication protocol or procedure necessary to communicate with that service, the client applications may request data regarding a particular subject without knowing where the service instances that supply data on that subject are located on the network by making subscription requests giving only the subject without the network address of the service providing information on that subject. These subscription requests are translated by the communications interface into an actual communication connection with one or more service instances which provide information on that subject.

A set of subject categories is referred to as a subject domain. Multiple subject domains are allowed. Each domain can define domain-specific subject and coding functions for efficiently representing subjects in message headers.

DATA INDEPENDENCE: The Data-Exchange Component

Referring to FIG. 22, there is shown an example of a class definition for a constructed class which defines both format and semantic information which is common to all instances of forms of this class. In the particular example chosen, the form class is named Player_Name and has a class ID of 1000. The instances of forms of this class 1000 include data regarding the names, ages and NTRP ratings for tennis players. Every class definition has associated with it a class number called the class ID which uniquely identifies the class.

The class definition gives a list of fields by name and the data representation of the contents of the field. Each field contains a form and each form may be either primitive or constructed. Primitive class forms store actual data, while constructed class forms have fields which contain other forms which may be either primitive or constructed. In the class definition of FIG. 22, there are four fields named Rating, Age, Last_Name and First_Name. Each field contains a primitive class form so each field in instances of forms of this class will contain actual data. For example, the field Rating will always contain a primitive form of class 11. Class 11 is a primitive class named Floating_Point which specifies a floating-point data representation for the contents of this field. The primitive class definition for the class Floating_Point, class 11, is found in FIG. 25. The class definition of the primitive class 11 contains the class name, Floating_Point, which uniquely identifies the class (the class number, class 11 in this example, also uniquely identifies the class) and a specification of the data representation of the single data value. The specification of the single data value uses well-known predefined system data types which are understood by both the host computer and the application dealing with this class of forms.

Typical specifications for data representation of actual data values include integer, floating point, ASCII character strings or EBCDIC character strings, etc. In the case of primitive class 11, the specification of the data value is Floating_Point_1/1 which is an arbitrary notation indicating that the data stored in instances of forms of this primitive class will be floating-point data having two digits total, one of which is to the right of the decimal point.

Returning to the consideration of the Player_Name class definition of FIG. 22, the second field is named Age. This field contains forms of the primitive class named Integer associated with class number 12 and defined in FIG. 25. The Integer class of form, class 12, has, per the class definition of FIG. 25, a data representation specification of Integer_3, meaning the field contains integer data having three digits. The last two fields of the class 1000 definition in FIG. 22 are Last_Name and First_Name. Both of these fields contain primitive forms of a class named String_Twenty_ASCII, class 10. The class 10 class definition is given in FIG. 25 and specifies that instances of forms of this class contain ASCII character strings which are 20 characters long.

FIG. 23 gives another constructed class definition named Player_Address, class 1001. Instances of forms of this class each contain three fields named Street, City and State. Each of these three fields contains primitive forms of the class named String_20_ASCII, class 10. Again, the class definition for class 10 is given in FIG. 25 and specifies a data representation of 20-character ASCII strings.

An example of the nesting of constructed class forms is given in FIG. 24. FIG. 24 is a class definition for instances of forms in the class named Tournament_Entry, class 1002. Each instance of a form in this class contains three fields named Tournament_Name, Player, and Address. The field Tournament_Name includes forms of the primitive class named String_Twenty_ASCII, class 10 defined in FIG. 25. The field named Player contains instances of constructed forms of the class named Player_Name, class 1000 having the format and semantic characteristics given in FIG. 22. The field named Address contains instances of the constructed form of constructed forms of the constructed class named Player_Address, class 1001, which has the format and semantic characteristics given in the class definition of FIG. 23.

The class definition of FIG. 24 shows how nesting of forms can occur in that each field of a form is a form itself and every form may be either primitive and have only one field or constructed and have several fields. In other words, instances of a form may have as many fields as necessary, and each field may have as many subfields as necessary. Further, each subfield may have as many sub-subfields as necessary. This nesting goes on for any arbitrary number of levels. This data structure allows data of arbitrary complexity to be easily represented and manipulated.

Figures 26, 27:
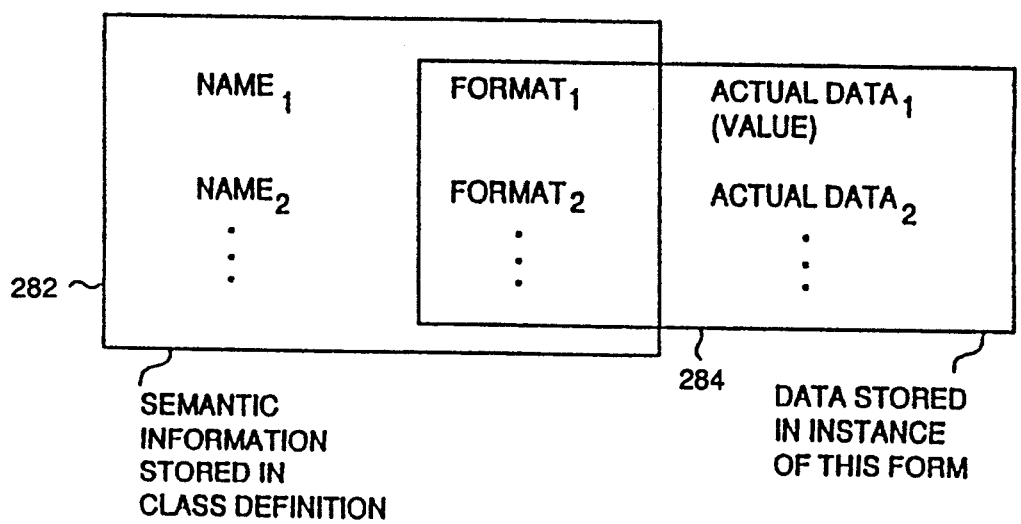
FIG. 26 is an example of a typical form instance as it is stored in memory.
FIG. 27 illustrates the partitioning of semantic data, format data, and actual or value data between the form-class definition and the form instance.

Referring to FIG. 26 there is shown an instance of a form of the class of forms named Tournament_Entry, class 1002, as stored as an object in memory. The block of data 38 contains the constructed class number 1002 indicating that this is an instance of a form of the constructed class named Tournament_Entry. The block of data 40 indicates that this class of form has three fields.

Those three fields have blocks of data shown at 42, 44, and 46 containing the class numbers of the forms in these fields. The block of data at 42 indicates that the first field contains a form of class 10 as shown in FIG. 25. A class 10 form is a primitive form containing a 20-character string of ASCII characters as defined in the class definition for class 10 in FIG. 25. The actual string of ASCII characters for this particular instance of this form is shown at 248, indicating that this is a tournament entry for the U.S. Open tennis tournament. The block of data at 244 indicates that the second field contains a form which is an instance of a constructed form of class 1000. Reference to this class definition shows that this class is named Player_Name. The block of data 250 shows that this class of constructed form contains four subfields. Those fields contain forms of the classes recorded in the blocks of data shown at 252, 254, 256 and 258. These fields would be subfields of the field 244. The first subfield has a block of data at 252, indicating that this subfield contains a form of primitive class 11. This class of form is defined in FIG. 25 as containing a floating-point two-digit number with one decimal place. The actual data for this instance of the form is shown at 260, indicating that this player has an NTRP rating of 3.5. The second subfield has a block of data at 254, indicating that this subfield contains a form of primitive class 12. The class definition for this class indicates that the class is named integer and contains integer data. The class definition for class 1000 shown in FIG. 22 indicates that this integer data, shown at block 262, is the player's age. Note that the class definition semantic data regarding field names is not stored in the form instance. Only the format or type information is stored in the form instance in the form of the class ID for each field.

The third subfield has a block of data at 256, indicating that this subfield contains a form of primitive class 10 named String_20_ASCII. This subfield corresponds to the field Last_Name in the form of class Player_Name, class 1000, shown in FIG. 22. The primitive class 10 class definition specifies that instances of this primitive class contain a 20-character ASCII string. This string happens to define the player's last name. In the instance shown in FIG. 26, the player's last name is Blackett, as shown at 264.

The last subfield has a block of data at 258, indicating that the field contains a primitive form of primitive class 10 which is a 20-character ASCII string. This subfield is defined in the class definition of class 1000 as containing the player's first name. This ASCII string is shown at 266.

The third field in the instance of the form of class 1002 has a block of data at 246, indicating that this field contains a constructed form of the constructed class 1001. The class definition for this class is given in FIG. 23 and indicates the class is named Player_Address. The block of data at 268 indicates that this field has three subfields containing forms of the class numbers indicated at 270, 272 and 274. These subfields each contain forms of the primitive class 10 defined in FIG. 25. Each of these subfields therefore contains a 20-character ASCII string. The contents of these three fields are defined in the class definition for class 1001 and are, respectively, the street, city and state entries for the address of the player named in the field 44. These 3-character strings are shown at 276, 278 and 280, respectively.

Referring to FIG. 27, there is shown a partition of the semantic information, format information and actual data between the class definition and instances of forms of this class. The field name and format or type information are stored in the class definition, as indicated by box 282. The format or type information (in the form of the class ID) and actual data or field values are stored in the instance of the form as shown by box 272. For example, in the instance of the form of class Tournament_Entry, class 1002 shown in FIG. 26, the format data for the first field is the data stored in block 242, while the actual data for the first field is the data shown at block 248. Essentially, the class number or class ID is equated by the communications interface with the specification for the type of data in instances of forms of that primitive class. Thus, the communications interface can perform format operations on instances of a particular form using only the format data stored in the instance of the form itself without the need for access to the class definition. This speeds up format operations by eliminating the need for the performance of the steps required to access a class definition which may include network access and/or disk access, which would substantially slow down the operation. Since format-type operations comprise the bulk of all operations in exchanging data between foreign processes, the data structure and the library of programs to handle the data structure defined herein greatly increase the efficiency of data exchange between foreign processes and foreign computers. For example, suppose that the instance of the form shown in FIG. 26 has been generated by a process running on a computer by Digital Equipment Corporation (DEC) and therefore text is expressed in ASCII characters. Suppose also that this form is to be sent to a process running on an IBM computer, where character strings are expressed in EBCDIC code. Suppose also that these two computers were coupled by a local area network using the ETHERNET TM communications protocol.

To make this transfer, several format operations would have to be performed. These format operations can best be understood by reference to FIG. 21 with the assumption that the DEC computer is host 1 shown at 210 and the IBM computer is host 2 shown at 212.

The first format operation to transfer the instance of the form shown in FIG. 26 from application 216 to application 218 would be a conversion from the format shown in FIG. 26 to a packed format suitable for transfer via network 214. Networks typically operate on messages comprised of blocks of data comprising a plurality of bytes packed together end to end preceded by multiple bytes of header information which include such things as the message length, the destination address, the source address, and so on, and having error correction code bits appended to the end of the message. Sometimes delimiters are used to mark the start and end of the actual data block.

The second format operation which would have to be performed in this hypothetical transfer would be a conversion from the packed format necessary for transfer over network 214 to the format used by the application 218 and the host computer 212.

Format operations are performed by the forms-manager modules of the communications interface. For example, the first format operation in the hypothetical transfer would be performed by the forms-manager module 286 in FIG. 21, while the second format operation in the hypothetical transfer would be performed by the forms-manager module in the data-exchange component 288.

Figure 28:
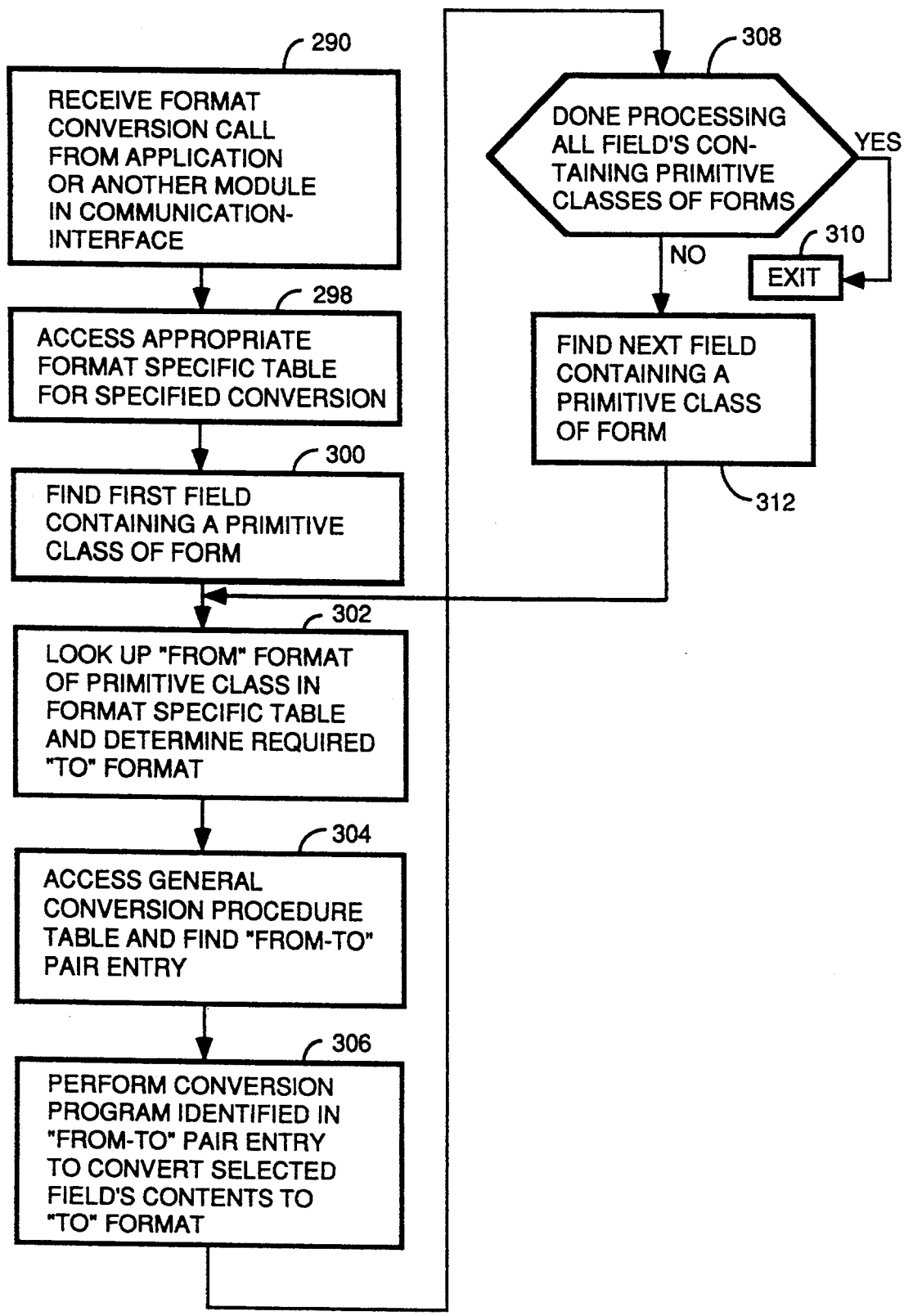
FIG. 28 is a flow chart of processing during a format operation.

Referring to FIG. 28, there is shown a flowchart of the operations performed by the forms-manager modules in performing format operations. Further details regarding the various functional capabilities of the routines in the forms-manager modules of the communications interface will be found in the functional specifications for the various library routines of the communications interface included herein. The process of FIG. 28 is implemented by the software programs in the forms-manager modules of the data-exchange components in the communications interface according to the teachings of the TIB ® software. The first step is to receive a format conversion call from either the application or from another module in the communications interface. This process is symbolized by block 290 and the pathways 292 and 294 in FIG. 21. The same type call can be made by the application 218 or the communications component 296 for the host computer 212 in FIG. 21 to the forms-manager module in the data-exchange component 288, since this is a standard functional capability or "tool" provided by the communication interface of the TIB ® software to all client applications. Every client application will be linked to a communication interface like interface 220 in FIG. 21.

Typically, format conversion calls from the communication components such as modules 230 and 296 in FIG. 21 to the forms-manager module will be from a service discipline module which is charged with the task of sending a form in format 1 to a foreign application which uses format 2. Another likely scenario for a format conversion call from another module in the communication interface is when a service discipline has received a form from another application or service which is in a foreign format and which needs to be converted to the format of the client application.

The format conversion call will have parameters associated with it which are given to the forms manager. These parameters specify both the "from" format and the "to" or "target" format.

Block 298 represents the process of accessing an appropriate target format-specific table for the specified conversion, i.e., the specified "from" format and the specified "to" format will have a dedicated table that gives details regarding the appropriate target format class for each primitive "from" format class to accomplish the conversion. There are two tables which are accessed sequentially during every format conversion operation in the preferred embodiment. In alternative embodiments, these two tables may be combined. Examples of the two tables used in the preferred embodiment are shown in FIGS. 29, 30 and 31. FIG. 29 shows a specific format conversion table for converting from DEC machines to X.409 format. FIG. 30 shows a format-specific conversion table for converting from X.409 format to IBM machine format. FIG. 31 shows a general conversion procedures table identifying the name of the conversion program in the communications interface library which performs the particular conversion for each "from"–"to" format pair.

The tables of FIGS. 29 and 30 probably would not be the only tables necessary for sending a form from the application 216 to the application 218 in FIG. 21. There may be further format-specific tables necessary for conversion from application 216 format to DEC machine format and for conversion from IBM machine format to application 218 format. However, the general concept of the format conversion process implemented by the forms-manager modules of the communications interface can be explained with reference to FIGS. 29, 30 and 31.

Assume that the first conversion necessary in the process of sending a form from application 216 to application 218 is a conversion from DEC machine format to a packed format suitable for transmission over an ETHERNET TM network. In this case, the format conversion call received in step 290 would invoke processing by a software routine in the forms-manager module which would perform the process symbolized by block 298.

In this hypothetical example, the appropriate format-specific table to access by this routine would be determined by the "from" format and "to" format parameters in the original format conversion call received by block 290. This would cause access to the table shown in FIG. 29. The format conversion call would also identify the address of the form to be converted.

The next step is symbolized by block 300. This step involves accessing the form identified in the original format conversion call and searching through the form to find the first field containing a primitive class of form. In other words, the record is searched until a field is found storing actual data as opposed to another constructed form having subfields.

In the case of the form shown in FIG. 26, the first field storing a primitive class of form is field 242. The "from" column of the table of FIG. 29 would be searched using the class number 10 until the appropriate entry was found. In this case, the entry for a "from" class of 10 indicates that the format specified in the class definition for primitive class 25 is the "to" format. This process of looking up the "to" format using the "from" format is symbolized by block 302 in FIG. 28. The table shown in FIG. 29 may be "hardwired" into the code of the routine which performs the step symbolized by block 302.

Alternatively, the table of FIG. 29 may be a database or other file stored somewhere in the network file system 224 in FIG. 21. In such a case, the routine performing the step 302 in FIG. 28 would know the network address and file name for the file to access for access to the table of FIG. 29.

Next, the process symbolized by block 304 in FIG. 28 is performed by accessing the general conversion procedures table shown in FIG. 21. This is a table which identifies the conversion program in the forms manager which performs the actual work of converting one primitive class of form to another primitive class of form. This table is organized with a single entry for every "from"–"to" format pair. Each entry in the table for a "from"–"to" pair includes the name of the conversion routine which does the actual work of the conversion. The process symbolized by block 304 comprises the steps of taking the "from"–"to" pair determined from access to the format-specific conversion table in step 302 and searching the entries of the general conversion procedures table until an entry having a "from"–"to" match is found. In this case, the third entry from the top in the table of FIG. 31 matches the "from"–"to" format pair found in the access to FIG. 29. This entry is read, and it is determined that the name of the routine to perform this conversion is ASCII_ETHER. (In many embodiments, the memory address of the routine, opposed to the name, would be stored in the table.)

Block 306 in FIG. 28 symbolizes the process of calling the conversion program identified by step 304 and performing this conversion routine to change the contents of the field selected in step 300 to the "to" or target format identified in step 302. In the hypothetical example, the routine ASCII_ETHER would be called and performed by step 306. The call to this routine would deliver the actual data stored in the field selected in the process of step 300, i.e., field 242 of the instance of a form shown in FIG. 26, such that the text string "U.S. Open" would be converted to a packed ETHERNET TM format.

Next, the test of block 308 is performed to determine if all fields containing primitive classes of forms have been processed. If they have, then format conversion of the form is completed, and the format conversion routine is exited as symbolized by block 310.

If fields containing primitive classes of forms remain to be processed, then the process symbolized by block 312 is performed. This process finds the next field containing a primitive class of form.

Thereafter, the processing steps symbolized by blocks 302, 304, 306, and 308 are performed until all fields containing primitive classes of forms have been converted to the appropriate "to" format.

As noted above, the process of searching for fields containing primitive classes of forms proceeds serially through the form to be converted. If the next field encountered contains a form of a constructed class, that class of form must itself be searched until the first field therein with a primitive class of form is located. This process continues through all levels of nesting for all fields until all fields have been processed and all data stored in the form has been converted to the appropriate format. As an example of how this works, in the form of FIG. 26, after processing the first field 242, the process symbolized by block 312 in FIG. 28 would next encounter the field 244 (fields will be referred to by the block of data that contain the class ID for the form stored in that field although the contents of the field are both the class ID and the actual data or the fields and subfields of the form stored in that field). Note that in the particular class of form represented by FIG. 26, the second field 244 contains a constructed form comprised of several subfields. Processing would then access the constructed form of class 1000 which is stored by the second field and proceeds serially through this constructed form until it locates the first field thereof which contains a form of a primitive class. In the hypothetical example of FIG. 26, the first field would be the subfield indicated by the class number 11 at 252. The process symbolized by block 302 would then look up class 11 in the "from" column in the table of FIG. 29 and determine that the target format is specified by the class definition of primitive class 15. This "from"-"to" pair 11-15 would then be compared to the entries of the table of FIG. 31 to find a matching entry. Thereafter, the process of block 306 in FIG. 28 would perform the conversion program called Float1_ETHER to convert the block of data at 260 in FIG. 26 to the appropriate ETHERNET TM packed format. The process then would continue through all levels of nesting.

Figure 32:
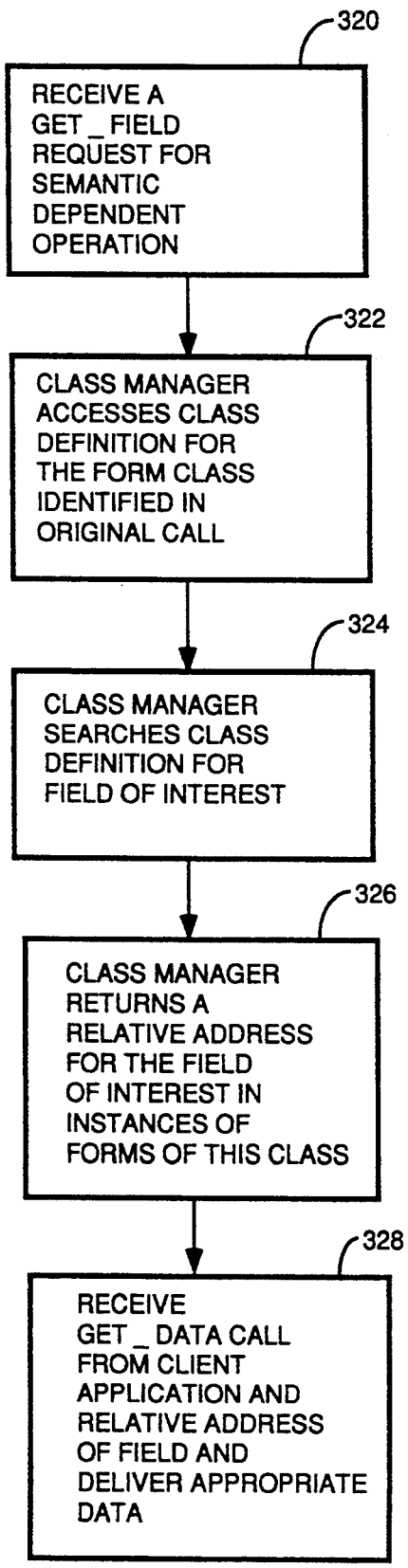
FIG. 32 is a flow chart for a typical semantic-dependent operation.

Referring to FIG. 32, there is shown a flowchart for a typical semantic-dependent operation. Semantic-dependent operations allow decoupling of applications by allowing one application to get the data in a particular field of an instance of a form generated by a foreign application provided that the field name is known and the address of the form instance is known. The communications interface according to the teachings of the TIB ® software receives semantic-dependent operation requests from client applications in the form of Get_ Field calls in the preferred embodiment where all processes use the same field names for data fields which mean the same thing (regardless of the organization of the form or the data representation of the field in the form generated by the foreign process). In alternative embodiments, an aliasing or synonym table or data base is used. In such embodiments, the Get Field call is used to access the synonym table in the class manager and looks for all synonyms of the requested field name. All field names which are synonyms of the requested field name are returned. The class manager then searches the class definition for a match with either the requested field name or any of the synonyms and retrieves the field having the matching field name.

Returning to consideration of the preferred embodiment, such Get_Field calls may be made by client applications directly to the forms-class manager modules such as the module 322 in FIG. 21, or they may be made to the communications components or forms-manager modules and transferred by these modules to the forms-class manager. The forms-class manager creates, destroys, manipulates, stores and reads form-class definitions.

A Get_Field call delivers to the forms-class manager the address of the form involved and the name of the field in the form of interest. The process of receiving such a request is symbolized by block 320 in FIG. 32. Block 320 also symbolizes the process by which the class manager is given the class definition either programmatically, i.e., by the requesting application, or is told the location of a data base where the class definitions including the class definition for the form of interest may be found. There may be several databases or files in the network file system 224 of FIG. 21 wherein class definitions are stored. It is only necessary to give the forms-class manager the location of the particular file in which the class definition for the form of interest is stored.

Next, as symbolized by block 322, the class-manager module accesses the class definition for the form class identified in the original call.

The class manager then searches the class definition field names to find a match for the field name given in the original call. This process is symbolized by block 324.

After locating the field of interest in the class definition, the class manager returns a relative address pointer to the field of interest in instances of forms of this class. This process is symbolized by block 326 in FIG. 32. The relative address pointer returned by the class manager is best understood by reference to FIGS. 22, 24 and 26. Suppose that the application which made the Get_ Field call was interested in determining the age of a particular player. The Get_Field request would identify the address for the instance of the form of class 1002 for player Blackett as illustrated in FIG. 26. Also included in the Get_Field request would be the name of the field of interest, i.e., "age". The class manager would then access the instance of the form of interest and read the class number identifying the particular class descriptor or class definition which applied to this class of forms. The class manager would then access the class descriptor for class 1002 and find a class definition as shown in FIG. 24. The class manager would then access the class definitions for each of the fields of class definition 1002 and would compare the field name in the original Get_Field request to the field names in the various class definitions which make up the class definition for class 1002. In other words, the class manager would compare the names of the fields in the class definitions for classes 10, 1000, and 1001 to the field name of interest, "Age". A match would be found in the class definition for class 1000 as seen from FIG. 22. For the particular record format shown in FIG. 26, the "Age" field would be the block of data 262, which is the tenth block of data in from the start of the record. The class manager would then return a relative address pointer pointing to the "age" field as symbolized by the processing in block 326 of FIG. 32. This relative address pointer is returned to the client application which made the original Get_Field call. The client application then issues a Get_Data call to the forms-manager module and delivers to the forms-manager module the relative address of the desired field in the particular instance of the form of interest. The forms-manager module must also know the address of the instance of the form of interest which it will already have if the original Get_Field call came through the forms-manager module and was transferred to the forms-class manager. If the forms-manager module does not have the address of the particular instance of the form of interest, then the forms manager will request it from the client application. After receiving the Get_Data call and obtaining the relative address and the address of the instance of the form of interest, the forms manager will access this instance of the form and access the requested data and return it to the client application. This process of receiving the Get_Data call and returning the appropriate data is symbolized by block 128 in FIG. 32.

Normally, class-manager modules store the class definitions needed to do semantic-dependent operations in RAM of the host machine as class descriptors. Class definitions are the specification of the semantic and formation information that define a class. Class descriptors are memory objects which embody the class definition. Class descriptors are stored in at least two ways. In random access memory (RAM), class descriptors are stored as forms in the format native to the machine and client application that created the class definition. Class descriptors stored on disk or tape are stored as ASCII strings of text.

When the class-manager module is asked to do a semantic-dependent operation, it searches through its store of class descriptors in RAM and determines if the appropriate class descriptor is present. If it is, this class descriptor is used to perform the operation detailed above with reference to FIG. 32. If the appropriate class descriptor is not present, the class manager must obtain it. This is done by searching through known files of class descriptors stored in the system files 224 in FIG. 21 or by making a request to the foreign application that created the class definition to send the class definition to the requesting module. The locations of the files storing class descriptors are known to the client applications, and the class-manager modules also store these addresses. Often, the request for a semantic-dependent operation includes the address of the file where the appropriate class descriptor may be found. If the request does not contain such an address, the class manager looks through its own store of class descriptors and through the files identified in records stored by the class manager identifying the locations of system class desciptors files.

If the class manager asks for the class descriptor from the foreign application that generated it, the foreign application sends a request to its class manager to send the appropriate class descriptor over the network to the requesting class manager or the requesting module. The class descriptor is then sent as any other form and used by the requesting class manager to do the requested semantic-dependent operation.

If the class manager must access a file to obtain a class desciptor, it must also covert the packed ASCII representation in which the class descriptors are stored on disk or tape to the format of a native form for storage in RAM. This is done by parsing the ASCII text to separate out the various field names and specifications of the field contents and the class numbers.

Figures 33A, 33B:
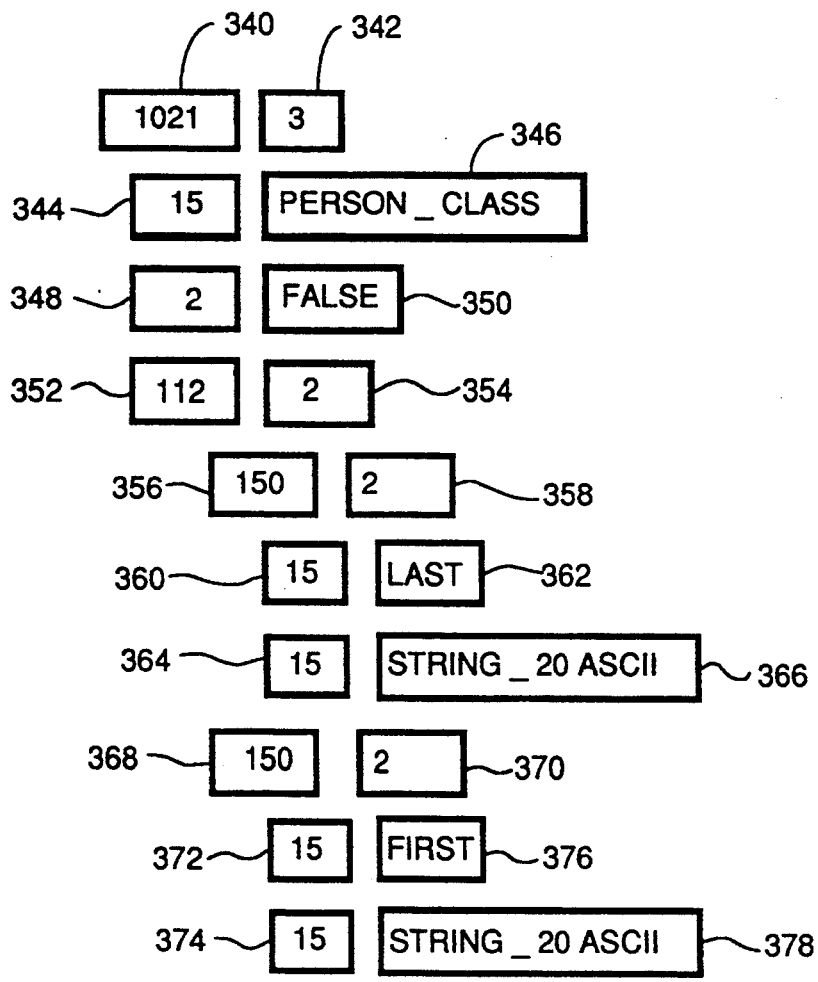
FIGS. 33A and 33B are, respectively, a class definition and the class descriptor form which stores this class definition.

FIGS. 33A and 33B illustrate, respectively, a class definition and the structure and organization of a class descriptor for the class definition of FIG. 33A and stored in memory as a form. The class definition given in FIG. 33A is named Person_Class and has only two fields, named last and first. Each of these fields is specified to store a 20-character ASCII string.

FIG. 33B has a data block 340 which contains 1021 indicating that the form is a constructed form having a class number 1021. The data block at 342 indicates that the form has 3 fields. The first field contains a primitive class with a class identifier (15) stored in data block 344 specified to contain an ASCII string which happens to store the class name, Person_Class, in data block 346. The second field is of a primitive class assigned the number 2, data block 348, which is specified to contain a boolean value, data block 350. Semantically, the second field is defined in the class definition for class 1021 to define whether the form class is primitive (true) or constructed (false). In this case, data block 350 is false indicating that class 1021 is a constructed class. The third field is a constructed class given the class number 112 as shown by data block 352. The class definition for class 1021 defines the third field as a constructed class form which gives the names and specifications of the fields in the class definition. Data block 354 indicates that two fields exist in a class 112 form. The first field of class 112 is itself a constructed class given the class number 150, data block 356, and has two subfields, data block 358. The first subfield is a primitive class 15, data block 360, which is specified in the class definition for class 150 to contain the name of the first field in class 1021. Data block 362 gives the name of the first field in class 1021. The second subfield is of primitive class 15, data block 364, and is specified in the class definition of class 150 (not shown) to contain an ASCII string which specifies the representation, data block 366, of the actual data stored in the first field of class 1021. The second field of class 112 is specified in the class definition of class 112 to contain a constructed form of class 150, data block 368, which has two fields, data block 370, which give the name, data block 376, class 15 as indicated in data block 372, of the next field in class 1021 and specify the type of representation, data block 378, class 15 as indicated in data block 374, of the actual data stored in this second field.

DATA DISTRIBUTION AND SERVICE PROTOCOL DECOUPLING BY SUBJECT-BASED ADDRESSING AND THE USE OF SERVICE DISCIPLINE PROTOCOL LAYERS

Figure 34:
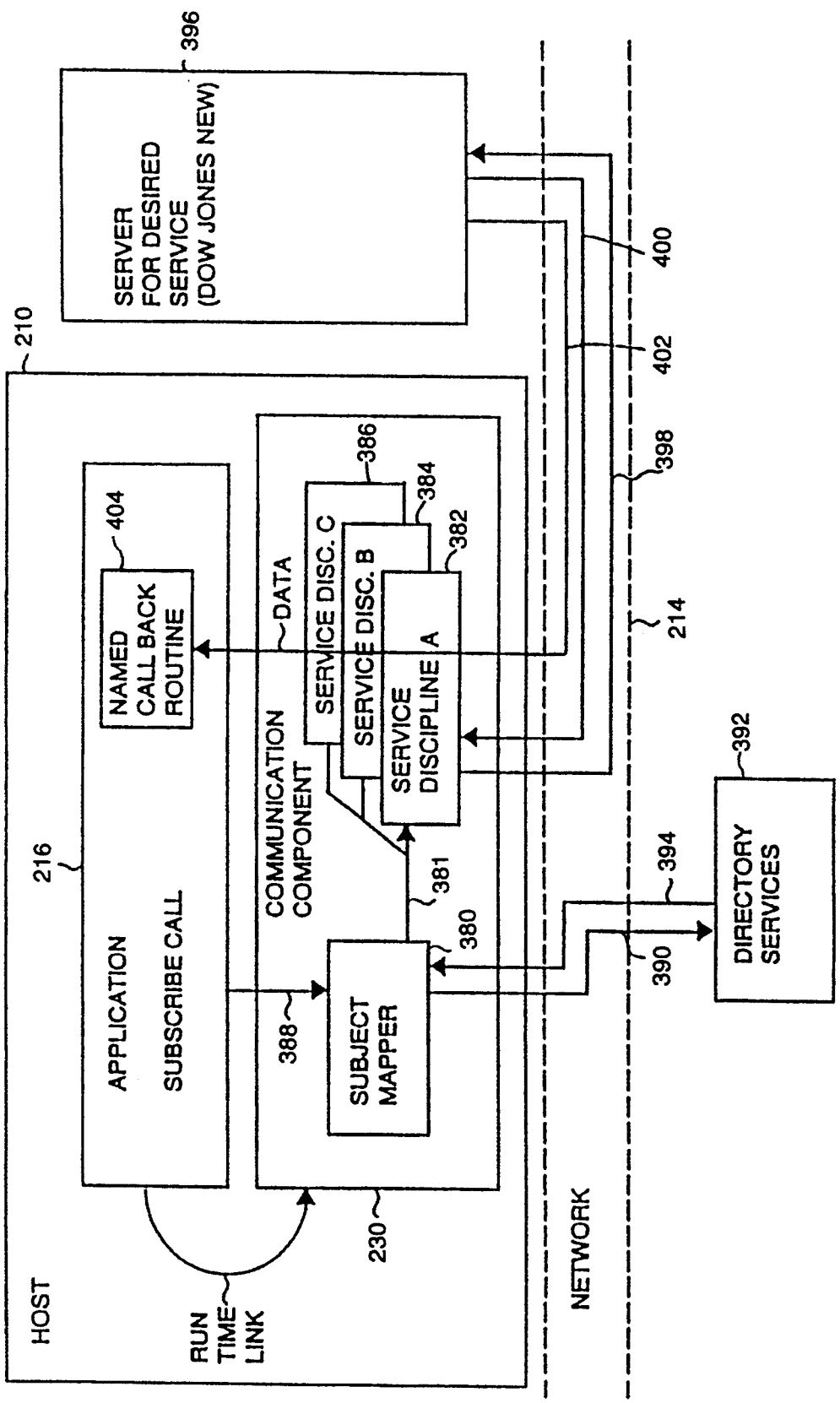
FIG. 34 is a block diagram illustrating the relationships between the subject-mapper module and the service discipline modules of the communication component to the requesting application and the service for subject-based addressing.

Referring to FIG. 34, there is shown a block diagram of the various software modules, files, networks, and computers which cooperate to implement two important forms of decoupling. These forms of decoupling are data distribution decoupling and service protocol decoupling. Data distribution decoupling means freeing client applications from the necessity to know the network addresses for servers providing desired services. Thus, if a particular application needs to known information supplied by, for example, the Dow Jones news service, the client application does not need to know which servers and which locations are providing data from the Dow Jones news service raw data feed.

Service protocol decoupling means that the client applications need not know the particular communications protocols used by the servers, services or other applications with which exchanges of data are desired.

Data distribution decoupling is implemented by the communications module 230 in FIG. 34. The communications component is comprised of a library of software routines which implement a subject mapper 380 and a plurality of service disciplines to implement subject-based addressing. Service disciplines 382, 384 and 386 are exemplary of the service disciplines involved in subject-based addressing.

Subject-based addressing allows services to be modified or replaced by alternate services providing equivalent information without impacting the information consumers. This decoupling of the information consumers from information providers permits a higher degree of modularization and flexibility than that provided by traditional service-oriented models.

Subject-based addressing starts with a subscribe call 388 to the subject mapper 380 by a client application 216 running on host computer 210. The subscribe call is a request for information regarding a particular subject. Suppose hypothetically that the particular subject was equity.IBM.news. This subscribe call would pass two parameters to the subject mapper 380. One of these parameters would be the subject equity.IBM.news. The other parameter would be the name of a callback routine in the client application 216 to which data regarding the subject is to be passed. The subscribe call to the subject mapper 380 is a standard procedure call.

The purpose of the subject mapper is to determine the network address for services which provide information on various subjects and to invoke the appropriate service discipline routines to establish communications with those services. To find the location of the services which provide information regarding the subject in the subscribe call, the subject mapper 380 sends a request symbolized by line 390 to a directory-services component 392. The directory-services component is a separate process running on a computer coupled to the network 214 and in fact may be running on a separate computer or on the host computer 210 itself. The directory-services routine maintains a data base or table of records called service records which indicate which services supply information on which subjects, where those services are located, and the service disciplines used by those services for communication. The directory-services component 392 receives the request passed from the subject mapper 380 and uses the subject parameter of that request to search through its tables for a match. That is, the directory-services component 392 searches through its service records until a service record is found indicating a particular service or services which provide information on the desired subject. This service record is then passed back to the subject mapper as symbolized by line 394. The directory-services component may find several matches if multiple services supply information regarding the desired subject.

The service record or records passed back to the subject mapper symbolized by line 394 contain many fields. Two required fields in the service records are the name of the service which provides information on the desired subject and the name of the service discipline used by that service. Other optional fields which may be provided are the name of the server upon which said service is running and a location on the network of that server.

Generally, the directory-services component will deliver all the service records for which there is a subject map, because there may not be a complete overlap in the information provided on the subject by all services. Further, each service will run on a separate server which may or may not be coupled to the client application by the same network. If such multiplicity of network paths and services exists, passing all the service records with subject matter matches back to the subject mapper provides the ability for the communications interface to switch networks or switch servers or services in the case of failure of one or more of these items.

As noted above, the subject mapper 380 functions to set up communications with all of the services providing information on the desired subject. If multiple service records are passed back from the directory-services module 392, then the subject mapper 380 will set up communications with all of these services.

Upon receipt of the service records, the subject mapper will call each identified service discipline and pass to it the subject and the service record applicable to that service discipline. Although only three service disciplines 382, 384 and 386 are shown in FIG. 34, there may be many more than three in an actual system.

In the event that the directory-services component 392 does not exist or does not find a match, no service records will be returned to the subject mapper 380. In such a case, the subject mapper will call a default service discipline and pass it and the subject and a null record.

Each service discipline is a software module which contains customized code optimized for communication with the particular service associated with that service discipline.

Each service discipline called by the subject mapper 380 examines the service records passed to it and determines the location of the service with which communications are to be established. In the particular hypothetical example being considered, assume that only one service record is returned by the directory-services module 392 and that service record identifies the Dow Jones news service running on server 396 and further identifies service discipline A at 382 as the appropriate service discipline for communications with the Dow Jones news service on server 396. Service discipline A will then pass a request message to server 396 as symbolized by line 398. This request message passes the subject to the service and may pass all or part of the service record.

The server 396 processes the request message and determines if it can, in fact, supply information regarding the desired subject. It then sends back a reply message symbolized by line 400.

Once communications are so established, the service sends all items of information pertaining to the requested subject on a continual basis to the appropriate service discipline as symbolized by path 402. In the example chosen here, the service running on server 396 filters out only those news items which pertain to IBM for sending to service discipline at 382. In other embodiments, the server may pass along all information it has without filtering this information by subject. The communications component 230 then filters out only the requested information and passes it along to the requesting application 216. In some embodiments this is done by the daemon to be described below, and in other embodiments, it is done elsewhere such as in the information or service layers to be described below.

Each service discipline can have a different behavior. For example, service discipline B at 384 may have the following behavior. The service running on server 396 may broadcast all news items of the Dow Jones news service on the network 214. All instances of service discipline B may monitor the network and filter out only those messages which pertain to the desired subject. Many different communication protocols are possible.

The service discipline A at 382 receives the data transmitted by the service and passes it to the named callback routine 404 in the client application 216. (The service discipline 382 was passed the name of the callback routine in the initial message from the mapper 380 symbolized by line 381.) The named callback routine then does whatever it is programmed to do with the information regarding the desired subject.

Data will continue to flow to the named callback routine 404 in this manner until the client application 216 expressly issues a cancel command to the subject mapper 380. The subject mapper 380 keeps a record of all subscriptions in existence and compares the cancel command to the various subscriptions which are active. If a match is found, the appropriate service discipline is notified of the cancel request, and this service discipline then sends a cancel message to the appropriate server. The service then cancels transmission of further data regarding that subject to the service discipline which sent the cancel request.

It is also possible for a service discipline to stand alone and not be coupled to a subject mapper. In this case the service discipline or service disciplines are linked directly to the application, and subscribe calls are made directly to the service discipline. The difference is that the application must know the name of the service supplying the desired data and the service discipline used to access the service. A database or directory-services table is then accessed to find the network address of the identified service, and communications are established as defined above. Although this software architecture does not provide data distribution decoupling, it does provide service protocol decoupling, thereby freeing the application from the necessity to know the details of the communications interface with the service with which data is to be exchanged.

More details on subject-based addressing subscription services provided by the communications interface according to the teachings of the TIB ® software are given in Section 4 of the communications interface specification given below. The preferred embodiment of the communications interface of the TIB ® software is constructed in accordance with that specification.

An actual subscribe function in the preferred embodiment is done by performing the TIB ®_Consume_Create library routine described in Section 4 of the specification. The call to TIB ®_Consume_Create includes a property list of parameters which are passed to it, one of which is the identity of the callback routine specified as My_Message_Handler in Section 4 of the specification.

In the specification, the subject-based addressing subscription service function is identified as TIB-®INFO. The TIB ®INFO interface consists of two libraries. The first library is called TIB ®INFO_CONSUME for data consumers. The second library is called TIB ®INFO_PUBLISH for data providers. An application includes one library or the other or both depending on whether it is a consumer or a provider or both. An application can simultaneously be a consumer and a provider.

Figure 35:
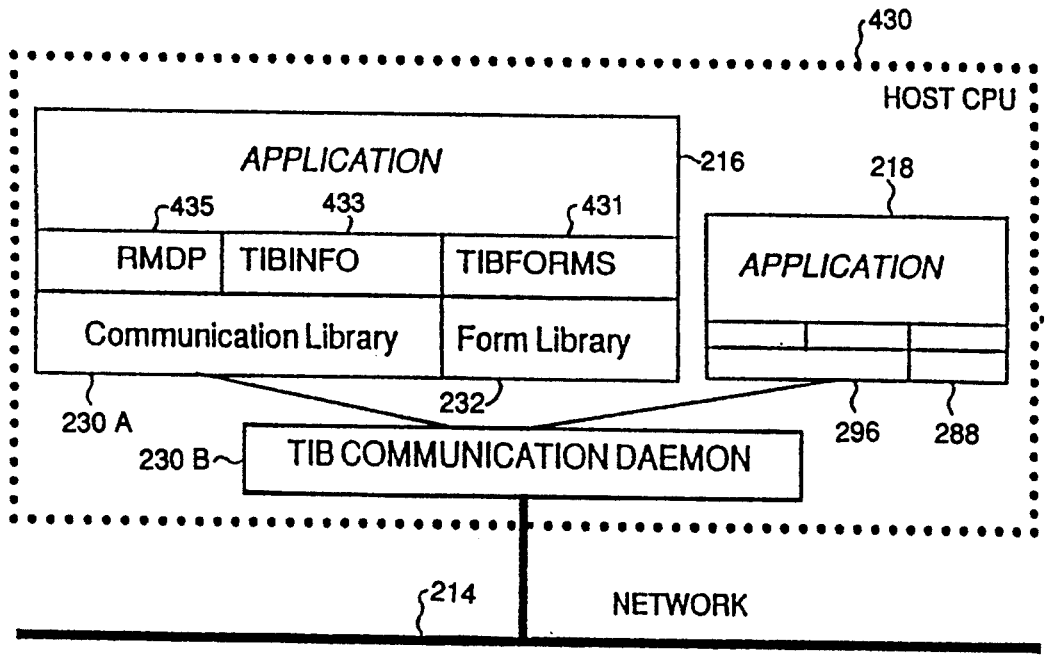
FIG. 35 illustrates the relationship of the various modules, libraries and interfaces of an alternative embodiment of the invention to the client applications.

Referring to FIG. 35, there is shown a block diagram of the relationship of the communications interface according to the teachings of the TIB ® software to the applications and the network that couples these applications. Blocks having identical reference numerals to blocks in FIG. 21 provide similar functional capabilities as those blocks in FIG. 21. The block diagram in FIG. 35 shows the process architecture of the preferred embodiment. The software architecture corresponding to the process architecture given in FIG. 35 is shown in block form in FIG. 36.

Figure 36:
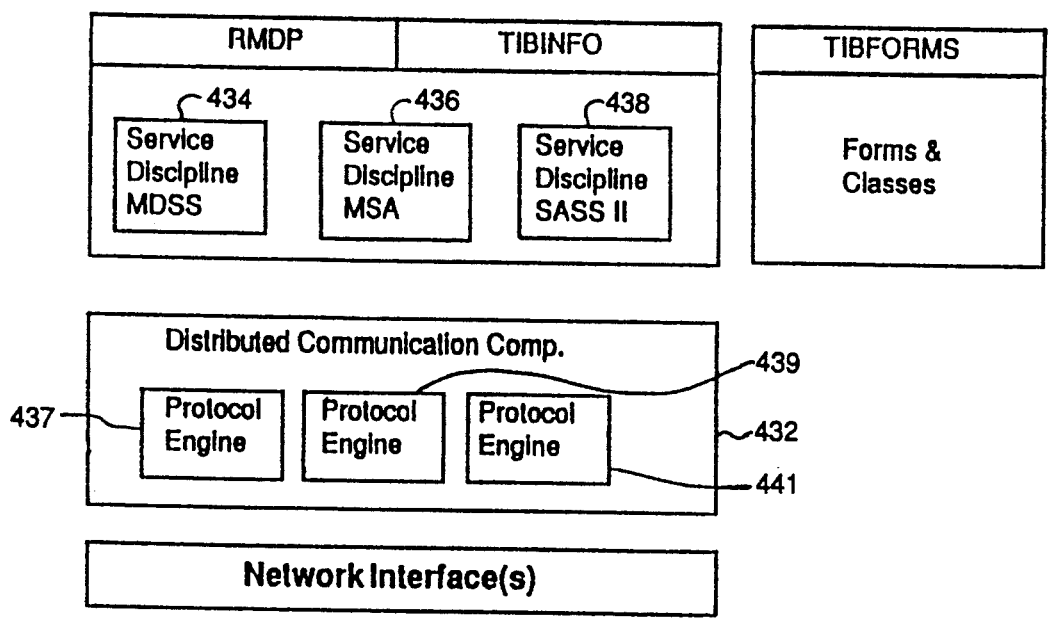
FIG. 36 illustrates the relationships of various modules inside the communication interface of an alternative embodiment.

The software architecture and process architecture detailed in FIGS. 35 and 36, respectively, represents an alternative embodiment to the embodiment described above with reference to FIGS. 21-34.

Referring to FIG. 35, the communications component 230 of FIG. 21 is shown as two separate functional blocks 230A and 230B in FIG. 35. That is, the functions of the communications component 30 in FIG. 21 are split in the process architecture of FIG. 35 between two functional blocks. A communications library 230A is linked with each client application 216, and a back end communications daemon process 230B is linked to the network 214 and to the communication library 230A. There is typically one communication daemon per host processor. This host processor is shown at 430 in FIG. 35 but is not shown at all in FIG. 36. Note that in FIG. 35, unlike the situation in FIG. 21, the client applications 216 and 218 are both running on the same host processor 430. Each client application is linked to its own copies of the various library programs in the communication libraries 230A and 296 and the form library of the data-exchange components 232 and 288. These linked libraries of programs share a common communication daemon 230B.

The communication daemons on the various host processors cooperate among themselves to insure reliable, efficient communication between machines. For subject addressed data, the daemons assist in its efficient transmission by providing low level system support for filtering messages by subject. The communication daemons implement various communication protocols described below to implement fault tolerance, load balancing and network efficiency.

The communication library 230A performs numerous functions associated with each of the application-oriented communication suites. For example, the communication library translates subjects into efficient message headers that are more compact and easier to check than ASCII subject values. The communications library also maps service requests into requests targeted for particular service instances, and monitors the status of those instances.

The data-exchange component 232 of the communications interface according to the teachings of the TIB ® software is implemented as a library called the "form library." This library is linked with the client application and provides all the core functions of the data-exchange component. The form library can be linked independently of the communication library and does not require the communication daemon 230B for its operation.

The communication daemon serves in two roles. In the subject-based addressing mode described above where the service instance has been notified of the subject and the network address to which data is to be sent pertaining to this subject, the communication daemon 230B owns the network address to which the data is sent. This data is then passed by the daemon the communication library bound to the client application, which in turn passes the data to the appropriate callback routine in the client application. In another mode, the communication daemon filters data coming in from the network 214 by subject when the service instances providing data are in a broadcast mode and are sending out data regarding many different subjects to all daemons on the network.

The blocks 431, 433 and 435 in FIG. 35 represent the interface functions which are implemented by the programs in the communication library 230A and the form library 232. The TIB ®INFO interface 433 provides subject-based addressing services by the communication paradigm known as the subscription call. In this paradigm, a data consumer subscribes to a service or subject and in return receives a continuous stream of data about the service or subject until the consumer explicitly terminates the subscription (or a failure occurs). A subscription paradigm is well suited to real time applications that monitor dynamically changing values, such as a stock price. In contrast, the more traditional request/reply communication is ill suited to such realtime applications, since it requires data consumers to "poll" data providers to learn of changes.

The interface 435 defines a programmatic interface to the protocol suite and service comprising the Market Data Subscription Service (MDSS) sub-component 434 in FIG. 36. This service discipline will be described more fully later. The RMDP interface 435 is a service address protocol in that it requires the client application to know the name of the service with which data is to be exchanged.

In FIG. 36 there is shown the software architecture of the system. A distributed communications component 432 includes various protocol engines 437, 439 and 441. A protocol engine encapsulates a communication protocol which interfaces service discipline protocols to the particular network protocols. Each protocol engine encapsulates all the logic necessary to establish a highly reliable, highly efficient communication connection. Each protocol engine is tuned to specific network properties and specific applications properties. The protocol engines 437, 439 and 441 provide a generic communication interface to the client applications such as applications 216 and 218. This frees these applications (and the programmers that write them) from the need to know the specific network or transport layer protocols needed to communicate over a particular network configuration. Further, if he network configuration or any of the network protocols are changed such as by addition of a new local area network, gateway etc. or switching of transport layer protocols say from DEC-NET ™ to TCP/IP ™, the application programs need not be changed. Such changes can be accommodated by the addition, substitution or alteration of the protocol engines so as to accommodate the change. Since these protocol engines are shared, there is less effort needed to change the protocol engines than to change all the applications.

The protocol engines provide protocol transparency and communication path transparency to the applications thereby freeing these applications from the need to have code which deals with all these details. Further, these protocol engines provide network interface transparency.

The protocol engines can also provide value added services in some embodiments by implementing reliable communication protocols. Such value added services include reliable broadest and reliable point to point communications as well as Reliable Multicast ™ communications where communications are switched from reliable broadcast to reliable point to point when the situation requires this change for efficiency. Further, the protocol engines enhance broadcast operations where two or more applications are requesting data on a subject by receiving data directed to the first requesting application and passing it along to the other requesting applications. Prior art broadcast software does not have this capability.

The protocol engines also support efficient subject based addressing by filtering messages received on the network by subject. In this way, only data on the requested subject gets passed to the callback routine in the requesting application. In the preferred embodiment, the protocol engines coupled to the producer applications or service instances filter the data by subject before it is placed in the network thereby conserving network bandwidth, input/output processor bandwidth and overhead processing at the receiving ends of communication links.

The distributed communication component 432 (hereafter DCC) in FIG. 36 is structured to meet several important objectives. First, the DCC provides a simple, stable and uniform communication model. This provides several benefits. It shields programmers from the complexities of: the distributed environment; locating a target process; establishing communications with this target process; and determining when something has gone awry. All these tasks are best done by capable communications infrastructure and not by the programmer. Second, the DCC reduces development time not only by increasing programmer productivity but also by simplifying the integration of new features. Finally, it enhances the ability to configure the network by eliminating the burden on applications to know the physical distribution on the network of other components. This prevents programmers from building dependencies in their code on particular physical configurations which would complicate later reconfiguration.

Another important objective is the achievement of portability through encapsulation of important system structures. This is important when migrating to a new hardware or software environment because the client applications are insulated from transport and access protocols that may be changing. By isolating the required changes in a small portion of the system (the DCC), the applications can be ported virtually unchanged and the investment in the application software is protected.

Efficiency is achieved by the DCC because it is coded on top of less costly "connectionless" transport protocol in standard protocol suites such as TCP/IP and OSI. The DCC is designed to avoid the most costly problem in protocols, i.e., the proliferation of data "copy" operations.

The DCC achieves these objectives by implementing a layer of services on top of the basic services provided by vendor supplied software. Rather than re-inventing basic functions like reliable data transfer or flow-control mechanisms, the DCC shields applications from the idiosyncracies of any particular operating system. Examples include the hardware oriented interfaces of the MS-DOS environment, or the per-process file descriptor limit of UNIX. By providing a single unified communication toll that can be easily replicated in many hardware and software environments, the DCC fulfills the above objectives.

The DCC implements several different transmission protocols to support the various interaction paradigms, fault-tolerance requirements and performance requirements imposed by the service discipline protocols. Two of the more interesting protocols are the reliable broadcast and intelligent multicast protocols.

Standard broadcast protocols are not reliable and are unable to detect lost messages. The DCC reliable broadcast protocols ensure that all operational hosts either receive each broadcast message or detects the loss of the message. Unlike many so-called reliable broadcast protocols, lost messages are retransmitted on a limited, periodic basis.

The Intelligent Multicast TM protocol provides a reliable data stream to multiple destinations. The novel aspect of this protocol is that it can switch dynamically from point-to-point transmission to broadcast transmission in order to optimize the network and processor load. The switch from point-to-point to broadcast (and vice-versa) is transparent to higher-level protocols. This transport protocol allows the support of a much larger number of consumers than would be possible using either point-to-point or broadcast alone. The protocol is built on top of other protocols with the DCC.

Currently, all DCC protocols exchange data only in discrete units, i.e., messages (in contrast to many transport protocols. The DCC guarantees that the messages originating from a single process are received in the order sent.

The DCC contains fault tolerant message transmission protocols that support retransmission in the event of a lost message. The DCC software guarantees "at-most-once" semantics with regard to message delivery and makes a best attempt to ensure "exactly-once" semantics.

The DCC has no exposed interface for use by application programmers.

The distributed component 432 is coupled to a variety of service disciplines 434, 436 and 438. The service discipline 234 has the behavior which will herein be called Market Data Subscription Service. The MDSS service discipline allows data consumer applications to receive a continuous stream of data, tolerant of failures of individual data sources. This protocol suite 434 also provides mechanisms for load balancing and entitlement policy administration where the access privileges of a user or application are checked to insure a data consumer has a right to obtain data from a particular service. The MDSS service discipline does support the subscription communication paradigm which is implemented by the Subject Addressed Subscription Service (SASS) service discipline 438 in the sense that streams of data on a subject will be passed by the MDSS service discipline to the linked application.

Two properties distinguish the MDSS service discipline from typical client server protocols. First, subscriptions are explicitly supported whereby changes to requested values are automatically propagated to requesting applications. Second client applications request or subscribe to a specific service (as opposed to a particular server and as opposed to a particular subject). The MDSS service discipline then forwards the client application request to an available server. The MDSS service discipline also monitors the server connection and reestablishes it if the connection fails using a different server if necessary.

The MDSS service discipline implements the following important objectives.

Fault tolerance is implemented by program code which performs automatic switch over between redundant services by supporting dual or triple networks and by utilizing the fault tolerant transmission protocols such as reliable broadcast implemented in the protocol engines. Recovery is automatic after a server failure.

Load balancing is performed by balancing the data request load across all operating servers for a particular service. The load is automatically re-balanced when a server fails or recovers. In addition, the MDSS supports server assignment policies that attempts to optimize the utilization of scarce resources such as "slots" in a page cache or bandwidth across an external communication line.

Network efficiency is implemented by an intelligent multicast protocol implemented by the distributed communication daemon 230B in FIG. 35. The intelligent multicast protocol makes the most efficient use of limited resources of network and I/O processor bandwidth by performing automatic, dynamic switch over from point to point communication protocols to broadcast protocols when necessary. For example, Telerate page 8 data may be provided by point to point distribution to the first five subscribers and then switch all subscribers to broadcast distribution when the sixth subscriber appears.

The core functions of the MDSS service discipline are: get, halt and derive. The "get" call from a client application establishes a fault-tolerant connection to a server for the specified service and gets the current value of the specified page or data element. The connection is subscription based so that updates to the specified page are automatically forwarded to the client application. "Halt" stops the subscription. "Drive" sends a modifier to the service that can potentially change the subscription.

The MDSS service discipline is optimized to support page oriented service but it can support distribution of any type data.

The service discipline labeled MSA, 436, has yet a different behavior.

The service discipline labeled SASS, 438, supports subject-based address subscription services. The basic idea behind subject based addressing and the SASS service discipline's (hereafter SASS) implementation of it is straightforward. Whenever an application requires data, especially data on a dynamically changing value, the application simply subscribes to it by specifying the appropriate subject. The SASS then maps this subject request to one or more service instances providing information on this subject. The SASS then makes the appropriate communication connections to all the selected services through the appropriate one or more protocol engines necessary to communication with the server or servers providing the selected service or services.

Through the use of subject based addressing, information consumers can request information in a way that is independent of the application producing the information. Hence, the producing application can be modified or supplanted by a new application providing the same information without affecting the consumers of the information.

Subject based addressing greatly reduces the complexities of programming a distributed application in three ways. First, the application requests information by subject, as opposed to by server or service. Specifying information at this high level removes the burden on applications of needing to know the current network address of the service instances providing the desired information. It further relieves the application of the burden or knowing all the details of the communication protocols to extract data from the appropriate service or services and the need to know the details of the transport protocols needed to traverse the network. Further, it insulates the client applications from the need for programming changes when something else changes like changes in the service providers, e.g., a change from IDN to Ticker 3 for equity prices. All data is provided through a single, uniform interface to client applications. A programmer writing a client application needing information from three different services need not learn three different service specific communication protocols as he or she would in traditional communication models. Finally, the SASS automates many of the difficult and error prone tasks such as searching for an appropriate service instance and establishing a correct communication connection.

The SASS service discipline provides three basic functions which may be invoked through the user interface.

"Subscribe" is the function invoked when the consumer requests information on a real-time basis on one or more subjects. The SASS service discipline sets up any necessary communication connections to ensure that all data matching the given subject(s) will be delivered to the consumer application. The consumer can specify that data be delivered either asynchronously (interrupt-driven) or synchronously.

The producer service will be notified of the subscription if a registration procedure for its service has been set up. This registration process will be done by the SASS and is invisible to the user.

The "cancel" function is the opposite of "subscribe". When this function is invoked, the SASS closes down any dedicated communication channel and notifies the producer service of the cancellation if a registration procedure exists.

The "Receive" function and "callback" function are related functions by which applications receive messages matching their subscriptions. Callbacks are asynchronous and support the event driven programming style. This style is well suited for applications requiring real time data exchange. The receive function supports a traditional synchronous interface for message receipt.

A complementary set of functions exists for a data producer. Also, applications can be both data producers and data consumers.

Figure 37:
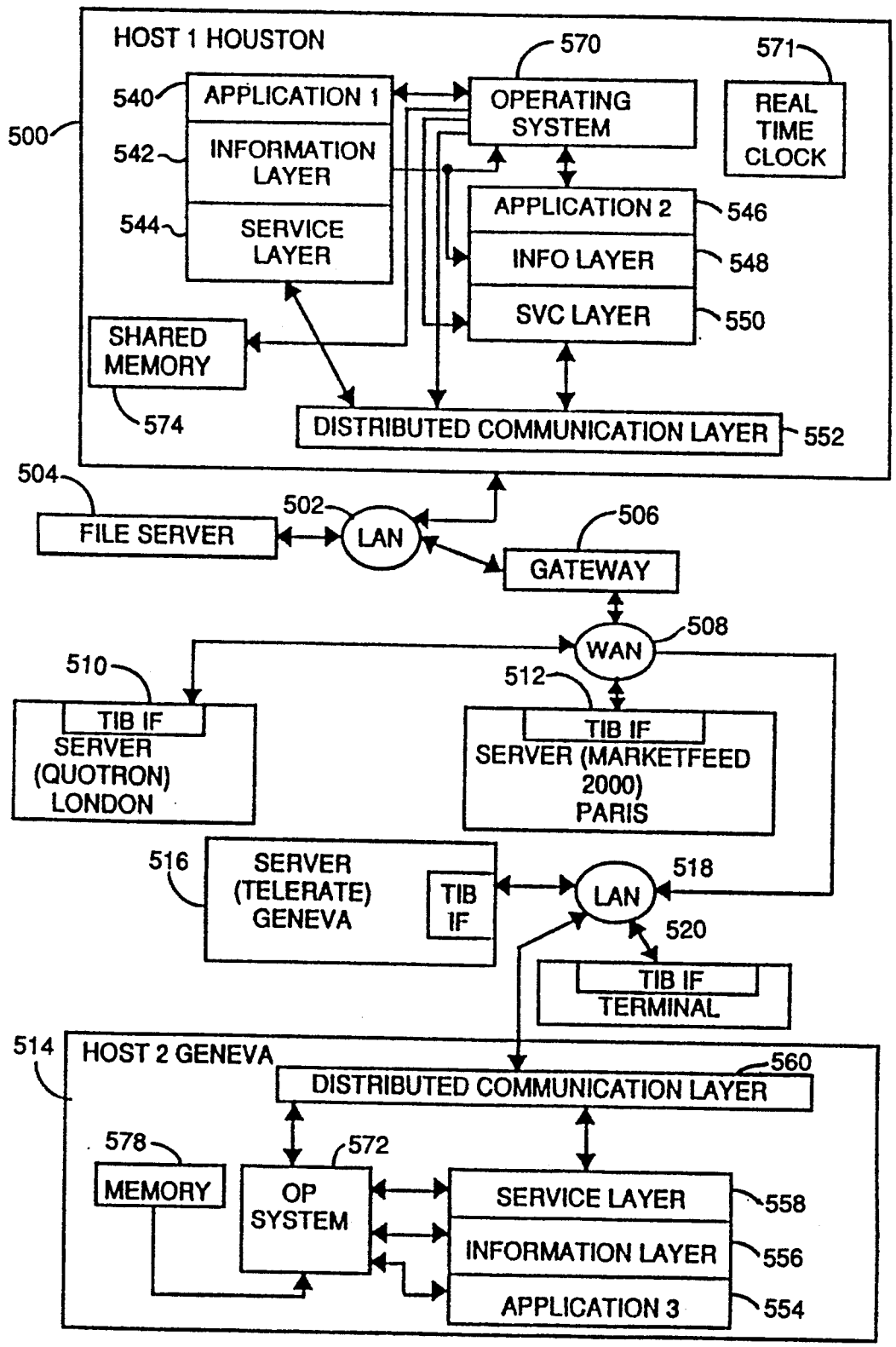
FIG. 37 is a block diagram of a typical distributed computer network.

Referring to FIG. 37 there is shown a typical computer network situation in which the teachings of the TIB ® software may be profitably employed. The computer network shown is comprised of a first host CPU 500 in Houston coupled by a local area network (hereafter LAN) 502 to a file server 504 and a gateway network interconnect circuit 506. The gateway circuit 506 connects the LAN 502 to a wide area network (hereafter WAN) 508. The WAN 508 couples the host 500 to two servers 510 and 512 providing the Quotron and Marketfeed 2000 services, respectively, from London and Paris, respectively. The WAN 508 also couples the host 500 to a second host CPU 514 in Geneva and a server 516 in Geneva providing the Telerate service via a second LAN 518. Dumb terminal 520 is also coupled to LAN 518.

Typically the hosts 500 and 514 will be multitasking machines, but they may also be single process CPU's such as computers running the DOS or PC-DOS operating systems. The TIB ® communication interface software embodies the best mode of practicing the TIB ® software and is ported for a Unix based multitasking machine. To adapt the teachings of the TIB ® software to the DOS or other single task environments requires that the TIB ® communication daemon 230B in the process architecture be structures as an interrupt driven process which is invoked, i.e., started upon receipt of a notification from the operating system that a message has been received on the network which is on a subject to which one of the applications has subscribed.

The LAN's 502 and 518, WAN 508 and gateway 506 may each be of any conventional structure and protocol or any new structure and protocol developed in the future so long as they are sufficiently compaTIB®le to allow data exchange among the remaining elements of the system. Typically, the structures and protocols used on the networks will be TCP/IP, DECNET ™, ETHERNET ™, token ring, ARPANET and/or other digital pack or high speed private line digital or analog systems using hardwire, microwave or satellite transmission media. Various CCITT recommendations such as X.1, X.2, X.3, X.20, X.21, X.24, X.28, X.29, X.25 and X.75 suggest speeds, user options, various interface standards, start-stop mode terminal handling, multiplex interface for synchronous terminals, definitions of interface circuits and packet-network interconnection, all of which are hereby incorporated by reference. A thorough discussion of computer network architecture and protocols is included in a special issue of IEEE Transactions on Communications, April 1980, Vol. COM-28, which also is incorporated herein by reference. Most digital data communication is done by characters represented as sequences of bits with the number of bits per character and the sequence of 0's and 1's that correspond to each character defining a code. The most common code is International Alphabet No. 5 which is known in the U.S. as ASCII. Other codes may also be used as the type of code used is not critical to the TIB ® software.

The International Organization for Standardization (ISO) has developed a seven level Reference Model of Open System Interconnection to guide the development of standard protocols. The seven levels of this standard hereafter referred to as the ISO Model and their functions are:

(1) Application: Permits communication between applications. Protocols here serve the needs of the end user.

(2) Presentation: Presents structured data in proper form for use by application programs. Provides a set of services which may be selected by the application layer to enable it to interpret the meaning of data exchanged.

(3) Session: Sets up and takes down relationships between presentation entities and controls data exchange, i.e., dialog control.

(4) Transport: Furnishes network-independent transparent transfer of data. Relieves the session layer from any concern with the detailed way in which reliable and cost-effective transfer of data is achieved.

(5) Network: Provides network independent routing, switching services.

(6) Data Link: Gives error-free transfer of data over a link by providing functional and procedural means to establish, maintain and release data links between network entities.

(7) Physical: Provides mechanical, electrical, functional and procedural characteristics to establish, maintain, and release physical connections, e.g., data circuits between data link entities.

Packet networks were developed to make more efficient use of network facilities than was common in the circuit-switched and message-switched data networks of the mid-60's. In a packet network, a message from one host or terminal to another is divided into packets of some definite length, usually 128 bytes. These packets are then sent from the origination point to the destination point individually. Each packet contains a header which provides the network with the necessary information to handle the packet. Typically, the packet includes at least the network addresses of the source and destination and may include other fields of data such as the packet length, etc. The packets transmitted by one terminal to another are interleaved on the facilities between the packets transmitted by other users to their destinations so that the idle time of one source can be used by another source. Various network contention resolution protocols exist to arbitrate for control of the network by two or more destinations wishing to send packets on the same channel at the same time. Some protocols utilize multiple physical channels by time division or frequency multiplexing.

The same physical interface circuit can be used simultaneously with more than one other terminal or computer by the use of logical channels. At any given time, each logical channel is used for communication with some particular addressee; each packet includes in its header the identification of its logical channel, and the packets of the various logical channels are interleaved on the physical-interface circuit.

At the destination, the message is reassembled and formatted before delivery to the addressee process. In general, a network has an internal protocol to control the movement of data within the network.

There is a wide variety of network structures and protocols in use. Further, new designs for network and transport protocols, network interface cards, network structures, host computers and terminals, server protocols and transport and network layer software are constantly appearing. This means that the one thing that is constant in network design and operation is that it is constantly changing. Further, the network addresses where specific types of data may be obtained and the access protocols for obtaining this data are constantly changing. It is an object of the communication interface software of the TIB ® software to insulate the programmer of application programs from the need to know all the networks and transport protocols, network addresses, access protocols and services through which data on a particular subject may be obtained. By encapsulating and modularizing all this changing complexity in the interface software of the TIB ® software, the investment in application programs may be protected by preventing network topology or protocol dependencies from being programmed into the applications. Thus, when something changes on the network, it is not necessary to reprogram or scrap all the application programs.

The objectives are achieved according to the teachings of the TIB ® software by network communications software having a three-layer architecture, hereafter sometimes called the TIB ® software. In FIG. 37, these three layers are identified as the information layer, the service layer and the distributed communication layer. Each application program is linked during the compiling and linking process to its own copy of the information layer and the service layer. The compiling and linking process is what converts the source code of the application program to the machine readable object code. Thus, for example, application program 1, shown at 540, is directly linked to its own copy of layers of the software of the TIB ® software, i.e., the information layer 542 and the service layer 544. Likewise application 2, shown at 546 is linked to its own copies of the information layer 548 and the service layer 550. These two applications share the third layer of the software of the TIB ® software called the distributed communication layer 552. Typically there is only one distributed communication layer per node (where a node is any computer, terminal or server coupled to the network) which runs concurrently with the applications in multitasking machines but which could be interrupt drivers in nonmultitasking environments.

The second host 514 in Geneva in the hypothetical network of FIG. 37 is running application program 3, shown at 554. This application is linked to its copies of the information layer 556 and the service layer 558. A concurrently running distributed communication layer 560 in host 2 is used by application 554.

Each of the servers 510, 512 and 516 have a data producer versions of the 3 layer TIB ® software. There is a data consumer version of the TIB ® software which implements the "subscribe" function and a data producer version which implements the "publish" function. Where a process (a program in execution under the UNIX TM definition) is both a data consumer and a data publisher, it will have libraries of programs and interface specifications for its TIB ® software which implement both the subscribe and publish functions.

Each of the hosts 500 and 514 is under the control of an operating system, 570 and 572, respectively, which may be different. Host 1 and host 2 may also be computers of different manufacturers as may servers 510, 512 and 516. Host 1 has on-board shared memory 574 by which applications 540 and 546 may communicate such as by use of a UNIX TM pipe or other interprocess communication mechanism. Host 2 utilizes memory 578.

In a broad statement of the teachings of the TIB®  software, the information layer, such as 542, encapsulates the TIB®INFO ™ interface functionality, and the subject-based addressing functionality of the TIB® software communication library 230A of FIGS. 35 and 36. The TIB®INFO interface is defined in Section 4 of the software specification below. TIB®INFO defines a programmatic interface by which applications linked to this information layer may invoke the protocols and services of the Subject-Addressed Subscription Service (SASS) component.

Figure 38:
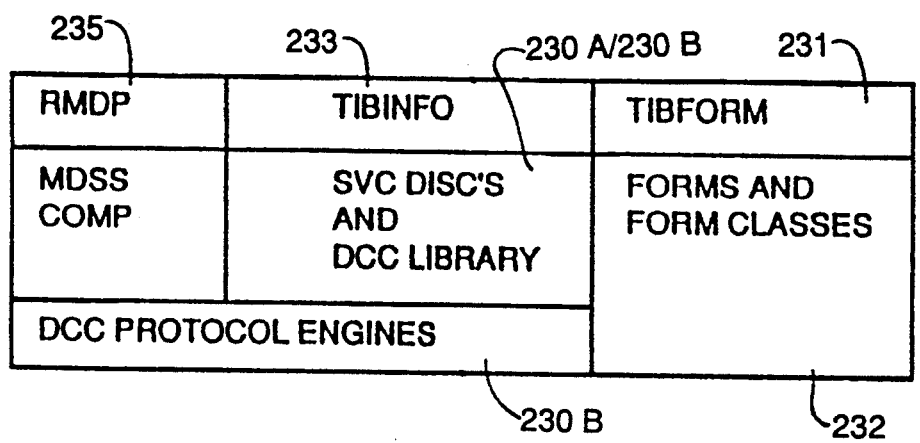
FIG. 38 is a process architecture showing the relationship of the DCC library to the DCC protocol engines in the daemon.

FIG. 38 clarifies the relationships between the process architecture of FIG. 35, the software architecture of FIG. 36 and the 3 layers for the TIB® software shown in FIG. 37. In FIG. 35, the communications library 230A is a library of programs which are linked to the application 216 which provide multiple functions which may be called upon by the RMDP and TIB-®INFO interfaces. Subject-Addressed Subscription Services are provided by subject mapper programs and service discipline programs in the component labeled 230A/230B. This component 230A/230B also includes library programs that provide the common infrastructure program code which supports, i.e., communicates with and provides data to, the protocol engine programs of the TIB® communication daemon 230B.

The TIB®INFO interface is devoted to providing a programmatic interface by which linked client applications may start and use subject-addressed subscriptions for data provided by data producers on the network wherever they may be.

The RMDP interface provide the programmatic interface by which subscriptions may be entered and data received from services on the network by linked client applications which already know the names of the services which supply this data. The communication library 230A in FIG. 35 supplies library programs which may be called by linked client applications to implement the Market-Data-Subscription Service (MDSS).

Figure 39A:
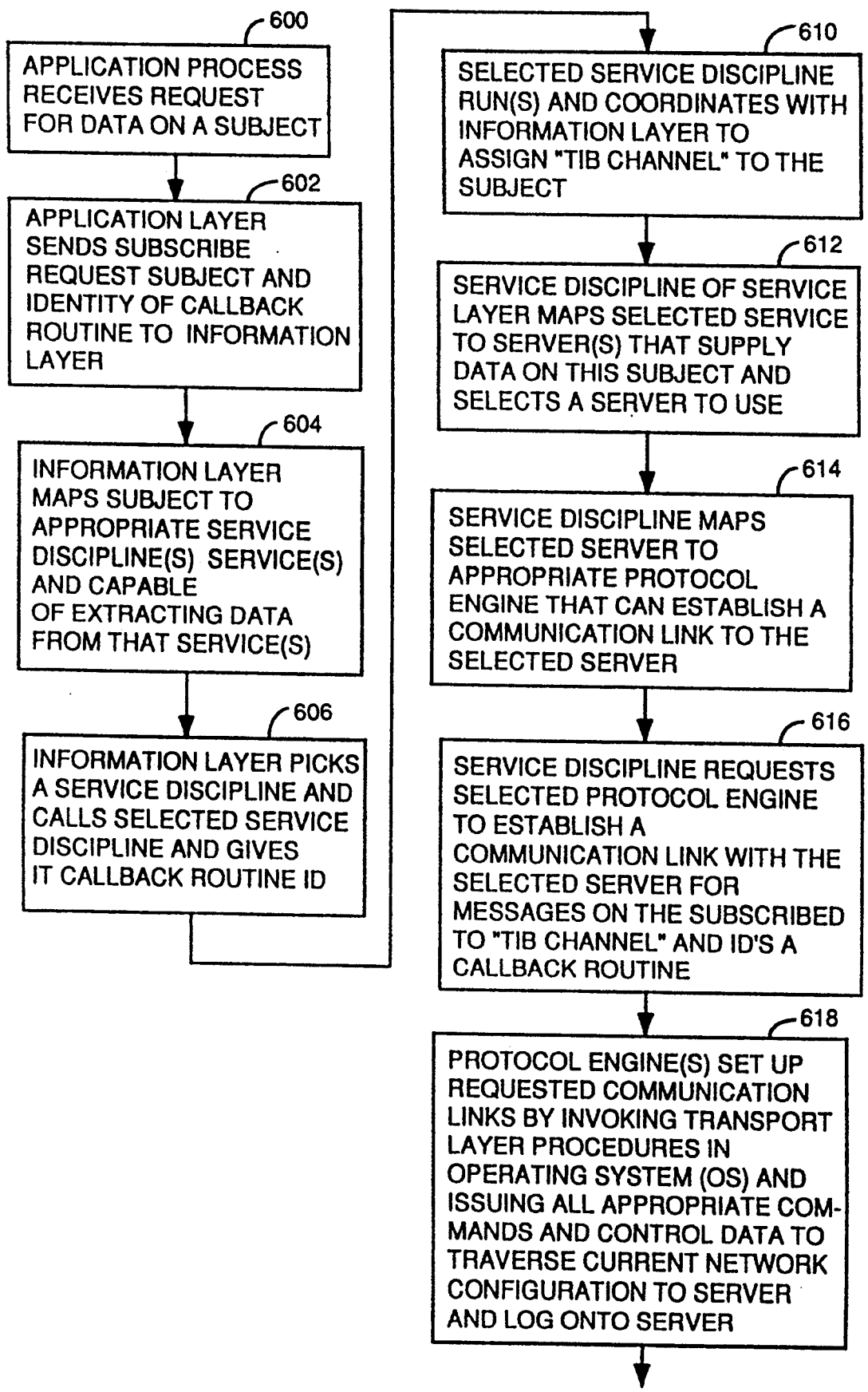
FIG. 39, comprised of FIGS. 39A and 39B, is a flow diagram of the process which occurs, inter alia, at the three layers of the software of the invention where a subscribe request is sent to a service.
Figure 39B:
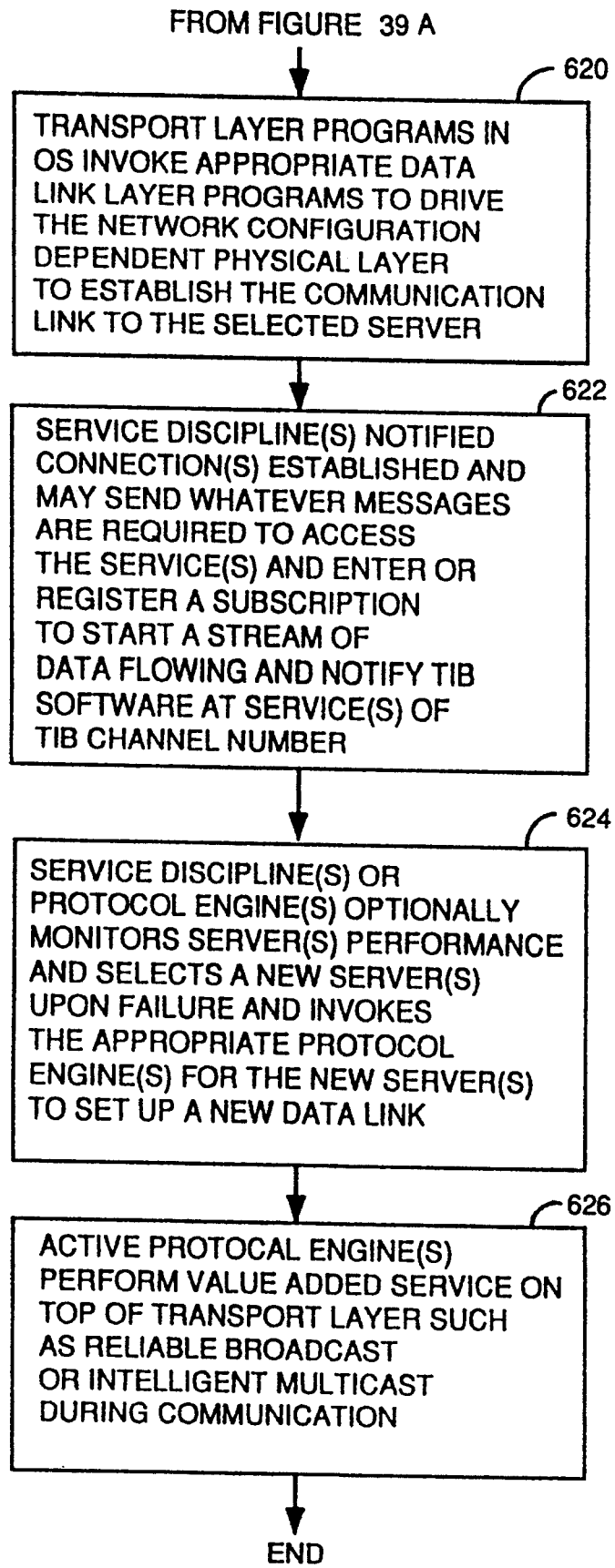

Referring to FIG. 39, which is comprised of FIGS. 39A and 39B, there is shown a flow chart for the process carried out, inter alia, at each of the 3 layers on the subscriber process side for entering a subscription on a particular subject and receiving data on the subject. Step 600 represents the process of receiving a request from a user for data on a particular subject. This request could come from another process, another machine or from the operating system in some embodiments. For purposes of this example assume that the request comes to application 1 in FIG. 37 from a user.

Application 1 (on the application layer or layer 1 of the ISO Model) then sends a "subscribe request" to information layer 542 in FIG. 37. This process is represented by step 602 in FIG. 39. This subscribe request is entered by calling the appropriate library program in the linked library of programs which includes the TIB®-INFO interface. This subroutine call passes the subject on which data is requested and a pointer to the callback routine in the requesting process that the TIB®-INFO library program on the information layer is to call when messages are received on this subject.

The information layer 542 encapsulates a subject-to-service discipline mapping function which provides architectural decoupling of the requesting process as that term is defined in the glossary herein. Referring to steps 604 and 606 in FIG. 39 and to FIG. 37, the input to the information layer is the subject and the output is a call to a service discipline on the service layer 544 in FIG. 37. The information layer includes the TIB®-INFO interface and all library programs of the linked communications library 230A in FIG. 35 involved with subject-to-service mapping. The information layer maps the subject to the service or services which provide data on this subject as symbolized by step 604 and then maps this service or services to one or more service disciplines that encapsulate communication protocols to communicate with these services. This information layer then coordinates with the service discipline to assign a "TIB® channel" as symbolized by step 610.

A "TIB® channel" is like an "attention: Frank Jones" line on the address of a letter. This TIB® channel data is used to route the message to the process which requested data on whatever subject is assigned to that TIB® channel. Each subject is assigned a TIB® channel when a subscription is entered. There is a subscription list that correlates the subscribing processes, their network addresses, the subjects subscribed to and the TIB® channel numbers assigned to these subjects. Data on this list is used by the daemon to route messages received at its port address to the proper requesting process. This list is also used on the data publisher side to cause messages on particular subjects to be routed to the port address of the machine on which the requesting process is running. The communication layer of the TIB® software associated with the service writes the channel number data in the headers of packets from messages on particular subjects before these packets are transmitted on the network. At the receiver side, the TIB® channel data in the header causes proper routing of the packet to the requesting process. The TIB® channel abstraction and the routing function it implies is performed by the DCC library portion 230A/230B in FIG. 38 which is linked to each requesting process.

Assuming there are two such services, these services are then mapped by the service disciplines on the service layer to the servers that provide these services as symbolized by step 612.

In one embodiment, the information layer selects and calls only one of the service discipline subroutines in the service layer as symbolized by step 606. The service discipline then runs and assigns a TIB® channel to the subscription subject as symbolized by step 608. The call from the information layer also passes the pointer to a callback routine in the information layer to be called when messages on the subject arrive.

In alternative embodiments, the information layer may call all the service disciplines identified in the subject-to-service discipline mapping process so as to set up communication links with all the services.

In some embodiments, the names of alternative services and alternative servers are passed to the selected service discipline or directly to the distributed communication layer by the information layer for use in setting up alternate communication links. This allows the distributed communication layer to set up an alternate communication link to another server in case of failure of the selected server or for simultaneous communication link setup to increase the throughput of the network. In still other embodiments, the requesting process can call the service layer directly and invoke the appropriate service discipline by doing the subject-to-service discipline mapping in the application itself. The data regarding alternate services and servers can be passed by calling a library subroutine in the DCC library of block 230A/230B in FIG. 38 which runs and stores the data regarding the alternates.

In alternative embodiments, the information layer may assign the TIB ® channel to each subject or the service layer may assign the TIB ® channel acting alone without coordinating with the information layer. Step 610 represents the embodiments where the service discipline assigns the TIB ® channel number by coordinating with the information layer. Messages sent by data provider processes will have the assigned subject channel data included as part of their header information.

TIB ® channels are used by the communication layer (DCC) for filtering and routing purposes. That is, the daemon 230B in FIG. 35 and protocol engines 230B in FIG. 38 know when a message arrives at the daemon's port address having particular TIB ® channel data in the header that there are outstanding subscriptions for data on this subject. The daemon process knows the channels for which there are outstanding subscriptions because this information is sent to the communication layer by the service layer. The daemon 230B stores data received from the service discipline regarding all TIB ® channels having open subscriptions. The daemon then sends any message on a subject having an open subscription to processes at that port address which have subscribed to messages on that subject. The daemon does not know what the subject is but it does know there is a match between TIB ® channels having open subscriptions and subjects of some of the incoming messages.

Each node coupled to the computer network of FIG. 37 such as host 500 has one network interface card and one port address. This port address may be assigned a "logical channel" in some networks for multiplexing of the network card by multiple processes running simultaneously on the same host. These port addresses may sometimes hereafter also be referred to as network addresses. How data gets back and forth between network addresses is the responsibility of the communication layers such as layer 552 in FIG. 37 which invokes the transport layer, network layer, data link layer and physical layer functionalities of the operating systems 570 and 572, network interface cards (not shown) and other circuits on the network itself such as might be found in gateway 506 and The service layer, information layer and communication layer are layers which are "on top" of the ISO model layers, i.e., they perform services not performed on any layer of the ISO model or they perform "value added" services as an adjunct to services performed on an ISO model layer.

The purpose of the service layer is, among other things, to provide service decoupling as that term is defined in the glossary herein. To perform this function, the service layer includes a program or function to map the selected service to all servers that provide this service and pick one (step 612 in FIG. 39). The service layer then maps the selected server to a protocol engine that encapsulates the communication procedures or protocols necessary to traverse the network, i.e., set up a data link regardless of the path that needs to be followed through the network to get to this server, and communicate with the selected server regardless of what type of machine it is, what type of network and network card it is coupled to and what operating system this server runs. This process is symbolized by step 614.

In alternative embodiments, the application or subscribing process may call the protocol engine directly by having done its own subject based addressing and encapsulating its own communication protocol. In other alternative embodiments, the service layer will select all the servers supplying a service and request the communication layer to set up data links with all of them simultaneously to increase the throughput of the network or to use one server and switch to another upon failure of the selected server.

Normally all services that provide a selected service are assumed to use the same communication protocol so a single service discipline can communicate with them all. However, if different instances of the same services or different services providing data on the same subjects use different communication protocols, the teachings of the TIB ® software contemplate subclasses of service disciplines. This means that the information layer will call a generic service discipline which contains code which can be shared by all subclasses of this service discipline to do common functions such as subscribe or cancel which are done the same way on all servers that provide this service. The generic service discipline will then map the subscription request to one or more of the different servers that provide the service. The service discipline(s) code which encapsulates the communication procedure peculiar to the selected server(s) is then called and runs to finish the process of setting up the subscription data stream with the selected server(s).

The output of the service layer is a request to the communication layer to the effect, "set up a communication link by whatever means you deem most appropriate with the following server or services on the following subject channel." The service layer also sends a pointer to the service layer callback routine which will handle messages or packets on the requested subject. This process is symbolized by step 616. In some embodiments the network addresses of all servers that run service processes supplying data on the requested subject are passed to a DCC library program which stores them for use in providing a reliable communication link by providing failure recovery in case the selected server crashes.

Step 618 represents the process where the selected protocol engine sets up the requested data link by invoking selected functions of the transport layer protocols encapsulated in the operating system. These protocols invoke other communication protocols on the network, data link and physical layers so as to set up the requested data link and log onto the service as symbolized by step 620. The service layer service discipline usually then sends a message to the service notifying it of the subscription and the subject channel assigned to this subject as symbolized by step 622. The subject channel is noted by the information service and/or communication layer of the TIB ® interface software linked to the service. This allows the subject channel data to be added to the packet headers of transmitted packets on the subject of interest. This subscription message starts the flow of data in some embodiments, while in other embodiments, the flow of data starts when the data link to the server is first established.

In some embodiments, a single subscription may necessitate calling multiple services, so the information layer may map the subject to multiple service disciplines. These in turn map the request to multiple protocol engines which simultaneously set up data links to the multiple services.

In some alternative embodiments, the service disciplines talk directly to the transport layer and encapsulate the protocols necessary to communicate on the current network configuration. In these embodiments, the service layer may filter incoming messages by subject before calling the callback routine in the information layer.

On small networks, an alternate embodiment is to broadcast on the network subscription requests to particular subjects. Services coupled to the network listen to these broadcasts and send messages on the subjects of interest to the port addresses identified in the broadcasts. These messages are then directed by the DCC layer at the port address to the requesting process in the manner described elsewhere herein.

In alternative embodiments, the service layer also performs other functions such as: regulating access to certain services; session management in the traditional sense of the session layer of the ISO model; replication management of replicated services and servers; failure/recovery management in case of failure of a service; distribution management; load balancing to prevent one server or service from being inequitably loaded with data requests when other services/servers can fill the need; or, security functions such as providing secure, encoded communications with a server. Of particular importance among these alternate embodiments are the embodiments which encapsulate service recovery schemes on the service layer. In these embodiments, when a server goes down, a recovery scheme to obtain the same data elsewhere encapsulated in the appropriate service discipline is run to re-establish a new data link to an alternate server as symbolized by step 624.

In the preferred embodiment, the service discipline assigns the TIB ® channel to the subject and picks the protocol engine to use in terms of the characteristics of the server and the service to be accessed and the network and network protocol to be used, and in light of the degree of reliability necessary.

The daemon 230B in FIGS. 35 and 38 can include many different protocol engines, each of which has different characteristics. For example there may be a protocol engine for point-to-point communication between nodes having Novell network interface cards and using the Novell protocol and a protocol engine for point-to-point communications between nodes using the TCP and UDP protocols and associated network interface cards. There may also be a protocol engine for communication with high speed data publishers using reliable broadcast, and a protocol engine for either point-to-point or reliable broadcast communication using the Intelligent Multicast ™ protocol. There can be as many protocol engines as there are options for communication protocols, types of servers and services and reliability options as are desired, and more can be added at any time.

Further, some of the service disciplines may be procedures for communicating with other processes on the same machine such as the operating system or another application or directly with a user through a terminal. More service disciplines can be added at any time to communicate with new sources of information.

A service discipline, when it receives a subscription request may open a specific TIB ® channel for that subject or allow any arbitrary TIB ® channel to be used.

The selected service discipline or disciplines pick the protocol engine that has the right characteristics to efficiently communicate with the selected service by calling a DCC library program. The DCC library programs updates the subscription list with the new subscription and channel data and send a message to the selected protocol engine via shared memory or some other inter-process transfer mechanism. If the host is not multitasking, the daemon will be caused to run by an interrupt generated by the DCC library program. The message to the selected protocol engine will be as previously described and will include the identity of the selected server. The protocol engine will map the identity of this server to the network address of the server and carry out the communication protocol encapsulated within the selected protocol engine to set up the data link. Some of these protocols are value added protocols to, for example, increase the reliability of generic transport layer broadcast protocols or to do intelligent multicasting. These value added protocols will be detailed below. This step is symbolized by step 626.

The distributed communication layers 552 and 560, function to provide configuration decoupling. This eliminates the need for the requesting process to know how to do various communication protocols such as TCP, UDP, broadcast etc and to have code therein which can implement these protocols. The protocol engines implement various communication protocols and the DCC library implements the notion of TIB ® channels and performs routing and filtering by subject matter based upon the TIB ® channel data in the packet headers of incoming packets. The protocol engine for communicating using the UDP protocol also does message disassembly into packets on the service or transmit side and packet reassembly into complete messages on the subscribing process or receive side. This is a value added service since the UDP transport protocol does not include these disassembly and reassembly functions. The TCP transport protocol includes these message disassembly and packet reassembly functions so the protocol engine that invokes this transport layer function need not supply these type value added services.

In some embodiments of the TIB ® software, the UDP protocol engine adds sequence numbers and data regarding how many packets comprise each complete message to the packet headers. This allows the daemon or DCC library of the receiving process TIB ® communication layer to check the integrity of the message received to insure that all packets have been received.

As data packets come in from the network, they are passed up through the DCC library, service layer and information layer to the subscribing process. The service layer in some embodiments may filter the incoming messages by subject matter instead of having this filtering done by the daemon or the DCC library as in other embodiments. In still other embodiments, the filtering by subject matter is done by the information layer.

In some embodiments, the service layer also performs data formatting by calling programs in the TIB ® FORMS interface 431 in FIG. 35 or the TIB ® Forms Library 232 in FIG. 35.

In some embodiments, the subject based addressing is done by collecting all the information a subscribing process could ever want in a gigantic data base and organizing the data base by subject matter with updates as data changes. The service layer would then comprise routines to map the subject request to data base access protocols to extract data from the proper areas of the data base. The communication layer in such embodiments maps incoming update data to update protocols to update the appropriate data in the data base.

The preferred embodiment implements the more powerful notion of allowing the data sources to be distributed. This allows new servers and services to be coupled to the system without wrecking havoc with all the existing application software. The use of the information, service and communication layers of the TIB ® software according to the teachings of the TIB ® software provides a very flexible way of decoupling the application software from the ever changing network below it.

In the preferred embodiment, the filtering by subject matter for point-to-point protocols is done by the TIB ® software on the transmit side. Note that in FIG. 37, the servers 510, 512 and 516 are decoupled from the network by TIB ® interface software symbolized by the blocks marked "TIB ® IF". Terminal 520 is also decoupled in the same manner and can be a service for manual entry of data by the user. Specifically, this filtering is done by the information layer bound to the service which is publishing the data. For a service that is using the broadcast transport protocol, the TIB ® communication layer at the network addresses receiving the broadcast would filter out all messages except those having subjects matching open subscriptions by comparing the TIB ® channel data to the channel data for open subscriptions listed in the subscription table based upon subscription data generated by the information layer and TIB ® channel data generated by the service layer. Note that where a service simply broadcasts data, the service discipline for accessing that service can be as simple as "listen for data arriving at the following network address and filter out the messages on other than the subscribed subject." The service discipline would then format the data properly by invoking the proper function in the TIB ® Forms Library and pass the data through the information layer to the requesting process.

The use of the communication layer allows all the network configuration parameters to be outside the applications and subject to revision by the system administrator or otherwise when the network configuration changes. This insulates the application software from the network interface and provides a functionality similar to and incorporating at least all the functionality of the ISO Model network layer.

Note also that in some embodiments, the functionality of the information, service and communication layers could also be easily implemented in hardware rather than the software of the preferred embodiment. The service and communication layers implement most of the functionality the ISO Model Network, Data Link and Physical layers plus more.

In some embodiments, the distributed communication layer only receives a general request from the service layer to set up a data link and decides on its own which is the most efficient protocol to use. For example, the DCC may receive 5 separate subscriptions for the same information. The DCC may elect on its own to set up 5 separate data links or bundle the requests, set up one data link and distribute the arriving message by interprocess transfers to each of the 5 requesting processes. In other embodiments, the DCC may act on its own to decide which protocol to use, but may accept things from the service layer such as, "I want this fast" or "I want this reliable". In the latter case, the communication layer may elect to send two subscriptions for the same information to two different services or may set up two different links to the same service by different network paths.

In the preferred embodiment, the DCC library portion of the communication library serves the sole function of determining how to best get data from one network address to another. All replication management and failure recovery protocols are encapsulated in the service disciplines.

Figure 40A:
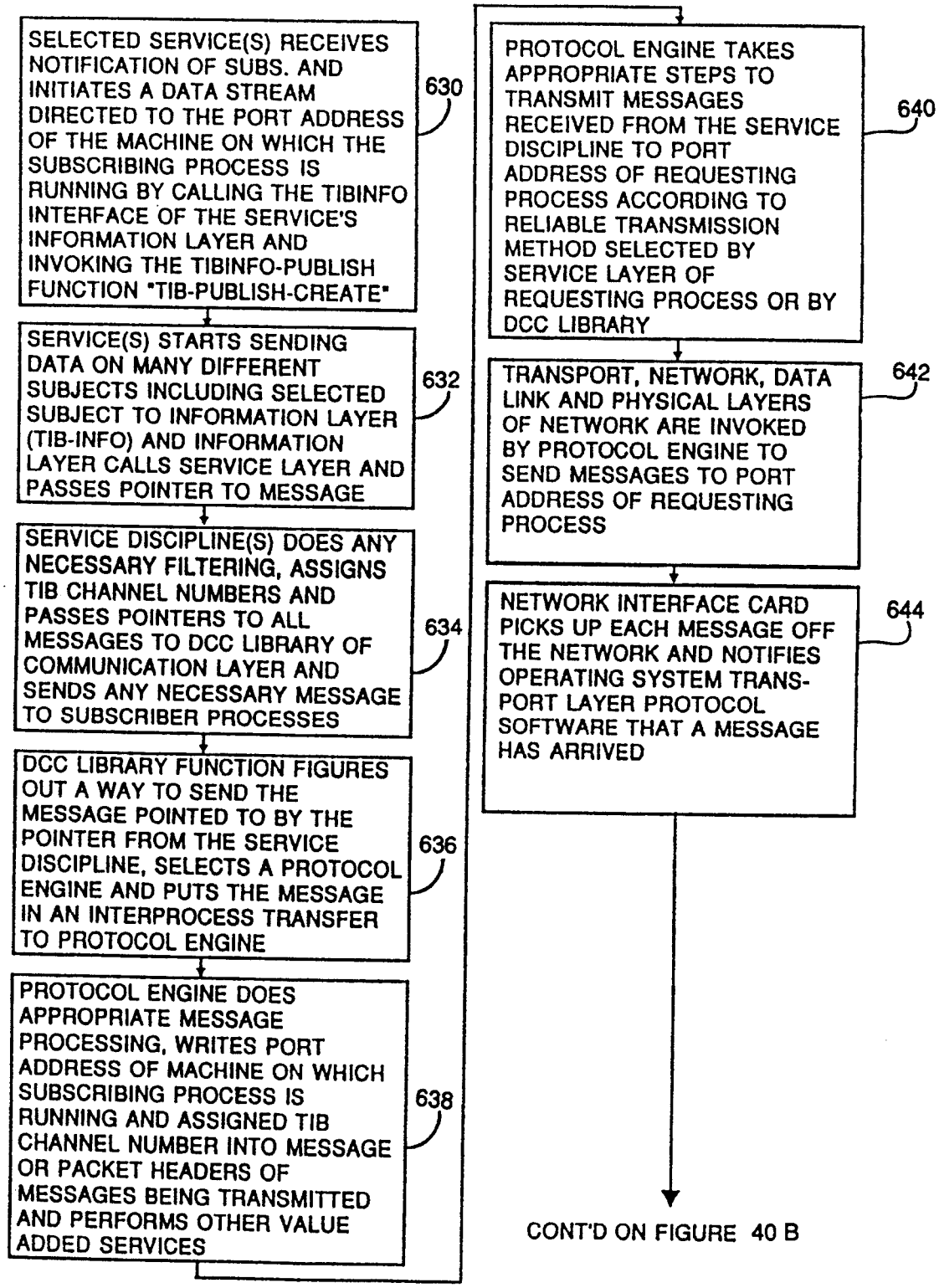
FIG. 40, comprised of FIGS. 40A and 40B, is a flow chart of the process which occurs at, inter alia, the three layers of the software interface according to the teachings of the invention when a subscribe request is received at a data producing process and messages flow back to the subscribing process.
Figure 40B:
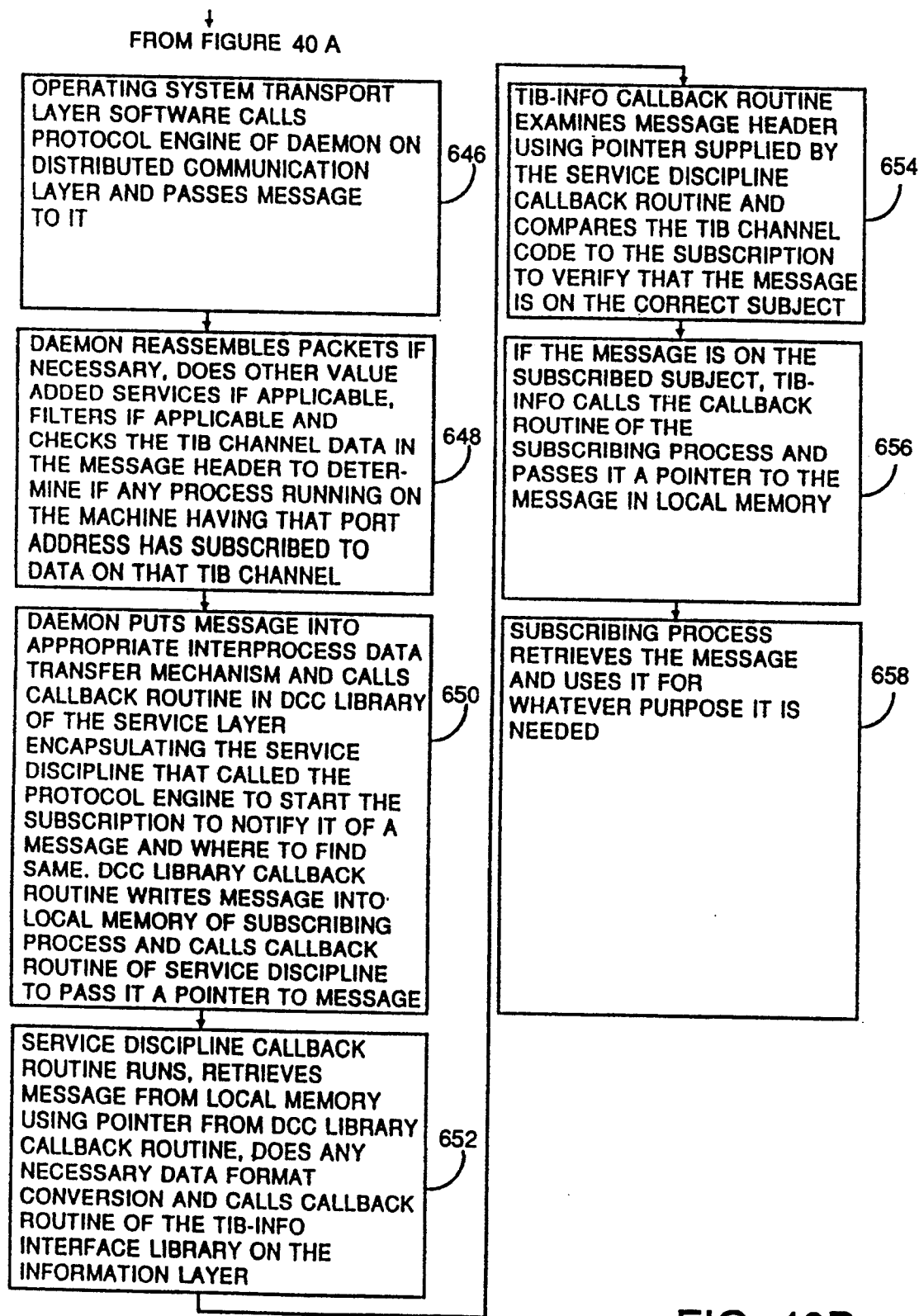

Referring to FIG. 40, comprised of FIGS. 40A and 40B, there is shown a flow chart for the processing involved at the three layers of the TIB ® software on the transmit side in creating a subscription data stream at a publishing process or service and sending it down through the TIB ® software and across the network to the subscribing process.

Step 630 represents the process whereby the selected service receives a message from a subscribing process and initiates a data stream. Each service such as the Quotron service running on server 510 in FIG. 37 and the Marketfeed 2000 and Telerate services running on servers 512 and 516, respectively, are decoupled from the network by a version of the three layer architecture TIB ® software according to the teachings of the TIB ® software. This is symbolized by the blocks marked TIB ® IF in these server boxes which stands for TIB ® interface software.

The TIB ® interface for each service decouples the service from any requirement to have functionality capable of supporting filtering or subject based addressing. Thus, if a service is designed to broadcast all equity prices on the American Stock Exchange and Over-the-Counter market, but the subscription is simply for IBM equity prices, the service responds as it always has and need not have a function to filter out only IBM equity prices. The service discipline for this type service will be adapted to filter out all messages except IBM equity prices in response to such a subscription request.

Another service like Telerate which publishes many different pages organized by subject matter, e.g., a page on Government T-Bill rates, a page on long term corporate bond rates etc., will be able to accept a subscription for only a specific page and may be able to accept special commands to caused the service to publish only specific columns on a particular page. In such a case, the service layer bound to such a service will include a service discipline which receives subscription requests by subject and filters messages out from a broadcast that do not pertain to a subject having an open subscription.

Step 630 also represents the process of the service calling the TIB ®-Publish function of the information layer TIB ®-INFO library and starting the flow of data toward the subscribing process. The service need not have any of its own ability to filter by subject. The subscription request it receives is in the "native tongue" that this service understands because it is formatted and sequenced in that fashion by the service discipline of the subscribing process.

Most of the filtering by subject matter is done by the service disciplines, but where this filtering is done depends upon the type of service. Some services publish only one type of data so everything such a publisher puts out is of interest to the subscribing process. For example, assume that the service accessed is the real time clock 571 in FIG. 37 which puts out only the current time, and assume that the subject of the subscription is "give me the time of day". In such a case, the service discipline is very simple and no filtering need occur. Such a service discipline can be simply a protocol to determine how to communicate the data to the requesting process and what TIB ® channel to assign to it.

The fact that the service starts sending data in whatever manner such a service normally sends data is symbolized by step 632. Thus, if the service is Telerate, it can send the page image and updates for any one of a number of different pages and it understands a subscription for only one of its many pages whereas the Quotron service would not understand a subscription for only IBM equity prices. The various service disciplines of the service layer provide, inter alia, the necessary functionality which the service does not have.

Step 632 assumes a service which broadcasts messages on many different subjects and a subscription request for only one or a few of those subjects. In other hypothetical examples, the service may publish only the requested information such as a particular telerate page. In the Telerate case, the subscription request may specify that only a particular page and particular columns of that page be sent and may request the page image by a point-to-point communication protocol using a dedicated TIB ® channel.

Step 634 represents the response processing of the service layer to the subscription request and the stream of data that results. In step 634, the service discipline does any necessary filtering by subject matter and assigns the TIB ® channel number. The filtering by subject matter is generally done by the service discipline on the data producer side of an exchange only when the producer produces vastly more data than is called for by the subscription such as in the case of a high speed, broadcast producer. In such a case, the extraneous data could overwhelm the network. The TIB ® channel numbers are assigned by the service discipline in step 634 but they are not actually added to the headers for the packets until the message reaches the communication layer. In some alternative embodiments, the TIB ® channel numbers may be written to the packet headers by the service discipline.

The TIB ® channel number assignment is done by the service discipline based upon the type of service, subscription and communication protocol being used. Where a broadcast protocol is being used, the service discipline in some embodiments will, in step 634, simply assign different TIB ® channel numbers to different subjects and send a message to subscribers listed in a subscription table maintained by the service layer on the information layer. The message will say simply, "for example, for updates on IBM equity prices, monitor TIB ® channel 100." Note that the TIB ® channel data is used by the TIB ® software of the receiving host solely to route messages to the proper subscribing processes. TIB ® channels have nothing to do with logical channels, network routing or other network, data link or physical layer issues.

In other embodiments, in the broadcast protocol situation, the service discipline will consult a subscription list and filter out all messages on subjects other than subjects with open subscriptions. For those subjects, a TIB ® channel will be assigned and a message will be sent to the TIB ® software linked to the subscribing processes as to what TIB ® channels to listen to for messages to be routed to their client processes.

In the case of point-to-point protocols, the subscription requests usually contain the TIB ® channel numbers assigned to the subject by the service discipline selected by the information layer linked to the subscribing process. In such a case, step 634 represents the process of assigning the TIB ® channel number received in the subscription request to messages emitted from the service. In a typical case of subscription to a Telerate page which specifies that a particular TIB ® channel is to be used in case a point-to-point protocol is selected, the service discipline will send the page image by selecting a point-to-point protocol engine. The service discipline will also send a message acknowledging the subscription and advising the TIB ® software of the subscribing process to listen to a particular TIB ® channel for broadcasts of updates to the page. The receiving TIB ® software then opens a TIB ® broadcast channel for the updates.

Step 636 represents the processes performed by the DCC library after the service discipline calls it. The DCC library's sole function in the preferred embodiment is to determine the best way to send a message to any particular network address where the service discipline or the subscription request does not specify the communication protocol to be used. In some embodiments, the DCC library of the communication layer will accept suggestions from the service layer or subscription request as to how to send the message but may select a different protocol if this is deemed to be more efficient.

Further, the DCC library may change the communication protocol being used based upon changing conditions such as number of subscribers. For example, an intelligent Multicast protocol may be chosen (described in more detail below). In this protocol, a point-to-point protocol is used when the number of subscribers is below a certain cutoff number (programmable by the system administrator) but switch-over to a broadcast protocol automatically occurs when the number of subscribers rises above the cutoff number. In the preferred embodiment "high-water" and "low-water" marks are used as will be described below. In other embodiments, any cost function may be used to set the switch-over point based upon cost and efficiency of sending multiple point-to-point messages as opposed to a single broadcast message.

Step 636 also represents the process of retrieving the message from local memory of the service and putting it into an interprocess transfer process to send it to the protocol engine/daemon 230B in FIG. 35.

Step 638 represents the processes carried out by the protocol engine of the service to transmit the messages to the subscribing processes. If the transport protocol in use is UDP, the protocol engine, in some embodiments, will break a message into packets for transmission. Non-packet protocol engines also exist for other types of transport protocols.

The protocol engine also writes the port address of the machine running the subscribing process in the message headers and may perform other value added services. These other services include reliable broadcast and Intelligent Multicasting.

The protocol engines have a standard programmers interface through which they communicate with the transport layer routines in the operating system. The steps taken by the protocol engine to invoke the transport layer functionality so as to drive the network, data-link and physical layer protocols in such a manner so as to deliver the messages to the subscribing processes are not critical to the TIB ® software. This process is symbolized by steps 640 and 642. Exactly what these steps are cannot be specified here because they are highly dependent upon the structure, configuration and protocol of the network as well as the interface to the transport layer. When any of these change, the protocol engines may have to be changed to accommodate the change to the network. This, however, prevents the need to change the application software thereby providing configuration decoupling.

After the message traverses the network, it is picked up by the network interface card having the port address shared by the subscribing process. This process is symbolized by step 644. The network card buffers the message and generates an interrupt to the transport layer routine which handles incoming messages.

Step 646 represents the process where the transport layer software calls the appropriate protocol engine of the daemon 230B in the communication layer such as layers 552 or 560 in FIG. 37. The incoming message or packet will be passed to the appropriate protocol engine by some interprocess transfer mechanism such as shared memory. In the preferred embodiment, the daemon is an ongoing process running in background on a multitasking machine. In other embodiments, the daemon is interrupt driven and only runs when a message has been received or is to be transmitted. Step 646 also represents the packet reassembly process for TCP or other transport layer protocols here packet reassembly is done by the transport layer.

Step 648 represents the processes performed by the protocol engine in the daemon to process and route the incoming message.

For UDP transport layer protocol engines, packet reassembly is done. This of course implies that the protocol engine of the data producer process added sequence numbers to the packet headers so that they could be reassembled in the proper order. Other value added services may then be performed such as checking all the sequence numbers against data which indicates the sequence numbers which should have arrived to determine if all the packets have been received. In some embodiments, the data as to the sequence numbers to expect is written into fields dedicated to this purpose in the packet headers. In other embodiments, this data is sent in a separate message.

If any packets are missing, a message will automatically be sent by the receiving communication layer back to the data producer process' communication layer to request retransmission of any lost or garbled packets. This of course implies that the communication layer for the data process stores all packets in memory and retains them for possible retransmission until an acknowledgment message is received indicating that all packets have been successfully received.

Step 448 also symbolizes the main function performed by the communication layer daemon/protocol engine in receiving messages. That function is routing the messages to the appropriate subscribing process according to the TIB® channel information in the header. The protocol engine checks the TIB® channel number in the header against the current subscription list sent to it by the service discipline. The subscription list will include pointers to the appropriate service discipline callback routine and subscribing process for messages assigned to any particular TIB® channel. The protocol engine also filters messages by TIB® channel number for embodiments in which messages reach the subscribing process' TIB® software which do not pertain to the subscribed to subject. This may also be done at the service layer or information layer but it is most efficient to do it at the communication layer.

The protocol engine will then put the message in the appropriate interprocess transfer mechanism, usually shared memory or a Unix ™ pipe, and generate an interrupt to the DCC library as symbolized by step 650. This interrupt will vector processing to the appropriate DCC library callback routine which was identified to the protocol engine by the DCC library when the subscription on this TIB® channel and subject was opened. The DCC library routine so invoked is linked to and part of the subscribing process which initiated the subscription. The DCC library callback routine then retrieves the message from the interprocess transfer mechanism and stores it in local memory of the subscribing process. The DCC library callback routine then generates an interrupt to the service layer and passes it a pointer to the message.

Step 652 represents the process performed by the service layer on incoming messages. The interrupt from the DCC library causes to run the service discipline callback routine identified in the original subscribe message passed by the service layer through the DCC library. The callback routine will, in some embodiments, do any data format conversions necessary and may, in other embodiments do subject matter filtering. Then, the service discipline generates an interrupt to the information layer which cause the callback routine of the information layer to run. The interrupt contains a pointer to the message.

Step 654 symbolizes processing of incoming messages by the information layer. In some embodiments, the service layer does not guarantee that all messages reaching the information layer exactly match the subject for which data was requested. In these embodiments, step 654 symbolizes the process of comparing the TIB® channel code to the subject of the subscription to make sure they match. If the data has been previously filtered by subject, step 654 can be eliminated.

Step 656 symbolizes the process of generating an interrupt to the callback routine of the subscribing process if there is a match on subject. If not, no interrupt is generated and monitoring for new messages continues by the daemon while all the interrupt driven processes terminate and release their computer resources until the next interrupt.

Step 658 symbolizes the process of use of the message data for whatever purpose the subscribing process originally sought this data.

Reliable broadcast is one of the value added services that the communication layer can use to supplement and improve the communication protocols of the transport layer. Traditional broadcast protocols offered by prior art transport layers are not reliable. For example, if there is noise on the line which corrupts or destroys a packet or message or if the network interface card overflows the buffer, packets or entire messages can be lost and the processes listening for the message never gets the message, or they get an incomplete or garbled message. There is no acknowledge function in traditional broadcast, so if some of the processes miss the message or get incomplete or garbled messages, the transmitting process never finds out. This can happen for one in every hundred packets or for one in ten packet Traditional prior art transport layer broadcast protocols do not include functionality, i.e., program code, to distribute a broadcast message received at the network address of the host to multiple processes running on that host.

Figure 41A:
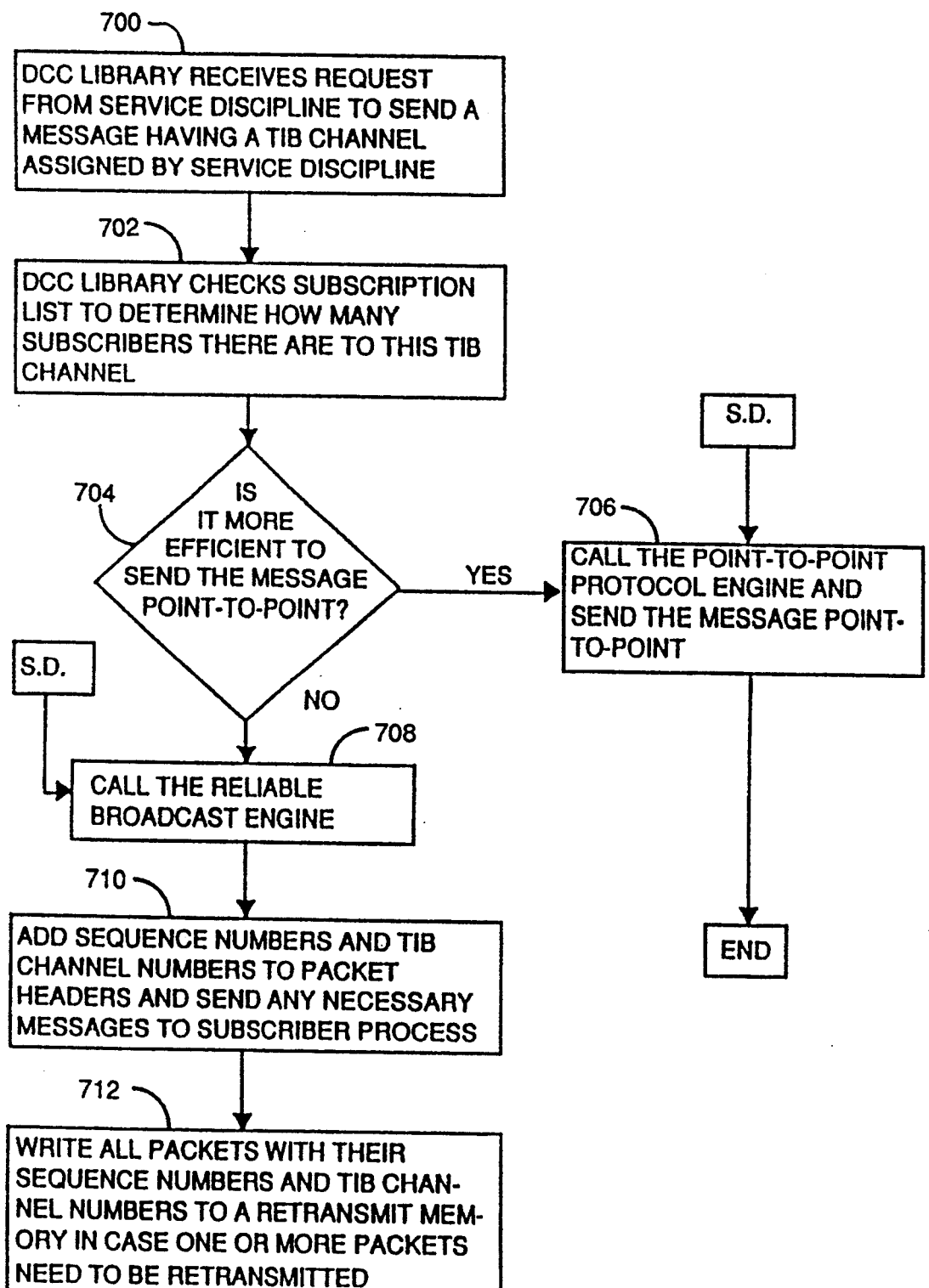
FIG. 41, comprised of FIGS. 41A and 41B, is a flow chart of the process which occurs at the DCC library and in the reliable broadcast protocol engine when messages are sent by the reliable broadcast protocol.
Figure 41B:
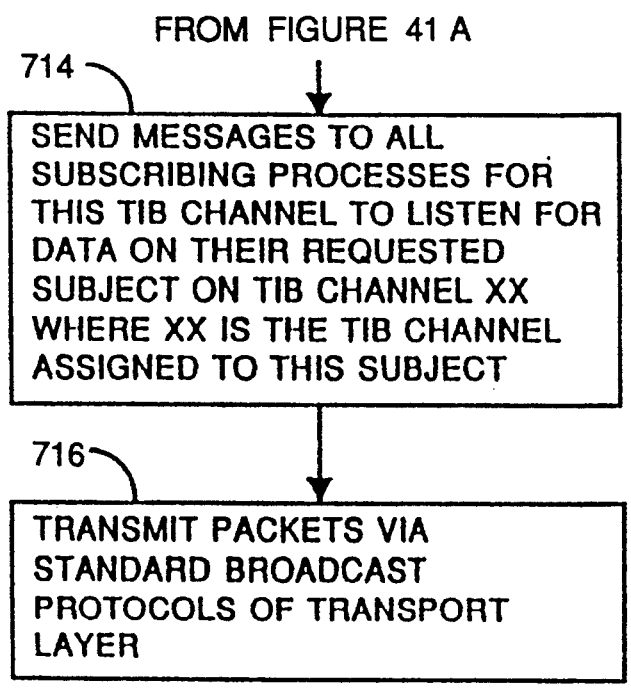

The communication layer according to the teachings of the TIB® software includes at least one protocol engine to implement reliable broadcast protocols which are built on top and supplement the functionality of the prior art transport layer broadcast protocols. Referring to FIG. 41 comprised of FIGS. 41A and 41B, there is shown a flow chart for one embodiment of a reliable broadcast protocol implemented by the communication layer. Step 700 represents the process where the DCC library receives a request from a service discipline to send a message having a particular TIB ® channel assigned thereto. In some embodiments, this request may also include a request or a command to send the message by the reliable broadcast protocol. In embodiments where the reliable broadcast protocol is mandated by the service discipline, the service discipline includes a function to determine the number of subscribers to a particular channel and determine the cost of sending the same message many times to all the port addresses of all subscribers versus the cost of sending the message once by broadcast with messages to all subscribers to listen to TIB ® channel XX (whatever TIB ® channel number was assigned to this subject) for data on the subjects they are interested in. In the embodiment illustrated in FIG. 41, this cost determination function is included within the communication layer DCC library functionality.

Step 702 represents this cost determination process as performed by the DCC library. The particular program of the DCC library which implements this function, checks the subscription list and counts the number of subscribers to the TIB ® channel assigned to this message. The cost of sending the message point-to-point to all these subscribers is then evaluated using any desired costing function. In some embodiments, the cost function may be a comparison of the number of subscribers to a predetermined cutoff number. The particular cost function used is not critical to the TIB ® software. The cost of sending the message to multiple subscribers point-to-point is that the same message must be placed repeatedly on the network by the data producing software. The cost of broadcasting a message is that all network cards pick it up and may interrupt the transport protocol program in the operating system of the host which transmits the message by interprocess transfer to the TIB ® daemon only to find out the message is not of interest to any client process running on that host. Computer resources are thus wasted at any such host.

Step 704 represents the process the DCC library carries out to evaluate the cost and decide to send the message either by point-to-point protocol or reliable broadcast. If it is determined that the number of subscribers to this TIB ® channel is small enough, the decision will be made to send the message by a point-to-point protocol. Step 706 represents the process of calling the point-to-point protocol engine and sending the message using this protocol.

If the number of subscribers is too high for efficient point-to-point transmission, the DCC library calls the reliable broadcast protocol engine as symbolized by step 708.

Step 710 represents the first step of the reliable broadcast protocol processing. The reliable broadcast protocol according to the teachings of the TIB ® software supports multiple subscribing processes running of the same host and requires that each subscribing process receive all the packets of the message without error and acknowledge receipt thereof. The insure that this is the case, sequence numbers must be added to the headers of each packet and some data must be communicated to the subscribing processes that indicate the sequence numbers that must all have been received in order to have received the entire message. In some embodiments, only the sequence numbers will be added to the packet headers and the data regarding the sequence numbers that comprise the entire message will be sent by separate message to each process having an open subscription to the TIB ® channel assigned to the message. In other embodiments, the sequence numbers that comprise the entire message will be added to the header of the first packet or to the headers of all the packets. The sequence numbers added to the packets are different than the sequence numbers added by packetizing functionality of the transport protocols of the operating system in TCP protocols since the TIB ® sequence numbers are used only to determine if all packets of a message have been received. In some embodiments, the packet sequence numbers added by the transport protocol may be used by the TIB ® communication layer of the subscribing processes to determine if all the packets have been received. In other embodiments of reliable broadcast protocol engines for supplementing the UDP transport layer protocol, the packetizing function of the protocol engine adds sequence numbers which can be used both for transport/network/data link/physical layer functions but also for TIB ® communication layer functions in verifying that all packets of a message have been received.

After the sequence numbers have been added, the packets are written to a retransmit buffer with their sequence numbers for storage in case some or all of the packets need to be retransmitted later as symbolized by step 712.

Before the messages can be sent to the various subscribing processes, the reliable broadcast protocol engine adds the TIB ® channel data to the header of each packet and sends a message to each subscribing process listed in the subscription table as having open subscriptions for this channel to listen for data on their requested subject on TIB ® channel XX where XX is the TIB ® channel number assigned to this subject.

Step 716 represents the process of transmitting the packets via the standard broadcast protocols of the transport layer by calling the appropriate operating system program and passing a pointer to each packet.

Figure 42A:
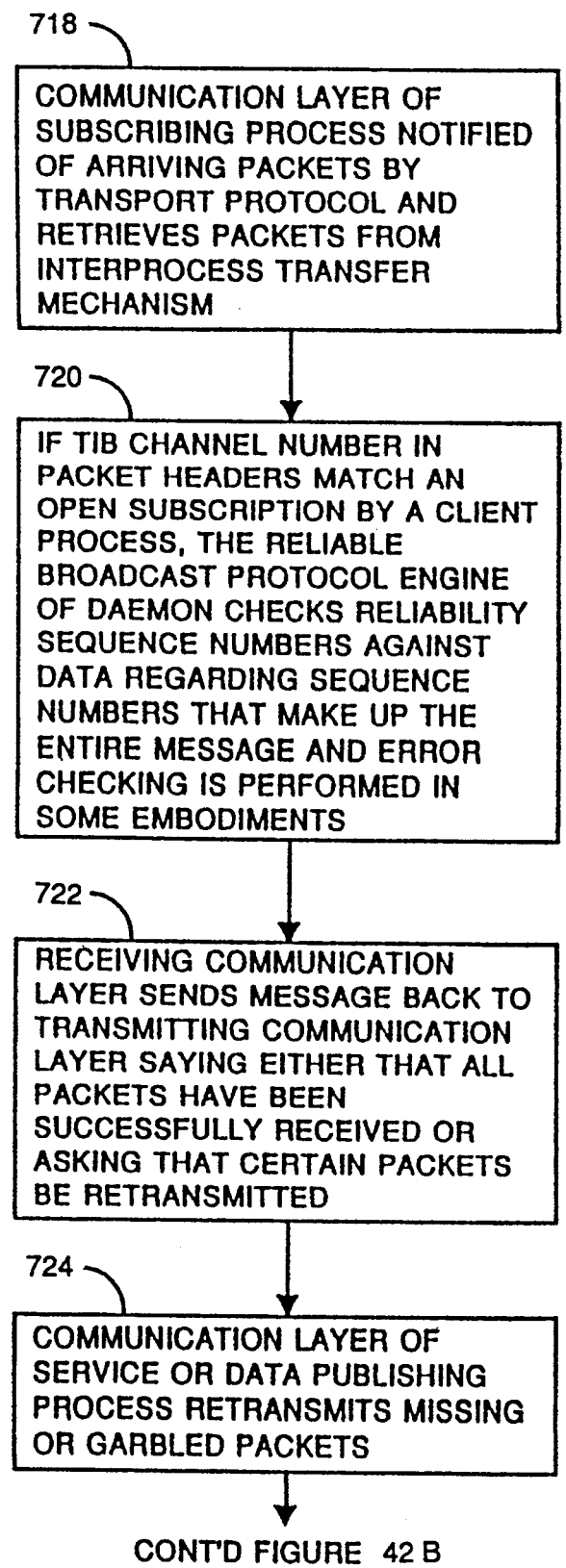
FIG. 42, comprised of FIGS. 42A and 42B, is a flow chart of processing by a reliable broadcast protocol engine on the data consumer side of the reliable broadcast transaction.
Figure 42B:
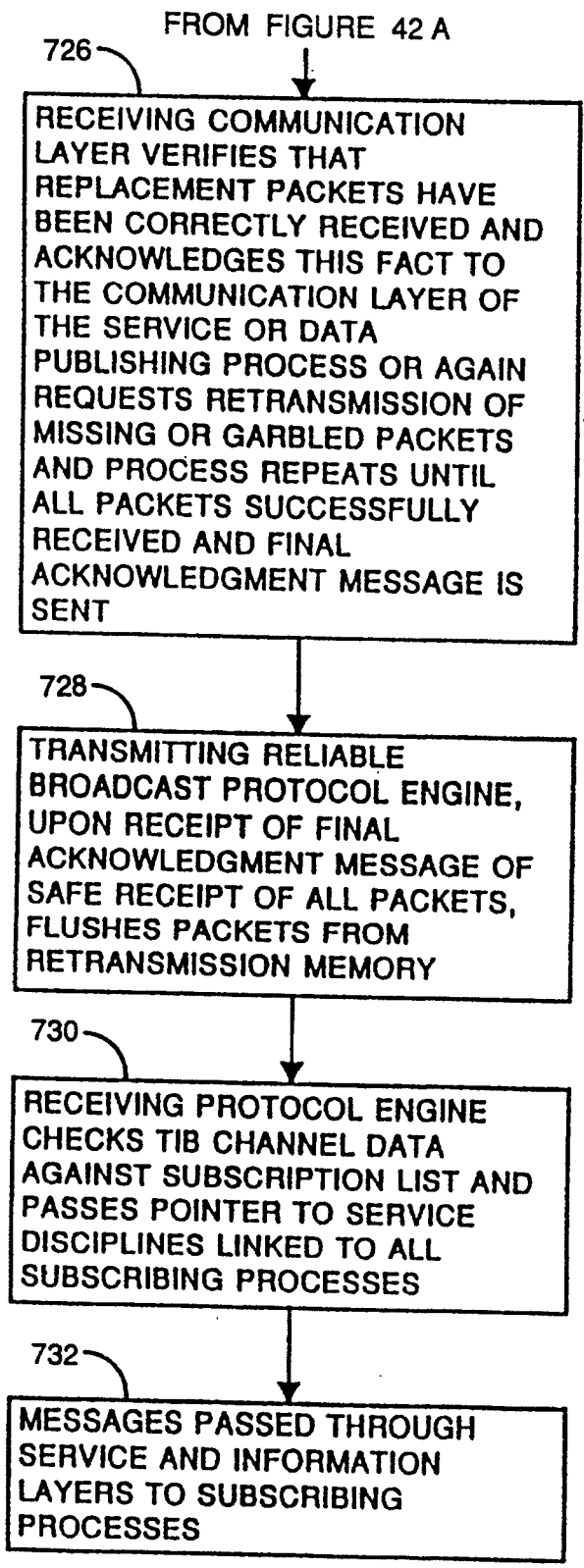

Referring to FIG. 42 comprised of FIGS. 42A and 42B, there is shown a flow chart of the processing by the communication layer of the subscribing process in the reliable broadcast protocol. The packets broadcast on the network are picked up by all network interface cards of all hosts on the network which then invoke the transport protocol software of the operating systems of the various hosts. The transport protocols then notify the daemons of the communication layers that a broadcast message has arrived and puts the packets in an interprocess transfer mechanism, usually shared memory. The daemons then retrieve the packets from the interprocess transfer mechanism as represented by step 718.

Step 720 represents the process of checking the TIB ® channel numbers of the incoming packets to determine if they correspond to the TIB ® channel of any open subscription. If they do, the reliability sequence numbers are checked by the reliable broadcast protocol engine against the data indicating which packets and corresponding sequence numbers should have been received to have received a complete message. In some embodiments, especially embodiments using transport, network, data link and physical layers where error checking (ECC) is not performed at layers below the TIB ® interface software of the TIB ® software, error detection and correction is performed on the packets using the ECC bits appended to the packet. If errors have occurred that are beyond the range of correction given the number of ECC bits present, the packet is marked as garbled.

After determining which packets are missing or garbled, if any, the receiving protocol engine then sends a message back to the communication layer of the service or publishing process. This message will either acknowledge that all packets have been received without a problem or will request that certain packets be retransmitted. This is symbolized by step 722.

Step 724 represents the process of retransmission of the missing or garbled packets by the communication layer of the data producing process or service. In some embodiments, the missing or garbled packets will be sent point-to-point to only the subscribing processes that did not get them. In other embodiments, the missing or garbled packets are broadcast to nodes with notification messages being sent to the subscribing processes that need them to listen on TIB ® channel XX where XX is the TIB ® channel on which the packets will be broadcast. The phrase "listen to channel XX" as it is used here has nothing to do with the actual transmission frequency, timeslot or other physical characteristic of the transmission. It merely means that the missing or garbled packets will be appearing on the network shortly and will have TIB ® channel XX routing information in their header data.

Step 726 represents the process of checking by the receiving communication layer that the replacement packets have been properly received similar to the processing of step 720. If they have, the receiving communication layer acknowledges this fact to the communication layer of the service. If not, a request for retransmission of the missing or garbled packets is again sent to the communication layer of the transmitting process, retransmission ensues and the whole process repeats until all packets have been successfully received. The final acknowledge message from the receiving communication layer to the transmitting communication layer that all packets have been successfully received causes the reliable broadcast protocol engine of the transmitting communication layer to flush all the packets from the retransmission memory as symbolized by step 728.

Step 730 represents the routing process where the reliable broadcast protocol engine checks the TIB ® channel data against the subscription list to determine which client processes have requested data assigned to this TIB ® channel. Once this information is known, the protocol engine passes a pointer to the message to all service disciplines which have entered subscriptions for data on this TIB ® channel. In some embodiments, the protocol engine will place a copy of the message in a separate interprocess transfer mechanism for every subscribing process. In other embodiments, shared memory will be the interprocess transfer mechanism and a pointer to the same copy of the message will be sent to all subscribing processes. The subscribing processes will then arbitrate for access to the message in the information layer or the service layer.

Step 732 represents the processes previously described of passing the message up through the service and information layers to the subscribing process by successive interrupts causing to run the callback routines designated when the subscription was entered. Filtering by subject matter may also occur in some embodiments at the service layer and/or the information layer to guarantee a match to the subscribed subject.

Figure 43:
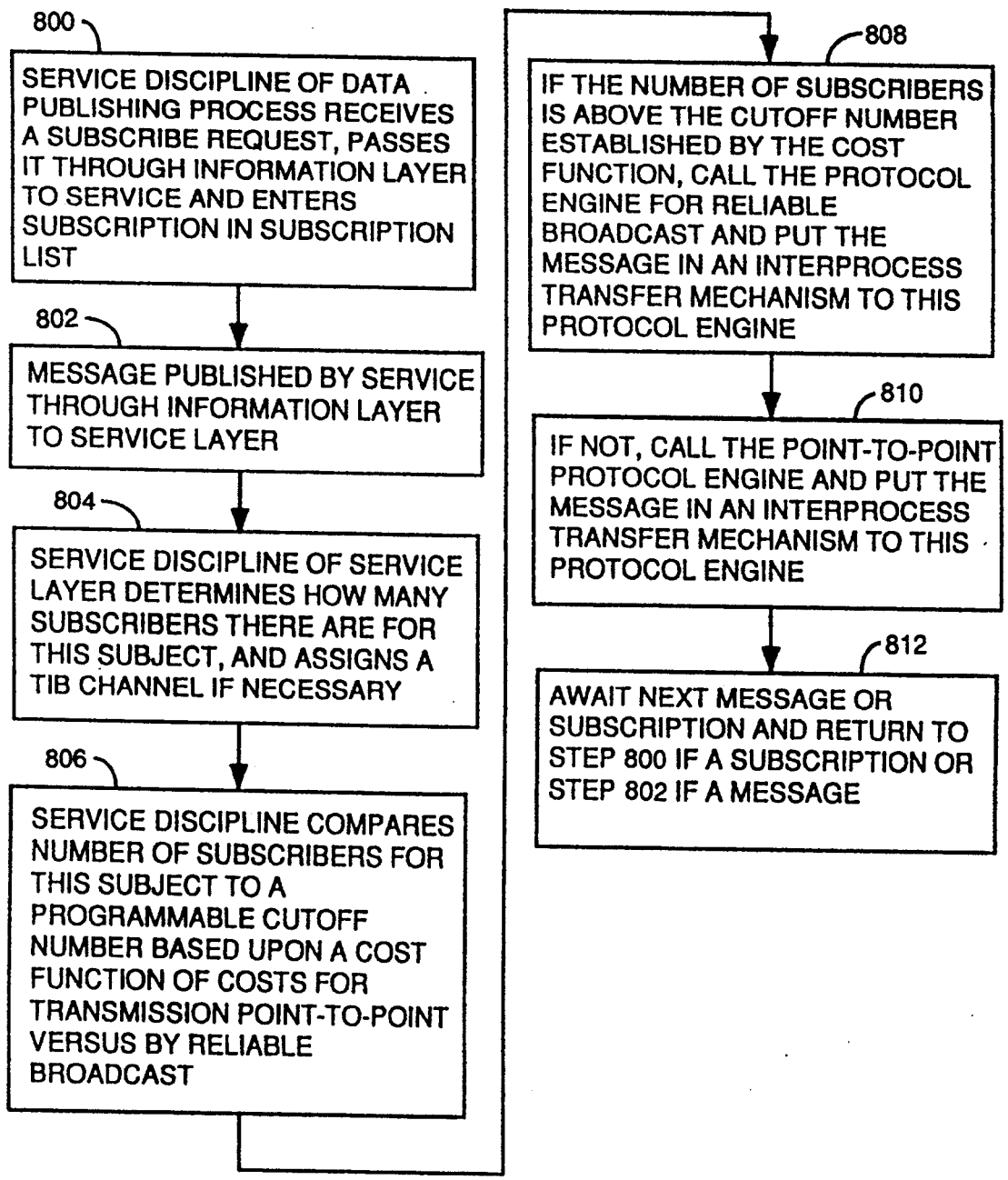
FIG. 43 is a flow chart of the processing which occurs in the service discipline to implement the Intelligent Multicast TM protocol.
Figure 44:
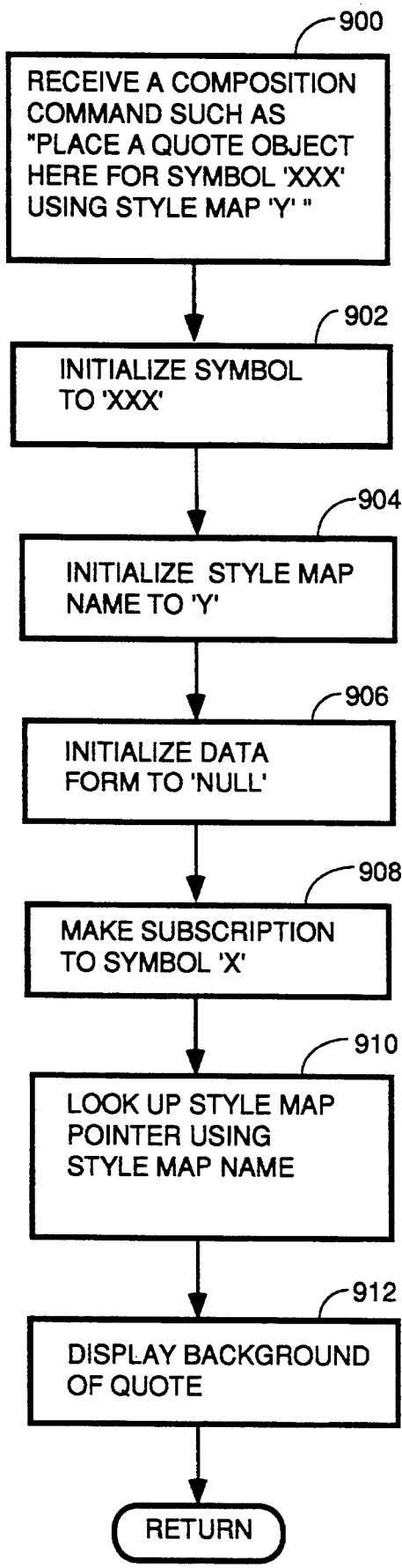
FIG. 44 represents the process of creating display objects for display of real time data using style maps and the process of using the style maps and metadata to control the process of extraction, format and display of real time data items from self-describing data objects received in a subscription stream which is initiated when a composition command is used to create a display object.

FIG. 43 is a flow chart of processing to transmit data by the intelligent Multicast communication protocol. This protocol uses either point-to-point or reliable broadcast protocols for each message depending upon the subject matter and how many subscriptions are open on this subject. The choice of protocol is automatically made for each message depending upon how many subscribing processes/network addresses there are for the message at the time the message is published. If the number of subscribers for a subject changes sufficiently, the transmission protocol may change automatically.

Step 800 represents the process of receiving a subscription request at the service layer of the data publishing process, passing this subscription along to the subscribing process and making an entry for a new subscription in the subscription table.

In step 802, a message is published by the service through the information layer to the service layer. The subject of the message may or may not be on the subject for which the new subscription was just entered. The service layer examines the subject data forwarded by the information layer about the message and coordinates with the information layer to assign a TIB ® channel to the subject if the TIB ® channel was already assigned by the service and information layers of the subscribing process as symbolized by step 804.

In step 806, the service discipline compares the number of subscribers for the subject of the message to a programmable cutoff number which is based upon the cost of transmission point-to-point versus the cost of transmission by reliable broadcast. The programmable cutoff number can be set and altered by the system administrator and is based upon any desired cost function, the nature of which is not critical to the TIB ® software. In the preferred embodiment, the cost function is comprised of a high water mark and a low water mark. If the number of subscribers is above the high water mark, the message will be sent by reliable broadcast. If the number of subscribers to this subject then subsequently falls below the low water mark, subsequent messages will be sent point-to-point. In some embodiments, the cost function can be an automatic learning program that listens to the network and subscription requests and makes the decision based upon latency time or some other criteria of network efficiency.

Step 808 represents the process of calling the reliable broadcast protocol engine if the number of subscribers is greater than the cutoff number. The message is then put in an interprocess transfer mechanism directed to this protocol engine.

If the number of subscribers is below the cutoff number, point-to-point transmission is more efficient so the service discipline calls the point-to-point protocol engine and puts the message into an interprocess transfer mechanism directed to this protocol engine as symbolized by step 810.

Step 812 represents the process of waiting for the next message or subscription and returning to step 800 if a subscription is received and to step 802 if another message is received.

In summary the concept of the TIB ® software is to use software layers to decouple applications from the complexities of the computer network communication art in ways that applications have never before been decoupled.

The teachings of the TIB ® software contemplate use of any one of these layers or any combination of the three in the various embodiments which together define a class or genus of software programs the species of which implement the specific functions or combinations thereof defined herein.

There follows a more detailed specification of the various library programs and the overall structure and functioning of an embodiment of the communication interface according to the teachings of the TIB ® software.

Information Driven Architecture TM, Teknekron Information Bus TM, TIB ®, TIB ®INFO TM, TIB ® FORMS TM, Subject-Based Addressing TM, and RMDP TM are trademarks of Teknekron Software Systems, Inc.

CONTENTS

1. Introduction
2. Teknekron Information Bus Architecture
3. Reliable Market Data Protocol:RMDP
4. Subject-Addressed Subscription Service:TIB-®INFO
5. Data-exchange Component:TIB ®FORM
   1. Introduction The Teknekron Information Bus TM software (TIB ® component) is a distributed software component designed to facilitate the exchange of data among applications executing in a realtime, distributed environment. It is built on top of industry standard communication protocols (TCP/IP) and data-exchange standards (e.g., X.400).

The document is organized as follows. Section 2 gives an architectural overview of the TIB ®. Section 3 describes the Reliable Market Data Protocol. This general purpose protocol is particularly well suited to the requirements of the page-based market data services. It is also often used for bulletin and report distribution. Section 4 describes TIB ®INFO, an interface supporting Subject-based Addressing. Section 5 describes a component and its interface that supports a very flexible and extensible data-exchange standard. This component is called TIB ®FORMS.

2. Architectural Overview
2. 1. Introduction

The Teknekron Information Bus (TIB ®) is comprised of two major components: the (application-oriented) data communication component and the data-exchange component. In addition, a set of presentation tools and a set of support utilities have been built around these components to assist the application developer in the writing of TIB ® based applications.

The (application-oriented) data communication component implements an extensible framework for implementing high-level, communication protocol suites. Two protocol suites have been implemented that are tailored toward the needs of fault-tolerant, realtime applications that communicate via messages. Specifically, the suites implement subscription services that provide communication support for monitoring dynamically changing values over a network. Subscription services implement a communication paradigm well suited to distributing market data from, for example, Quotron or Telerate.

One of the protocol suites supports a traditional service-oriented cooperative processing model. The other protocol suite directly supports a novel information-oriented, cooperative processing model by implementing subject-based addressing. Using this addressing scheme, applications can request information by subject through a general purpose interface. Subject-based addressing allowing information consumers to be decoupled from information producers; thereby, increasing the modularity and extensibility of the system.

The application-oriented protocol suites are built on top of a common set of communication facilities called the distributed communications component. In addition to providing reliable communications protocols, this layer provides location transparency and network independence to its clients.

The layer is built on top of standard transport-layer protocols (e.g., TCP/IP) and is capable of supporting multiple transport protocols. The data-exchange component implements a powerful way of representing and transmitting data. All data is encapsulated within self-describing data objects, called TIB ® forms or, more commonly, simply forms. Since TIB ® forms are self-describing, they admit the implementation of generic tools for data manipulation and display. Such tools include communication tools for sending forms between processes in a machine-independent format. Since a self-describing form can be extended without adversely impacting the applications using it, forms greatly facilitate modular application development.

The two major components of TIB ® were designed so that applications programmers can use them independently or together. For example, forms are not only useful for communicating applications that share data, but also for non-communicating applications that desire to use the generic tools and modular programming techniques supported by forms. Such applications, of course, do not need the communication services of the TIB ®. Similarly, applications using subject-based addressing, for example, need not transmit forms, but instead can transmit any data structure. Note that the implementation of the communication component does use forms, but it does not require applications to use them.

2.2. System Model

The system model supported by the TIB ® consists of users, user groups, networks, services, service instances (or servers), and subjects.

The concept of a user, representing a human "end user," is common to most systems. A user is identified by a user ID. The TIB ® user ID is normally the same as the user ID (or log on ID) supported by the underlying operating system, but it need not be.

Each user is a member of a exactly one group. The intention is that group should be composed of users with similar service access patterns and access rights. Access rights to a service or system object are grantable at the level of users and at the level of groups. The system administrator is responsible for assigning users to groups.

A network is a logical concept defined by the underlying transport layer and is supported by the TIB ®. An application can send or receive across any of the networks that its host machine is attached to. It also supports all gateways functions and inter-network routing that is supported by the underlying transport-layer protocols.

Since the lowest layer of the TIB ® communication component supports multiple networks, application-oriented protocols can be written that transparently switch over from one network to another in the event of a network failure.

A service represents a meaningful set of functions that are exported by an application for use by its clients. Examples of services are an historical news retrieval service, a Quotron data feed, and a trade ticket router. An application will typically export only one service, although it can export many different services.

A service instance is an application process capable of providing the given service. (Sometimes these are called "server processes.") For a given service, several instances may be concurrently providing it, so as to improve performance or to provide fault tolerance. Application-oriented communication protocols in the TIB ® can implement the notion of a "fault-tolerant" service by providing automatic switch over from a failed service instance to an operational one providing the same service.

Networks, services, and servers are traditional components of a system model and are implemented in one fashion or another in most distributed systems. On the other hand, the notion of a subject is novel to the information model implemented by the TIB ®.

The subject space consists of a hierarchical set of subject categories. The current release of the TIB ® supports a 4 level hierarchy, as illustrated by the following well formed subject: "equity.ibm.composite.trade." The TIB ® itself enforces no policy as to the interpretation of the various subject categories. Instead, the applications have the freedom and responsibility to establish conventions on use and interpretation of subject categories.

Each subject is typically associated with one or more services producing data about that subject. The subject-based protocol suites of the TIB ® are responsible for translating an application's request for data on a subject into communication connections to one or more service instances providing information on that subject.

A set of subject categories is referred to as a subject domain. The TIB ® provides support for multiple subject domains. This facility is useful, for example, when migrating from one domain to another domain. Each domain can define domain-specific subject encoding functions for efficiently representing subjects in message headers.

2.3. Process Architecture

The communication component of the TIB ® is a truly distributed system with its functions being split between a front end TIB ® communication library, which is linked with each application, and a back end TIB ® communication daemon process, for which there is typically one per host processor. Note that this functional split between TIB ® library and TIB ® daemon is completely transparent to the application. In fact, the application is completely unaware of the existence of the TIB ® daemon, with the exception of certain failure return codes.

The TIB ® daemons cooperate among themselves to ensure reliable, efficient communication between machines. For subject-addressed data, they assist in its efficient transmission by providing low level system support for filtering messages by subject.

The TIB ® communication library performs numerous functions associated with each of the application-oriented communication suites. For example, the library translates subjects into efficient message headers that are more compact and easier to check than ASCII subject values. It also maps service requests into requests targeted for particular service instances, and monitors the status of those instances.

The data-exchange component of TIB ® is implemented as a library, called the TIB ® form library, that is linked with the application. This library provides all of the core functions of the data-exchange component and can be linked independently of the TIB ® communication library. The TIB ® form library does not require the TIB ® communication daemon.

2.4. Communication Component

The TIB ® Communication Component consists of 3 sub-components: the lower-level distributed communication component (DCC), and two high-level application-oriented communication protocol suites, i.e., the Market Data Subscription Service (MDSS), and the Subject-Addressed Subscription Service (SASS).

The high-level protocol suites are tailored around a communication paradigm known as a subscription. In this paradigm, a data consumer "subscribes" to a service or subject, and in return receives a continuous stream of data about the service or subject until the consumer explicitly terminates the subscription (or a failure occurs). A subscription paradigm is well suited for realtime applications that monitor dynamically changing values, such as a stock's price. In contrast, the more traditional request/reply communication paradigm is ill-suited for such realtime applications, since it requires data consumers to "poll" data providers to learn of changes.

The principal difference between the two high-level protocols is that the MDSS is service-oriented and SASS is subject-oriented. Hence, for example, MDSS supports the sending of operations and messages to services, in addition to supporting subscriptions; whereas, SASS supports no similar functionality.

2.1.4. Market Data Subscription Service 2.4.1.1. Overview

MDSS allows data consumers to receive a continuous stream of data, tolerant of failures of individual data sources. This protocol suite provides mechanisms for administering load balancing and entitlement policies.

Two properties distinguish the MDSS protocols from the typical client/server protocols (e.g. RPC). First, subscriptions are explicity supported, whereby changes to requested values are automatically propagated to clients. Second, clients request (or subscribe) to a service, as opposed to a server, and it is the responsibility of the MDSS component to forward the client's request to an available server. The MDSS is then responsible for monitoring the server connection and reestablishing if it fails, using a different server, if necessary.

The MDSS has been designed to meet the following important objectives:

(1) Fault tolerance

By supporting automatic switchover between redundant services, by explicitly supporting dual (or triple) networks, and by utilizing the fault-tolerant transmission protocols implemented in the DCC (such as the "reliable broadcast protocols"), the MDSS ensures the integrity of a subscription against all single point failures. An inopportune failure may temporarily disrupt a subscription, but the MDSS is designed to detect failures in a timely fashion and to quickly search for an alternative communication path and/or server. Recovery is automatic as well.

(2) Load balancing

The MDSS attempts to balance the load across all operational servers for a service. It also rebalances the load when a server fails or recovers. In addition, the MDSS supports server assignment policies that attempts to optimize the utilization of scarce resources such as "slots" in a page cache or bandwidth across an external communication line.

(3) Network efficiency

The MDSS supports the intelligent multicast protocol implemented in the DCC. This protocol attempts to optimize the limited resources of both network bandwidth and processor I/O bandwidth by providing automatic, dynamic switchover from point-to-point communication protocols to broadcast protocols. For example, the protocol may provide point-to-point distribution of Telerate page 8 to the first five subscribers and then switch all subscribers to broadcast distribution when the sixth subscriber appears.

(4) High-level communication interface

The MDSS implements a simple, easy-to-use application development interface that mask most of the complexities of programming a distributed system, including locating servers, establishing communication connections, reacting to failures and recoveries, and load balancing.

2.4.1.2. Functionality

The MDSS supports the following core functions:

get; MDSS establishes a fault-tolerant connection to a server for the specified service and "gets" (i.e., retrieves) the current value of the specified page or data element. The connection is subscription based so that updates to the specified page are automatically forwarded.

halt; "halt" the subscription to the specified service.

derive; sends a modifier to the server that could potentially change the subscription.

The MDSS protocol has been highly optimized to support page-oriented market data feed, and this focus has been reflected in the choice of function names. However, the protocol suite itself is quite general and supports the distribution of any type of data. Consequently, the protocol suite is useful and is being used in other contexts (e.g., data distribution in an electronic billboard).

2.4.2. Subject-Addressed Subscription Service (SASS)

2.4.2.1. Overview

The SASS is a sophisticated protocol suite providing application developers a very high-level communications interface that fully supports the information-oriented, cooperative processing model. This is achieved through the use of subject-based addressing.

The basic idea behind subject-based addressing and the SASS's implementation of it is straightforward. Whenever an application requires a piece of data, especially, data that represents a dynamically changing value (e.g. a stock price), the application simply subscribes to that data by specifying the appropriate subject. For example, in order to receive all trade tickets on IBM, an application may issue the following subscription: "trade_ticket.IBM". Once an application has subscribed to a particular subject, it is the responsibility of the SASS to choose one or more service instances providing information on that subject. The SASS then makes the appropriate communications connections and (optionally) notifies the service instances providing the information.

The SASS has been designed to meet several important objectives:

(1) Decoupling information consumers from information providers.

Through the use of subject-based addressing, information consumers can request information in a way that is independent of the application producing the information. Hence, the producing application can be modified or supplanted by a new application providing the same information without affecting the consumers of the information.

(2) Efficiency

Support for filtering messages by subject is built into the low levels of the TIB® daemon, where it can be very efficient. Also, the SASS supports filtering data at the producer side: data that is not currently of interest to any application can simply be discarded prior to placing in on the network; thereby, conserving network bandwidth and processor I/O bandwidth.

(3) High-level communication interface

The SASS interface greatly reduces the complexities of programming a distributed application in three ways. First, the consumer requests information by subject, as opposed to by server or service. Specifying information at this level is easier and more natural than at the service level. Also, it insulates the program from changes in service providers (e.g., a switch from IDN to Ticker 3 for equity prices). Second, the SASS presents all data through a simple uniform interface: a programmer needing information supplied by three services need not learn three service-specific protocols, as he would in a traditional processing model. Third, the SASS automates many of the hard or error-prone tasks, such as searching for an appropriate service instance, and establishing the correct communication connection.

2.4.2.2. Functionality

For a data consumer, the SASS provides three basic functions:

subscribe; where the consumer requests information on a realtime basis on one or more subjects. The SASS components sets up any necessary communication connections to ensure that all data matching the given subject(s) will be delivered to the consumer. The consumer can specify that data be delivered either asynchronously (interrupt-driven) or synchronously. A subscription may result in the producer service instance being informed of the subscription. This occurs whenever the producer has set up a registration procedure for its service. This notification of the producer via any specified registration procedure is transparent to the consumer.

cancel; which is the opposite of subscribe. The SASS component gracefully closes down any dedicated communication channels, and notifies the producer if an appropriate registration procedure exists for the service.

receive; receive and "callbacks" are two different ways for applications to receive messages matching their subscriptions. Callbacks are asynchronous and support the event driven programming style; a style that is particularly well-suited for applications requiring realtime data exchange. "Receive" supports a traditional synchronous interface for message receipt.

For a data producer, the SASS provides a complementary set of functions.

Note that an application can be both a producer and a consumer with respect to the SASS, and this is not uncommon.

2.4.3. Distributed Communication Component
2.4.3.1. Overview

The Distributed Communication Component (DCC) provides communication services to higher-level TIB ® protocols, in particular, it provide several types of fault transparent protocols.

The DCC is based on several important objectives:

(1) The provision of a simple, stable, and uniform communication model.

This objective offers several benefits. First, it offers increased programmer productivity by shielding developers from the complexities of a distributed environment; locating a target process, establishing communications with it, and determining when something has gone awry are all tasks best done by a capable communications infrastructure, not by the programmer. Second, it reduces development time, not only by increasing programmer productivity, but also by simplifying the integration of new features. Finally, it enhances the ability to configure the network by keeping applications unaware of the physical distribution of other components. This prevents developers from building in dependencies based on a particular physical configuration. (Such dependencies would complicate subsequent reconfiguration.)

(2) Portability through encapsulation of important system structures.

This objective achieves importance when migration to a new hardware or software environment becomes necessary. The effort expended in shielding applications from the specific underlying communication protocols and access methods pays off handsomely at that time. By isolating the required changes in a small portion of the system (in this case, the DCC), applications can be ported virtually unchanged, and the firm's application investment is protected.

(3) Efficiency.

This is particular important in this component. To achieve this, the DCC builds on top of less costly "connectionless" transport protocols in standard protocol suites (e.g., TCP/IP and OSI). Also, the DCC has been carefully designed to avoid the most costly problem in protocols: the proliferation of data "copy" operations.

The DCC achieves these objectives by implementing a layer of services on top of the basic services provided by vendor-supplied software. Rather than re-inventing basic functions like reliable data transfer or flow-control mechanisms, the DCC concentrates on shielding applications from the idiosyncrasies of any one particular operating system. Examples include the hardware-oriented interfaces of the MS-DOS environment, or the per-process file descriptor limit of UNIX. By providing a single, unified communication tool that can be easily replicated in many hardware or software environment, the DCC fulfills the above objectives.

2.4.3.2. Functionality

The DCC implements several different transmission protocols to support the various interaction paradigms, fault-tolerance requirements, and performance requirements imposed by the high-level protocols. Two of the more interesting protocols are reliable broadcast and intelligent multicast protocols.

Standard broadcast protocols are not reliable and are unable to detect lost messages. The DCC reliable broadcast protocols ensure that all operational hosts either receive each broadcast message or detects the loss of the message. Unlike many so-called reliable broadcast protocols, lost messages are retransmitted on a limited, periodic basis.

The intelligent multicast protocol provides a reliable data stream to multiple destinations. The novel aspect of the protocol is that it can dynamically switch from point-to-point transmission to broadcast transmission in order to optimize the network and processor load. The switch from point-to-point to broadcast (and vice versa) is transparent to higher-level protocols. This protocol admits the support of a much larger number of consumers than would be possible using either point-to-point or broadcast alone. The protocol is built on top of other protocols within the DCC.

Currently, all DCC protocols exchange data only in discrete units, i.e., "messages" (in contrast to many Transport protocols). The DCC guarantees that the messages originating from a single process are received in the order sent.

The DCC contains fault-tolerant message transmission protocols that support retransmission in the event of a lost message. The package guarantees "at-most-once" semantics with regards to message delivery and makes a best attempt to ensure "exactly once" semantics.

The DCC contains no exposed interfaces for use by application developers.

3. RELIABLE MARKET DATA PROTOCOL
3.1. Introduction

The Reliable Market Data Protocol (RMDP) defines a programmatic interface to the protocol suite and services comprising the Market Data Subscription Service (MDSS) TIB ® sub component. RMDP allows market data consumers to receive a continuous stream of data, based on a subscription request to a given service. RMDP tolerates failures of individual servers, by providing facilities to automatically reconnect to alternative servers providing the same service. All the mechanisms for detecting server failure and recovery, and for hunting for available servers are implemented in the RMDP library. Consequently, application programs can be written in a simple and naive way.

The protocol provides mechanisms for administering load balancing and entitlement policies. For example, consider a trading room with three Telerate lines. To maximize utilization of the available bandwidth of those Telerate lines, the system administrator can "assign" certain commonly used pages to particular servers, i.e., page 5 to server A, page 405 to server B, etc. Each user (or user group) would be assigned a "default" server for pages which are not explicitly preassigned. (These assignments are recorded in the TIB ® Services Directory.)

To accommodate failures, pages or users are actually assigned to prioritized list of servers. When a server experiences a hardware or software failure, RMDP hunts for and connects to the next server on the list. When a server recovers, it announces its presence to all RMDP clients, and RMDP reconnects the server's original clients to it. (Automatic reconnection avoids situations where some servers are overloaded while others are idle.) Except for status messages, failure and recovery re-connections are transparent to the application.

The MDSS protocol suite, including RMDP, is built on top of the DCC and utilizes the reliable communication protocols implemented in that component. In particular, the MDSS suite utilizes the reliable broadcast protocols and the intelligent multicast protocol provided therein. RMDP supports both LANs and wide area networks (WANs). RMDP also supports dual (or multiple) networks in a transparent fashion.

RMDP is a "service-addressed" protocol; a complementary protocol, TIB®INFO, supports "subject-based addressing."

3.2. Programmatic Interface

RMDP programs are event-driven. All RMDP function calls are non-blocking: even if the call results in communication with a server, the call returns immediately. Server responses, as well as error messages, are returned at a later time through an application-supplied callback procedure.

The principal object abstraction implemented in RMDP is that of an Rstream, a "reliable stream," of data that is associated with a particular subscription to a specified service. Although, due to failures and recoveries, different servers may provide the subscription data at different times, the Rstream implements the abstraction of a single unified data stream. Except for short periods during failure or recovery reconnection, an Rstream is connected to exactly one server for the specified service. An application may open as many Rstreams as needed, subject only to available memory.

An Rstream is bidirectional—in particular, the RMDP client can send control commands and messages to the connected server over the Rstream. These commands and messages may spur responses or error messages from the server, and in one case, a command causes a "derived" subscription to be generated. Regardless of cause, all data and error messages (whether remotely or locally generated) are delivered to the client via the appropriate Rstream.

The RMDP interface is a narrow interface consisting of just six functions, which are described below.

```
void
rmdp_SetProp(property,   value)
rmdp_prop_t property;
caddr_t value;
```

Used to set the values of RMDP properties. These calls must be made before the call to rmdp_Init(). Required properties are marked with '.' in the list below. Other properties are optional. The properties currently used are:

*RMDP_CALLBACK

Pointer to the callback function. See the description of callback below.

RMDP_SERVICE_MAP

The name of Services Directory to be used in lieu of the standard directory.

RMDP_GROUP

The user group used to determine the appropriate server list. Should be prefixed with '+'. Default is group is "+" (i.e. the null group).

RMDP_RETRY_TIME

The number of seconds that the client will wait between successive retries to the same server, e.g., in the case of cache full." Default is 30.

RMDP_QUIET_TIME

The time in seconds that a stream may be "quiet" before the protocol assumes that the server has died and initiates a "hunt" for a different server. Default is 75.

RMDP_VERIFY_TIME

The time in seconds between successive pings of the server by the client. Default is 60.

RMDP_APP_NAME

The name of the application i.e. "telerate", "reuters" etc. If this property is set, then the relevant entries from the Service Directory will be cached.

```
void
rmdp_init( );
```

This initializes the internal data structures and must be called prior to any calls to rmdp_Get().

```
RStream
rmdp_Get(service,   request,   host)
char *service, *request, *host;
```

This is used to get a stream of data for a particular 'service' and subscription 'request'. For the standard market data services, the request will be the name of a page (e.g., "5", "AANN"). If 'host' is non-NULL, then the RMDP will only use the server on the given host. In this case, no reconnection to alternative servers will be attempted upon a server failure. If 'host' is NULL, then RMDP will consult the TIB® Services Directory to identify a list of server alternatives for the request. 'rstream' is an opaque value that is used to refer to the stream. All data passed to the application's callback function will be identified by this value.

An error is indicated by RStream rstream==NULL.

```
RStream
rmdp_Derive(rstream,   op)
RStreamold;
char         *op;
```

This generates a new subscription and, hence, a new 'Rstream' from an existing subscription. 'command' is a string sent to the server, where it is interpreted to determine the specific derivation.

The standard market data servers understand the following commands: "n" for next-page, "p" for previous-page and "t XXXX" for time-page.

Derived streams cannot be recovered in the case of server failure. If successful, an Rstream is returned, otherwise NULL is returned.

```
void
rmdp_Message(rstream,   msg)
RStreamrstream;
char         *msg;
```

Sends the string 'msg' to the server used by 'rstream'. The messages are passed directly to the server, and are not in any way affected by the state of the stream. The messages are understood by the standard market data servers include "rr<PAGE NAME>" to re-request a page, and "q a" to request the server's network address. Some messages induce a response from the server (such as queries). In this case, the response will be delivered to all streams that are connected to the server.

```
void
rmdp_Halt(rstream)
RStreamrstream;
```

This gracefully halts the 'rstream'.

```
void
callback(rstream,   msgtype,   msg,   act,   err)
RStreamrstream;
mdp_msg_t           msgtype;
char                *msg;
mdp_act_t act;
mdp_err_t err;
```

This is the callback function which was registered with rmdp_SetProp(RMDP_CALLBACK, callback). 'rstream' is the stream to which the message pertains. 'msgtype' can be any of the values defined below (see "RMDP Message Type"). 'msg' is a string which may contain vt100 compaTIB®le escape sequences, as in MDSS. (It will NOT however be prefaced with an∧[[ ... E. That role is assumed by the parameter 'msgtype'.)

The last two parameters are only meaningful if 'msgtype' is MDP_MSG_STATUS. 'act' can be any of the values found in "RMDP Action Type" (see below), but special action is necessary only if act==='MDP_ACT_CANCEL'. The latter indicates that the stream is being canceled and is no longer valid. It is up to the application to take appropriate action. In either case, 'err' can be any of the values found in "RMDP Error Type" (see below), and provides a description of the status.

RMDP Message Types (mdp_msg_t)

The message types are listed below. These types are defined in the underlying (unreliable) Market Data Protocol (MDP) and are exported to the RMDP.

| | |
|---|---|
| MDP_MSG_BAD = −1 | |
| MDP_MSG_DATA = 0 | Page data message. |
| MDP_MSG_STATUS = 1 | Status/error message. |
| MDP_MSG_OOB = 2 | "Out of Band" message, e.g., time stamp. |
| MDP_MSG_QUERY = 3 | Query result. |

RMDP Action Type (mdp_act_t)

The action types are listed below. These action types inform the RMDP clients of activities occurring in the lower level protocols. Generally speaking, they are "for your information only" messages, and do not require additional actions by the RMDP client. The exception is the "MDP_ACT_CANCEL" action, for which there is no recovery. These types are defined in the underlying (unreliable) Market Data Protocol (MDP) and are exported to the RMDP.

| | |
|---|---|
| MDP_ACT_OK = 0 | No unusual action required. |
| MDP_ACT_CANCEL = 1 | The request cannot be serviced, cancel the stream, do not attempt to reconnect. (E.g., invalid page name.) |
| MDP_ACT_CONN_FIRST = 2 | The server is closing the stream; the first server in the alternatives list is being tried. (E.g., the server is shedding "extra" clients for load balancing.) |
| MDP_ACT_CONN_NEXT = 3 | The server is closing the stream; the next server in the alternatives list is being tried. (E.g., the server's line to host fails.) |
| MDP_ACT_LATER = 4 | Server cannot service request at this time; will resubmit request later, or try a different server. (E.g., Cache full.) |
| MDP_ACT_RETRY = 5 | Request is being retried immediately. |

RMDP Error Types (mdp_err_t)

Description of error, for logging or reporting to end user. These types are defined in the underlying (unreliable) Market Data Protocol (MDP) and are exported to the RMDP.

| |
|---|
| MDP_ERR_OK = 0 |
| MDP_ERR_LOW = 1 |
| MDP_ERR_QUIET = 2 |
| MDP_ERR_INVAL = 3 |
| MDP_ERR_RESRC = 4 |
| MDP_ERR_INTERNAL = 5 |
| MDP_ERR_DELAY = 6 |
| MDP_ERR_SYS = 7 |
| MDP_ERR_COMM = 8 |

4. Subject-Addressed Subscription Service:TIB®INFO 4.1. Introduction

TIB®INFO defines a programmatic interface to the protocols and services comprising the TIB® sub-component providing Subject-Addressed Subscription Services (SASS). The TIB®INFO interface consists of libraries: TIB®INFO_CONSUME for data consumers, and TIB®INFO_PUBLISH for data providers. An application includes one library or the other or both depending on whether it is a consumer or provider or both. An application can simultaneously be a consumer and a producer.

Through its support of Subject-Based Addressing, TIB®INFO supports a information-oriented model of cooperative processing by providing a method for consumers to request information in a way that is independent of the service (or services) producing the information. Consequently, services can be modified or replaced by alternate services providing equivalent information without impacting the information consumers. This decoupling of information consumers from information providers permits a higher degree of modularization and flexibility than that permitted by traditional service-oriented processing models.

For Subject-Based Addressing to be useful in a real time environment, it must be efficiently implemented. With this objective in mind, support for Subject-Based Addressing has been built into the low levels of the Distributed Communications Component. In particular, the filtering of messages by subject is performed within the TIB® daemon itself.

4.2. Concepts

Subject

The subject space is hierarchical. Currently, a 4-level hierarchy is supported of the following format:

major[.minor[.qualifier1[.qualifier2]]]

where '[' and ']' are metacharacters that delimit an optional component. major, minor, qualifier1 and qualifier2 are called subject identifiers. A subject identifier is a string consisting of the printable ascii characters excluding '.', '?', and '*'. A subject identifier can be an empty string, in which case it will match with any subject identifier in that position. The complete subject, including the '.' separators, cannot exceed 32 characters. Subjects are case sensitive.

Some example of valid subjects are listed below: The comments refer to the interpretation of subjects on the consume side. (The publish-side semantics are slightly different.)

| | |
|---|---|
| equity.ibm.composite.quote | |
| equity..composite.quote | matches any minor subject |
| equity.ibm | matches any qualifier1 and qualifier2 |
| equity.ibm. | same as above |

Within the TIB®INFO and the SASS, subjects are not interpreted. Hence, applications are free to establish conventions on the subject space. It should be noted that SASS components first attempt to match the major and minor subject identifiers first. As a consequence, although applications can establish the convention that "equity.ibm" and "..equity.ibm" are equivalent subjects, subscriptions to "equity.ibm" will be more efficiently processed.

Stream

A stream is an abstraction for grouping subscriptions. The subscriptions on a stream share a common set of properties, notably the same message handler (i.e., "callback" routine) and the same error handler. All subscriptions on a stream can be "canceled" simply by destroying the stream.

A stream imposes little overhead on the system. They can therefore be freely created and destroyed.

Protocol Engines, Service Disciplines, and Subject Mappers

The SASS and DCC components implement many support services in order to provide the functionality in TIB®INFO. These include subject mappers for efficiently handling subjects, service disciplines for controlling the interaction with servers, and protocol engines for implementing reliable communication protocols. TIB®INFO provides an interface for setting properties of these components. Hence, by setting the appropriate properties, one can specify, for example, the behavior of the subject mapper through the TIB®INFO interface. Since these properties are in configuration files, configuration and site dependent parameters can be altered for the above components by the system administrator through TIB®INFO.

In some embodiments, the property definitions for TIB®INFO and for the underlying components may be augmented to support enhancements. This use of properties yields flexibility and extensibility with the confines of a stable functional interface.

4.3. Description

The TIB®INFO interface is high-level and easy to use. Published data can be a form or an uninterpreted byte string. Messages can be received either in a synchronous fashion, or in an asynchronous fashion that is suitable for event-driven programming. The following functions are sufficient to write sophisticated consumers using event-driven programming.

| | |
|---|---|
| TIB ®_stream | *TIB ®_consume_create(property-list, TIB ®_EOP) |

Creates a TIB®INFO stream that supports multiple subscriptions via the "subscribe"]function. The property_list is a (possibly empty) list of property value pairs, as illustrated by

| |
|---|
| TIB ®_consume_create(TIB ®_PROP_MSGHANDLER, my_handler, TIB ®_PROP_ERRHANDLER, my_err_handler, TIB ®_EOP); |

Valid properties are defined below. TIB®_EOP is a literal signaling the end of the property list.

| |
|---|
| void    TIB ®_destroy(stream) TIB ®_stream *stream; |

Reclaims resources used by the specified stream.

| | | |
|---|---|---|
| TIB ®_errorcode | TIB ®_subscribe(stream, | subject, clientdata) |
| TIB ®_stream   *stream; | | |
| TIB ®_subject*subject; | | |
| caddr_t      clientdata; | | |

Informs the TIB® software that the client application is interested in messages having the indicated subject. If stream has an associated "message-handler," then it will be called whenever a message satisfying the subscription arrives. Qualifying messages are delivered on a first-in/first-out basis. The value of clientdata is returned in every message satisfying the subscription subject. Note that multiple subscriptions to the same subject on the same stream are undefined.

| |
|---|
| void    TIB ®_cancel(stream) TIB ®_stream *stream; |

Cancels the client application's subscription to the specified subject.

| |
|---|
| void my_message_handler(stream,msg) TIB ®_stream   *stream; TIB ®_message *message; |

This is the "callback" function that was registered with the stream. Forms are returned unpacked. The function can reference the entire message structure through the macros described below.

The following functions are sufficient to write producers. Two publishing functions are provided to support the different data types that can be transmitted through the TIB®-INFO interface.

| | |
|---|---|
| TIB ®_publish_create(property-list, | TIB ®_EOP) |

Is used to create an TIB®INFO stream for publishing records. The property_list is a (possibly empty) list of property-value pairs, as illustrated by

```
TIB ®_publish_create(TIB ®_PROP_ERRHANDLER,my_handler,TIB ®_
EOP);
```

Valid properties are defined below. TIB ®_EOP is a constant signaling the end of the property list.

```
            TIB ®_destroy(stream)
            TIB ®_stream   stream;
```

Reclaims resources used by the specified stream.

```
TIB ®_errorcode    TIB ®_publish_form(stream,  subject,
                       form)
TIB ®_stream    *stream;
TIB ®_subject   *subject;
Form            form;
```

Accepts a single, unpacked form, packs it, and publishes it.

```
TIB ®_errorcode    TIB ®_publish_buffer(stream,  subject,
                       length, form)
TIB ®_stream
  *stream;
TIB ®_subject-
*subject;
short   length;
Form    form;
```

Accepts a byte buffer of specified length and publishes it.

The remaining functions are control functions that apply to both the consume and the publish side.

```
            void    TIB ®_batch ( )
```

This may be used prior to initiating multiple subscriptions. It informs the TIB ® library that it can delay acting on the subscriptions until a TIB ®_unbatch is seen. This allows the TIB ® library to attempt to optimize the execution of requests. Note that no guarantees are made about the ordering or timing of "batched" request. In particular, (i) requests may be executed prior to the receipt of the TIB ®_unbatch function, and (ii) the effects of changing properties in the middle of a batched sequence of requests is undefined. Batch and unbatch requests may be nested. (Note that the use of TIB ®_batch is completely optional and it does not change the semantics of a correct program.)

```
TIB ®_errorcode    TIB ®_stream_set(stream,  property,
                       value)
TIB ®_stream   *stream;
```

```
                        -continued
TIB ®property    *property;
caddr_t          value;
```

Used to change the dynamically settable properties of a stream. These properties are described below. Note that some properties can only be set prior to stream creation (via TIB ®_default_set) or at stream creation.

```
caddr_t      TIB ®_stream_get(stream,   property)
TIB ®_stream    *stream;
TIB ®_property  *property;
```

Used to retrieve the current value of the specified property.

```
TIB ®_errorcode    TIB ®_default_set( property, value)
TIB ®_stream *stream;
TIB ®_property  *property;
caddr_t         value;
```

Used to change the initial properties of a stream. During stream creation, the default values are used as initial values in the new stream whenever a property value is not explicitly specified in the creation argument list.

```
TIB ®_errorcode    TIB ®_default_get( property)
TIB ®_stream    *stream;
TIB ®_property  *property;
```

Used to retrieve the default value of the specified property.

```
            TIB ®_unbatch( )
```

Informs TIB ®INFO to stop "batching" functions and to execute any outstanding ones.

TIB ®INFO Attributes

The properties defined by TIB ®INFO and their allowable values are listed below and are described in detail in the appropriate "man" pages. The last grouping of properties allow the programmer to send default property values and hints to the underlying system components; specifically, the network protocol engines, the TIB ® subject mapper, and various service disciplines.

| | |
|---|---|
| TIB ®_PROP_CFILE | cfile-handle |
| TIB ®PROP_CLIENTDATA | pointer |
| TIB ®_PROP_ERRHANDLER | error-handler-routine |
| TIB ®_PROP_LASTMSG | TIB ®_message pointer |
| TIB ®_PROP_MSGHANDLER | message-handler-routine |
| TIB ®_PROP_NETWORK | protocol-engine-property-list |
| TIB ®_PROP_NETWORK_CFILE | protocol-engine-property-cfile |
| TIB ®_PROP_SERVICE | service-discipline-property-list |
| TIB ®_PROP_SERVICE_CFILE | service-discipline-property-cfile |
| TIB ®_PROP_SUBJECT | subject_property_list |

-continued

| TIB ®_PROP_SUBJECT_CFILE | subject-property-cfile |

TIB ®INFO Message Structure

The component information of a TIB ®INFO message can be accessed through the following macros:

```
TIB ®_msg_clientdata(msg)
TIB ®_msg_subject(msg)
TIB ®_msg_size(msg)
TIB_msg_value(msg)
```

The following macros return TRUE (1) or FALSE (0):

```
TIB ®_msg_is_buffer(msg)
TIB ®_msg_is_form(msg)
```

5. TIB ® Forms

5.1 Introduction

The Forms package provides the tools to create and manipulate self-describing data objects, e.g., forms. Forms have sufficient expressiveness, flexibility and efficiency to describe all data exchanged between the different TIB ® applications, and also between the main software modules of each application.

The Forms package provides its clients with one data abstraction. Hence, the software that uses the Forms package deal with only one data abstraction, as opposed to a data abstraction for each different type of data that is exchanged. Using forms as the only way to exchange user data, facilitates (i) the integration of new software modules that communicate with other software modules, and (ii) modular enhancement of existing data formats without the need to modify the underlying code. This results in software that is easier to understand, extend, and maintain.

Forms are the principal shared objects in the TIB ® communication infrastructure and applications; consequently, one of the most important abstractions in the TIB ®.

The primary objective in designing the forms package were:

Extensibility—It is desirable to be able to change the definition of a form class without recompiling the application, and to be able introduce new classes of forms into the system.

Maintainability—Form-class definition changes may affect many workstations; such changes must be propagated systematically.

Expressiveness—Forms must be capable of describing complex objects; therefore, the form package should support many basic types such as integer, real, string, etc. and also sequences of these types.

Efficiency—Forms should be the most common object used for sending information between processes-both for processes on the same workstation and for processes on different workstations. Hence, forms should be designed to allow the communication infrastructure to send information efficiently.

Note that our use of the term "form" differs from the standard use of the term in database systems and so-called "forms management systems." In those systems, a "form is a format for displaying a database or file record. (Typically, in such system, a user brings up a form and paints a database record into the form.)

Our notion of a form is more fundamental, akin to such basic notions as record or array. Our notion takes its meaning from the original meaning of the Latin root word forma. Borrowing from Webster: "The shape and structure of something as distinguished from its material". Forms can be instantiated, operated on, passed as arguments, sent on a network, stored in files and databases. Their contents can also be displayed in many different formats. "templates" can be used to specify how a form is to be displayed. A single form (more precisely, a form class) can have many "templates" since it may need to be displayed in many different ways. Different kinds of users may, for example, desire different formats for displaying a form.

5.2. Description

Forms are self-describing data objects. Each form contains a reference to its formclass, which completely describes the form. Forms also contains metadata that enables the form package to perform most operations without accessing the related formclass definition.

Each form is a member of a specific form class. All forms within a class have the same fields and field's labels (in fact, all defining attributes are identical among the forms of a specific class). Each form class is named and two classes are considered to be distinct if they have distinct names (even though the classes may have identical definitions). Although the forms software does not assign any special meaning or processing support to particular form names, the applications using it might. (In fact, it is expected that certain form naming conventions will be established.)

There are two main classification of forms: primitive versus constructed forms, and fixed length versus variable size forms.

Primitive forms are used to represent primitive data types such as integers, float, strings, etc. Primitive forms contain metadata, in the form header information header and the data of the appropriate type, such as integer, string, etc.

Constructed forms contain sub-forms. A constructed form contains other forms, which in turn can contain subforms.

Fixed length forms are simply forms of a fixed length, e.g., all the forms of a fixed length class occupy the same number of bytes. An example for a fixed length primitive form is the integer form class; integer forms always take 6 bytes, (2 bytes for the form header and 4 bytes for the integer data).

Variable size forms contain variable size data: variable size, primitive forms contain variable size data, such as variable length string; variable size, constructed forms contain a variable number of subforms of a single class. Such forms are similar to an array of elements of the same type.

5.3. Class Identifiers

When a class is defined it is assigned an identifier. This identifier is part of each of the class's form instance, and is used to identify the form's class. This identifier is in addition to its name. Class identifiers must be unique within their context of use. Class identifiers are 2 bytes long; bit 15 is set if the class is fixed length and cleared otherwise; bit 14 is set if the class is primitive and cleared otherwise;

5.4. Assignment semantics

To assign and retrieve values of a form (or a form sequence), "copy" semantics is used. Assigning a value to a form (form field or a sequence element) copies the value of the form to the assigned location-it does not point to the given value.

Clients that are interested in pointer semantics should use forms of the basic type Form Pointer and the function Form_set_data_pointer. Forms of type Form Pointer contain only a pointer to a form; hence, pointer semantics is used for assignment. Note that the C programming language supports pointer semantics for array assignment.

5.5. Referencing a Form Field

A sub-form or field of a constructed form can be accessed by its field name or by its field identifier (the latter is generated by the Forms package). The name of a sub-form that is not a direct descendent of a given form is the path name of all the fields that contain the requested sub-form, separated by dot. Note that this is similar to the naming convention of the C language records.

A field identifier can be retrieved given the field's name and using the function Form-class_get_field_id. The direct fields of a form can be traversed by using Form_field_id_first to get the identifier of the first field, and then by subsequently calling Form_field_id_next to get the identifiers of each of the next fields.

Accessing a field by its name is convenient; accessing it by its identifier is fast. Most of the Forms package function references a form field by the field's identifier and not by the field's name.

5.6. Form-class Definition Language

Form classes are specified using the "form-class definition language," which is illustrated below. Even complex forms can be described within the simple language features depicted below. However, the big attraction of a formal language is that it provides an extensible framework: by adding new language constructs the descriptive power of the language can be greatly enhanced without rendering previous descriptions incompaTIB®le.

A specification of a form class includes the specification of some class attributes, such as the class name, and a list of specifications for each of the class's fields. Three examples are now illustrated:

```
{
short {
        IS_FIXED          true;
        IS_PRIMITIVE      true;
        DATA_SIZE            2;
        DATA_TYPE            9;
        }
short_array {    # A variable size class of shorts.
        IS_FIXED         false;
        FIELDS {
            {
                FIELD_CLASS_NAME short;
            }
        }}
example_class {
        IS_FIXED          true;
        FIELDS {
        first {
            FIELD_CLASS_NAME short;
        }
        second {
            FIELD_CLASS_NAME short_array;
        },
        third {
            FIELD_CLASS_NAME string_30;
        }
        fourth {
            FIELD_CLASS_NAME integer;
        }
        }
}}
```

To specify a class, the class's name, a statement of fixed or variable size, and a list of fields must be given. For primitive classes the data type and size must also be specified. All the other attributes may be left unspecified, and defaults will be applied. To define a class field, either the field class name or id must be specify.

The form-class attributes that can be specified are:

The class name.

CLASS_ID—The unique short integer identifier of the class. Defaults to a package specified value.

IS_FIXED—Specifies whether its a fixed or variable size class. Expects a boolean value. This is a required attribute.

IS_PRIMITIVE—Specifies whether its a primitive or constructed class. Expects a boolean value. Defaults to False.

FIELDS_NUM—An integer specifying the initial number of fields in the form. Defaults to the number of specified fields.

DATA_TYPE—An integer, specified by the clients, that indicates what is the type of the data. Used mainly in defining primitive classes. It does not have default value.

DATA_SIZE—The size of the forms data portion. Used mainly in defining primitive classes. It does not have default value.

FIELDS—Indicates the beginning of the class's fields definitions.

The field attributes that can be specified are:

The class field name.

FIELD_CLASS_ID—The class id for the forms to reside in the field. Note that the class name can be used for the same purpose.

FIELD_CLASS_NAME—The class name for the forms to reside in the field.

Here is an example of the definition of three classes:

Note that variable length forms contains fields of a single class. "integer" and "string_30", used in the above examples, are two primitive classes that are defined within the Formclass package itself.

5.7. Form Classes are Forms

Form classes are implemented as forms. This means functions that accept forms as an argument also accept form classes. Some of the more useful functions on form classes are:

Form_pack, Form_unpack—Can be used to pack and unpack form classes.

Form_copy—Can be used to copy form classes.

Form_show—Can be used to print form classes.

5.8. Types typedef Formclass

A form-class handle.

typedef Formclass_id

A form-class identifier.

typedef Formclass_attr

A form-class attribute type. Supported attributes are:

FORMCLASS_SIZE—The size of the class form instances.

FORMCLASS_NAME—The class name.

FORMCLASS_ID—A two byte long unique identifier.

FORMCLASS_FIELDS_NUM—The number of (direct) fields in the class. This is applicable only for fixed length classes. The number of fields in a variable length class is different for each instance; hence, is kept in each form instance.

FORMCLASS_INSTANCES_NUM—The number of form instances of the given class.

FORMCLASS_IS_FIXED—True if its a fixed length form, False if its a variable length form.

FORMCLASS_IS_PRIMITIVE—True if its a form of primitive type, False if its a constructed form, i.e. the form has sub forms.

FORMCLASS_DATA_TYPE—This field value is assigned by the user of the forms a to identify the data type of primitive forms. In our current application we use the types constants as defined by the enumerated type Form_data_type, in the file forms.h.

FORMCLASS_DATA_SIZE—This field contains the data size, in bytes, of primitive forms. For instance, the data size of the primitive class Short is two. Because it contains the C type short, which is kept in two bytes.

typedef Formclass_field_attr

A form-class field attribute type. Supported form class field attributes are;

FORMCLASS_FIELD_NAME—The name of the class field.

FORMCLASS_FIELD_CLASS_ID—The class id of the field's form.

typedef Form

A form handle.

typedef Form_field_id

An identifier for a form's field. It can identifies fields in any level of a form. A field identifier can be retrieved form a field name, using the function Form-class_get_get_field_name. A form_field_id is manipulated by the functions: Form_field_id_first and Form_field_id_next.

typedef Form_attr

A form attribute type. Supported form attributes are:

FORM_CLASS_ID—The form's class identifier.

FORM_DATA_SIZE—The size of the form's data. Available only for constructed, not primitive, forms or for primitive forms that are of variable size. For fixed length primitive forms this attribute is available via the form class.

FORM_FIELDS_NUM—The number of fields in the given form. Available only for constructed, not primitive forms. For primitive forms this attribute is available via the form class.

typedef Form_data

The type of the data that is kept in primitive forms.

typedef Form_pack_format

Describes the possible form packing types. Supported packing formats are:

FORM_PACK_LIGHT—Light packing, used mainly for inter process communication between processes on the same machine. It is more efficient then other types of packing. Light packing consists of serializing the given form, but it does not translates the form data into machine independent format.

FORM_PACK_XDR—Serialize the form while translating the data into a machine-independent format. The machine-independent format used is Sun's XDR.

5.9. Procedural Interface to the Forms-class Package

The formclass package is responsible for creating and manipulating forms classes. The forms package uses these descriptions to create and manipulate instances of given form classes. An instance of a form class is called, not surprisingly, a form.

Formclass_create

Create a class handle according to the given argument list. If the attribute CLASS_CFILE is specified it should be followed by a cfile handle and a path_name. In that case formclass_create locates the specification for the form class in the specified configuration file. The specification is compiled into an internal data structure for use by the forms package.

Formclass_create returns a pointer to the class data structure. If there are syntax errors in the class description file the function sets the error message flag and returns NULL.

Formclass_destroy

The class description specified by the given class handle is dismantled and the storage is reclaimed. If there are live instances of the class then the class is not destroyed and the error value is updated to "FORMCLASS_ERR_NON_ZERO_INSTANCES_NUM".

Formclass_get

Given a handle to a form class and an attribute of a class (e.g. one of the attributes of the type Formclass_attr) Formclass_get returns the value of the attribute. Given an unknown attribute the error value is updated to "FORMCLASS_ERR_UNKNOWN_ATTRIBUTE".

Formclass_get_handle_by_id

Given a forms-class id, formclass_get_handle_by_id returns the handle to the appropriate class descriptor. If the requested class id is not known Formclass_get_handle_by_id returns NULL, but does not set the error flag.

Formclass_get_handle_by_name

Given a forms-class name, Formclass_get_handle_by_name returns the handle to the appropriate class descriptor. If the requested class name is not known formclass_get_handle_by_name returns NULL, but does not set the error flag.

Formclass_get_field_id

Given a handle to a form class and a field name this function returns the form id, which is used for a fast access to the form. If the given field name does not exist, it updated the error variable to FORMCLASS_ERR_UNKNOWN_FIELD_NAME.

Formclass_field_get

Returns the value of the requested field's attribute. If an illegal id is given this procedure, it updated the error variable to FORMCLASS_ERR_UNKNOWN_FIELD_ID.

Formclass_iserr

Returns TRUE if Formclass error flag is turned on, FALSE otherwise.

Formclass_errno

Returns the formclass error number. If no error, it returns FORMCLASS_OK. For a list of supported error values see the file formclass.-h.

5.10. The Forms Package

Form_create

Generate a form (i.e., an instance) of the form class specified by the parameter and return a handle to the created form.

Form_destroy

The specified form is "destroyed" by reclaiming its storage.

Form_get

Given a handle to a form and a valid attribute (e.g. one of the values of the enumerated type Form_attr) Form_get returns the value of the requested attribute.

The attribute FORM_DATA_SIZE is supported only for variable size forms. For fixed size form this information is kept in the class description and is not kept with each form instance. Requiring the FORM_DATA_SIZE from a fixed length form will set the error flag to FORM_ERR_NO_SIZE_ATTR_FOR_FIXED_LENGTH_FORM.

The attribute FORM_FIELDS_NUM is supported only for constructed forms. Requiring the FORM_FIELDS_NUM from a primitive form will set the error flag to FORM_ERR_ILLEGAL_ATTR_FOR_PRIMITIVE_FORM.

If the given attribute is not known the error flag is set to FORM_ERR_UNKNOWN_ATTR. When the error flag is set differently, then FORM_OK Form_get returns NULL.

FORM_set_data

Sets the form's data value to the given value. The given data argument is assumed to be a pointer to the data, e.g., a pointer to an integer or a pointer to a date structure. However for strings we expect a pointer to a character.

Note that we use Copy semantics for assignments.

Form_get_data

Return a pointer to form's data portion. In case of a form of a primitive class the data is the an actual value of the form's type. If the form is not of a primitive class, i.e., it has a non zero number of fields, then the form's value is a handle to the form's sequence of fields.
Warning, the returned handle points to the form's data structure and should not be altered. If the returned value is to be modified is should be copied to a private memory.

Form_set_data_pointer

Given a variable size form, Form_set_data_pointer assigns the given pointer to the points to the forms data portion. Form_set_data_pointer provide a copy operation with pointer semantics, as opposed to copy semantics.

If the given form is a fixed length form then the error flag is set to FORM_ERR_CANT_ASSIGN_POINTER_TO_FIXED_FORM.

Form_field_set_data

This is a convenient routine that is equal to calling Form_field_get and then using the retrieved form to call Form_set_data. More precisely: form_field_set_data(form, field_id, form_data, size)==form_set_data(form_field_get(form, field_id), form_data, size), plus some error checking.

Form_field_get_data

Note that we use Copy semantics for assignments.

This is a convenient routine that is equal to calling Form_field_get and then using the retrieved form to call Form_get_data. More precisely: form_field_get_data(form, field_id, form_data, size)==form_get_data(form_field_get(form, field_id), form_data, size) plus some error checking.

Warning, the returned handle points to the form's data structure and should not be altered. If the returned value is to be modified is should be copied to a private memory.

form_field_id_first

Form_field_id_first sets the given field_id to identify the first direct field of the given form handle.

Note that the memory for the given field_id should be allocated (and freed) by the clients of the forms package and not by the forms package.

form_field_id_next

Form_field_id_first sets the given field_id to identify the next direct field of the given form handle. Calls to Form_field_id_next must be preceded with a call to Form_field_id_first.

Note that the memory for the given field_id should be allocated (and freed) by the clients of the forms package and not by the forms package.

Form_field_set

Sets the given form or form sequence as the given form field value. Note that we use Copy semantics for assignments.

When a nonexistent field id is given then the error flag is set to FORM_ERR_ILLEGAL_ID.

Form_field_get

Return's handle to the value of the requested field. The returned value is either a handle to a form or to a form sequence.

Warning, the returned handle points to the form's data structure and should not be altered. If the returned value is to be modified is should be copied to a private memory, using the Form_copy function.

When a nonexistent field id is given, then the error flag is set to FORM_ERR_ILLEGAL_ID and Form_field_get returns NULL.

Form_field_append

Form_field_append appends the given, append_form argument to the end of the base_form form sequence. Form_field_append returns the id of the appended new field.

Form_field_delete

Form_field_delete deletes the given field from the given base_form.

If a non existing field id is given then the error flag is set to FORM_ERR_ILLEGAL_ID and Form_field_delete returns NULL.

Form_pack

Form_pack returns a pointer to a byte stream that contains the packed form, packed according to the requested format and type.

If the required packed type is FORM_PACK_LIGHT then Form_pack serializes the form, but the forms data is not translated to a machine-independent representation. Hence a lightly packaged form is suitable to transmit between processes on the same machine.

If the required packed type is FORM_PACK_XDR then Form_pack serializes the form and also translates the form representation to a machine-independent representation, which is Sun's XDR. Hence form packed by an XDR format are suitable for transmitting on a network across machine boundaries.

Formclass.h. are implemented as forms, hence Form_pack can be used to pack form classes as well as forms.

Form_unpack

Given an external representation of the form, create a form instance according to the given class and unpack the external representation into the instance.

Form classes are implemented as forms, hence Form_unpack can be used to unpack form classes as well as forms.

Form_copy

Copy the values of the source form into the destination form. If the forms are of different classes no copying is performed and the error value is updated to FORM_ERR_ILLEGAL_CLASS.

Form classes are implemented as forms, hence Form_copy can be used to copy form classes as well as forms.

Form_show

Return an ASCLL string containing the list of field names and associated values for indicated fields. The string is suitable for displaying on a terminal or printing (e.g., it will contain new-line characters). The returned string is allocated by the function and need to be freed by the user. (This is function is very useful in debugging.)

Form classes are implemented as forms, hence Form_show can be used to print form classes as well as forms.

Form_iserr

Returns TRUE if the error flag is set, FALSE otherwise.

Form_errno

Returns the formclass error number. If no error, it returns FORMCLASS_OK. The possible error values are defined in the file forms.h.

GLOSSARY

There follows a list of definitions of some of the words and phrases used to describe the TIB® software.

Access Procedure: a broader term than service discipline or service protocol because it encompasses more than a communications protocol to access data from a particular server, service, application. It includes any procedure by which the information requested on a particular subject may be accessed. For example, if the subject request is "Please give me the time of date", the access procedure to which this request is mapped on the service layer could be a call to the operating system on the computer of the user that initiated the request. An access procedure could also involve a call to a utility program.

Application: A software program that runs on a computer other than the operating system programs.

Architectural Decoupling: A property of a system using the teachings of the TIB® software. This property is inherently provided by the function of the information layer in performing subject-based addressing services in mapping subjects to services and service disciplines through which information on these subjects may be obtained. Subject-based addressing eliminates the need for the data consuming processes to know the network architecture and where on the network data on a particular subject may be found.

Attribute of a Form Class: A property of form class such as whether the class is primitive or constructed. Size is another attribute.

Class: A definition of a group of forms wherein all forms in the class have the same format and the same semantics.

Class/Class Descriptor/Class Definition: A definition of the structure and organization of a particular group of data records or "forms" all of which have the same internal representation, the same organization and the same semantic information. A class descriptor is a data record or "object" in memory that stores the data which defines all these parameters of the class definition. The Class is the name of the group of forms and the Class Definition is the information about the group's common characteristics. Classes can be either primitive or constructed. A primitive class contains a class name that uniquely identifies the class (this name has associated with it a class number or class_id) and a specification of the representation of a single data value. The specification of the representation uses well known primitives that the host computer and client applications understand such as string_20 ASCII, floating point, integer, string_20 EBCDIC etc. A constructed class definition includes a unique name and defines by name and content multiple fields that are found in this kind of form. The class definition specifies the organization and semantics or the form by specifying field names. The field names give meaning to the fields. Each field is specified by giving a field name and the form class of its data since each field is itself a form. A field can be a list of forms of the same class instead of a single form. A constructed class definition contains no actual data although a class descriptor does in the form of data that defines the organization and semantics of this kind of form. All actual data that define instances of forms is stored in forms of primitive classes and the type of data stored in primitive classes is specified in the class definition of the primitive class. For example, the primitive class named "Age" has one field of type integer_3 which is defined in the class definition for the age class of forms. Instances of forms of this class contain 3 digit integer values.

Class Data Structure: All the data stored in a class manager regarding a particular class. The class descriptor is the most important part of this data structure, but there may be more information also.

Class Definition: The specification of a form class.

Class Descriptor: A memory object which stores the form-class definition. In the class manager, it is stored as a form. On disk, it is stored as an ASCII string. Basically, it is a particular representation or format for a class definition. It can be an ASCII file or a form type of representation. When the class manager does not have a class descriptor it needs, it asks the foreign application that created the class definition for the class descriptor. It then receives a class descriptor in the format of a form as generated by the foreign application. Alternatively, the class manager searches a file or files identified to it by the application requesting the semantic-dependent operation or identified in records maintained by the class manager. The class definitions stored in these files are in ASCII text format. The class manager then converts the ASCII text so found to a class descriptor in the format of a native form by parsing the ASCII text into the various field names and specifications for the contents of each field.

Client Application: a data consuming or data publishing process, i.e., a computer program which is running, other than an operating system program that is linked to the communication interface according to the teachings of the TIB® software.

Computer Network: A data pathway between multiple computers by hardware connection such as a local or wide area network or between multiple processes running on the same computer through facilities provided by the operating system or other software programs and/or shared memory including a Unix pipe between processes.

Configuration Decoupling: The property of a computer system/network implementing the teachings of the TIB® software which is inherently provided by the distributed communication layer. This layer, by encapsulating the detailed protocols of how to set up and destroy communication links on a particular configuration for a computer network, frees client processes, whether data publishers or data consumers from the need to know these details.

Configuration File: A file that stores data that describes the properties and attributes or parameters of the various software components, records and forms in use.

Constructed Field: A field which contains another form or data record.

Consumer: a client or consumer application or end user which is requesting data.

Data Aggregate: a data structure comprised of a data item comprising one or more fields and metadata as defined below. Data aggregates are alternatively referred to as forms or self-describing data objects elsewhere herein.

Data Distribution Decoupling: The function of the communication interface software according to the teachings of the TIB ® software which frees client applications of the necessity to know and provide the network addresses for servers providing desired services.

Decoupling: Freeing a process, software module or application from the need to know the communication protocols, data formats and locations of all other processes, computers and networks with which data is to be interchanged.

Distributed Communication Layer: the portion of the apparatus and method according to the teachings of the TIB ® software which maps the access procedure identified by the service layer to a particular network or transparent layer protocol engine and sets up the required communication channel to the identified service using the selected network protocol engine.

Field: One component in an instance of a form which may have one or more components each named differently and each meaning a different thing. Fields are "primitive" if they contain actual data and are "constructed" if they contain other forms, i.e., groupings of other fields. A data record or form which has at least one field which contains another form is said to be "nested". The second form recorded in the constructed field of a first form has its own fields which may also be primitive or constructed. Thus, infinitely complex layers of nesting may occur.

Foreign: A computer or software process which uses a different format of data record than the format data record of another computer or software process.

Form: A data record or data object which is self-describing in its structure by virtue of inclusion of fields containing class descriptor numbers which correspond to class descriptors, or class definitions. These class descriptors describe a class of form the instances of which all have the same internal representation, the same organization and the same semantic information. This means that all instances, i.e., occurrences, of forms of this class have the same number of fields of the same name and the data in corresponding fields have the same representation and each corresponding field means the same thing. Forms can be either primitive or constructed. A form is primitive if it stores only a single unit of data. A form is constructed if it has multiple internal components called fields. Each field is itself a form which may be either primitive or constructed. Each field may store data or the class_id, i.e., the class number, of another form.

Format Operation: An operation to convert a form from one format to another format.

Format or Type: The data representation and data organization of a structural data record, i.e., form.

Handle: A pointer to an object, record, file, class descriptor, form etc. This pointer essentially defines an access path to the object. Absolute, relative and offset addresses are examples of handles.

ID: A unique identifier for a form, record, class, memory object etc. The class numbers assigned the classes in this patent specification are examples of ID's.

Information Layer: the portions of the apparatus and method according to the teachings of the TIB ® software which performs subject based addressing by mapping information requests on particular subjects to the names of services that supply information on the requested subject and the service disciplines used to communicate with these services.

Interface: A library of software programs or modules which can be invoked by an application or another module of the interface which provide support functions for carrying out some task. In the case of the TIB ® software at hand, the communication interface provides a library of programs which implement the desired decoupling between foreign processes and computers to allow simplified programming of applications for exchanging data with foreign processes and computers.

Interface Card: The electronic circuit that makes a physical connection to the network at a node and is driven by transparent layer protocol programs in the operating system and network and data-link protocol programs on the interface card to send and receive data on the network.

Metadata: data within a data aggregate which describes one or more of the following things about one or more data items in the data aggregate: the organization or format of the data item(s); the representation or type of the data item(s); and/or the element or field names for the data elements or fields making up the data item within the data aggregate.

Native Format/Form: The format of a form or the form structure native to an application and its host computer.

Nested: A data structure comprised of data records having multiple fields each of which may contain other data records themselves containing multiple fields.

Network Protocol Engine: a software and hardware combination that provides a facility whereby communication may be performed over a network using a particular protocol.

Node: Any computer, server or terminal coupled to the computer network.

Primitive Field: A field of a form or data record which stores actual data.

Process: An instance of a software program or module in execution on a computer.

Semantic-Dependent Operation: An operation requiring access to at least the semantic information of the class definition for a particular form to supply data from that form to some requesting process.

Semantic Information: With respect to forms, the names and meanings of the various fields in a form.

Server: A computer running a data producer process to do something such as supply files stored in bulk storage or raw data from an information source such as Telerate to a requesting process even if the process is running on the same computer which is running the data producer process.

Server Process: An application process that supplies the functions of data specified by a particular service, such as Telerate, Dow Jones News Service, etc.

Service: A meaningful set of functions or data usually in the form of a process running on a server which can be exported for use by client applications. In other words, a service is a general class of applications which do a particular thing, e.g., applications supplying Dow Jones News information. Quotron data feed or a trade ticket router. An application will typically export only one service, although it can export many different services.

Service Discipline or Service Protocol: A program or software module implementing a communication protocol for communication with a particular service and including routines by which to select one of several servers that supplies a service in addition to protocols for communicating with the service and advising the communication layer which server was selected and requesting that a communication link be set up.

Service Access Protocol: A subset of the associated service discipline that encapsulates a communication protocol for communicating with a service.

Service Instance: A process running on a particular computer and which is capable of providing the specified service (also sometimes called a server process). For a given service, several service instances may be concurrently providing the service so as to improve performance or to provide fault tolerance. The distributed communication component of the TIB ® communication software implements "fault-tolerant" communication by providing automatic switchover from a failed service instance to an operational one providing the same service.

Service Layer: the portion of apparatus and method according to the teachings of the TIB ® software that maps data received from the information layer to the access procedure to be used to access the service or other source for the requested information to provide service decoupling.

Service Decoupling: The function of the service layer of the communication interface software according to the teachings of the TIB ® software which frees client applications of the necessity to know and be able to implement the particular communication protocols necessary to access data from or otherwise communicate with services which supply data on a particular subject.

Service Record: A record containing fields describing the important characteristics of an application providing the specified service.

Subject Domain: A set of subject categories (see also subject space).

Subject Space: A hierarchical set of subject categories.

Subscribe Request: A request for data regarding a particular subject which does not specify the source server or servers, process or processes or the location of same from which the data regarding this subject may be obtained.

Transport Layer: A layer of the standard ISO model for networks between computers to which the communication interface of the TIB ® software is linked.

Transport Protocol: The particular communication protocol or discipline implemented on a particular network or group of networks coupled by gateways or other inter-network routing.

AUTOMATIC FORMATTING AND DISPLAY OF DATA USING STYLE MAPS AND METADATA

Referring to FIGS. 44, 45, 46 and 47A and 47B, there are shown flow charts representing the major processing steps in using composition commands, style maps and metadata to automatically control a process of selecting and formatting for display particular data components of a self-describing data object and to control and carry out the process of displaying the selected, formatted data components. This code is included within the scope of claim 46 (or whatever the final claim number is if the claims are renumbered when this application is printed as a patent).

The basic process described in the flow charts to be described below and embodied in the source code appendix attached hereto is generally to use style maps associated with every display object and the metadata stored within every self-describing data object to control a selection, formatting and display process. Each self-describing data object is an aggregate comprised of one or more items of fixed and/or real time data (data which can change over time) and metadata which describes one or more of the following things about the data of the self-describing data object: the organization or format of the data in the fields of the self-describing data objects; the representation or type of the data in the data fields; and/or the element or field names for the data elements or fields of the self-describing data object. The style maps are essentially filter specifications which define which of the multiple fields of a multi-field, self-describing data object to select for display. The process controlled by the combination of style map and metadata is a process of selecting only user designated items to be displayed per the style map associated with the display object defining where and how data from a self-describing data object is to be displayed and for automatically converting the selected data items from certain fields of a self-describing data object to a proper format for display using the metadata of the self-describing data object aggregate as a pointer to the proper conversion/formatting software routine and for displaying the converted data. This process happens every time there is a change in the style map name, and every time a new self-describing data object arrives carrying an update to the value of some item of data displayed on the "living document" for which there is an open subscription.

The first step in this process is represented by block 900 where a composition command is issued to create a display object such as a quote object, a ticker etc. While the discussion herein assumes that the display object being created is a quote object, the process described herein with reference to FIGS. 44, 45, 46 and 47A and 47B is applicable to any display object displaying real time data. The composition command created in the process represented by block 900 specifies the type of display object to be displayed, the subject of the subscription to real time data represented by the display object and the name or ID of a style map which specifies the format and filtering to apply to the self-describing data objects which will be received as a result of entry of the subscription by creation of the display object. These self-describing data objects which will be received after the subscription is entered represent updates to the value of the real time data specified by the subject. In the hypothetical example of block 900, the type of display object being created is a quote object and the subject is the current price for an equity stock having symbol "xxx". The style map name identifying the style map filter which controls the display of this data is "y". The style map "y" will identify the subset of the total number of fields within the self-describing data objects for stock "xxx" which are to be displayed.

The self-describing data objects which arrive bearing the desired data on stock "xxx" are aggregates of data which include a number of fields of data on the requested subject plus metadata which specify one or more of the following things about the data on the subject within the self-describing data object: the organization or format, the data representation or type and/or the element or field names of the data fields which make up the data aggregate.

Every quote object includes in its data structure in memory the following information: the symbol, the stylemap name, a pointer to the received data form whose data is to be displayed, and a pointer to the stylemap associated with the given stylemap name.

The following steps initialize the quote object: block 902 represents the process of setting the newly created quote object's symbol to the specified symbol "xxx"; block 904 represents the process of setting the stylemap name to the specified name "y"; block 906 represents the process of setting the initial value of the received data form pointer to "Null", indicating that no data form has yet been received.

Step 908 represents the process of initiating a subscription to data for stock "xxx" with whatever communication program which is used to implement the subscription paradigm. Step 910 looks up the stylemap pointer using the stylemap name "y" recorded in Step 904.

Step 912 causes the screen to display the "background" of the quote, i.e., its visual appearance minus its real-time content, such as its visual attributes. These visual attributes include such things as location, size, border and color. At this point, the quote object has been created, initialized, and displayed (less the real-time data), and processing of the composition command is done.

Figure 45:
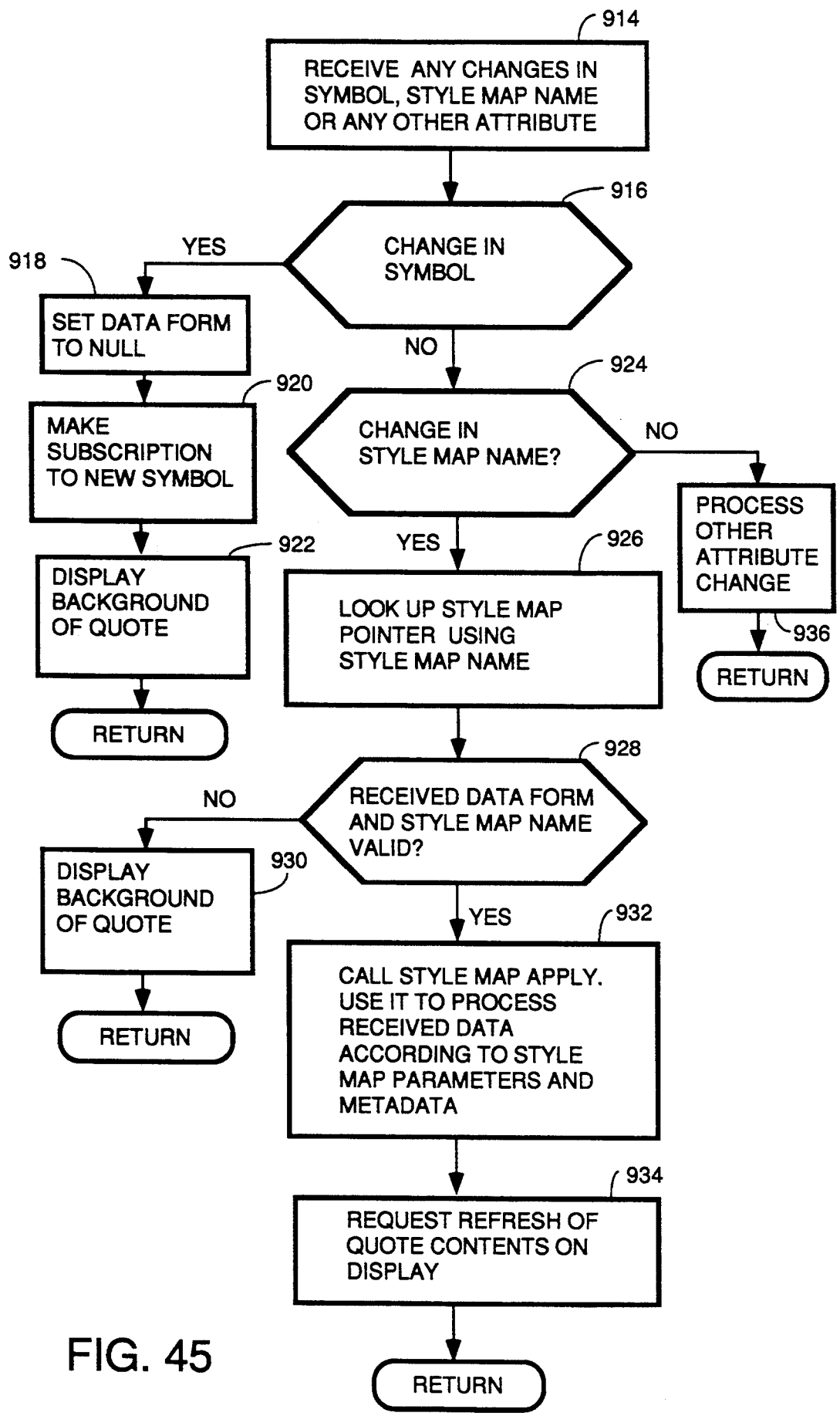
FIG. 45 represents the process of handling changes to attributes of the quote object, such as symbol, stylemap name, or other attributes such as visual attributes.

FIG. 45 represents the process of handling changes to attributes of the quote object, such as symbol, stylemap name, or other attributes such as visual attributes. The change request is received in Step 914. In Step 916, if the change request is a change of symbol, i.e., some symbol other than stock "xxx", processing branches to step 918 which sets the current value of the received data form pointer to "Null", indicating that any previously received data form is no longer valid.

Then step 920 cancels the subscription to the previous symbol "xxx" (subject), and makes a subscription to the new symbol (subject).

Step 922 displays the background of the quote, thus changing the visual appearance of the displayed quote object so as to have real-time content associated with any prior received data form thereby preventing invalid data from being displayed.

Referring again to the test of step 916, if the change request was not a change in symbol, the test of step 924 is performed to determine if the change is a change of stylemap name. If it is, processing branches to step 926.

Step 926 locates the stylemap pointer associated with the new stylemap name or ID and stores the pointer so retrieved into the data structure associated with the quote object.

Step 928 is a test which checks if the quote object has received and stored a data form pointer, and whether the stylemap pointer to the new style map is valid (i.e., the stylemap name was one for which a stylemap exists). If these conditions are not both met, then step 930 repaints the background display of the quote object, to clear any prior invalid real-time content from the screen. Thereafter, processing returns to the calling routine. Typically, the MarketSheet software according to the TIB ® software has a main loop and the processes symbolized by FIGS. 44 through 47A and 47B represent subroutines. As such the blocks labelled "return" in these figures represent returns to the place in the main loop where processing left off when the particular subroutine in question was called.

If the conditions in step 928 are both met, then in step 932 the filtration specified by the style map identified in the change in stylemap name received in step 926 must be performed on the stored received data form. Thereafter, the selected data remaining after the filtration process must be displayed in the manner specified by the new style map and any data type conversions between the data type of the incoming data and the data type desired for display must be performed. These conversions are performed with the aid of the metadata taken from the newly arrived data aggregate, i.e., form. Block 932 represents the process of calling the subroutine that does this filtration and conversion processing. Block 932 actually represents a subroutine call to the subroutine "Style Map Apply" which is detailed in the flow chart of FIGS. 47A and 47B. In calling the "Style Map Apply" routine, a pointer to the newly arrived data aggregate and the style map ID of the style map selected by the user is passed to the "Style Map Apply" routine as arguments in the subroutine call.

Essentially what happens in the processing of "Style Map Apply" is that the desired fields of the incoming data aggregate are selected in accordance with the filtration specification pointed to by the new style map ID and undesired fields are filtered out. Then any necessary data type conversion or other processing necessary to get the selected data fields ready for display are performed using the metadata as a pointer to the necessary conversion routine.

Finally, a refresh of the display is requested to repaint the display in step 934 which is performed immediately after return from the "Style Map Apply" subroutine to be described in more detail below.

Back at Step 924, if the change request is not a change of stylemap name (i.e., it is another parameter, typically a visual attribute), then step 936 is performed representing the appropriate processing to carry out whatever change was requested. Thereafter, processing returns to the main loop.

Figure 46:
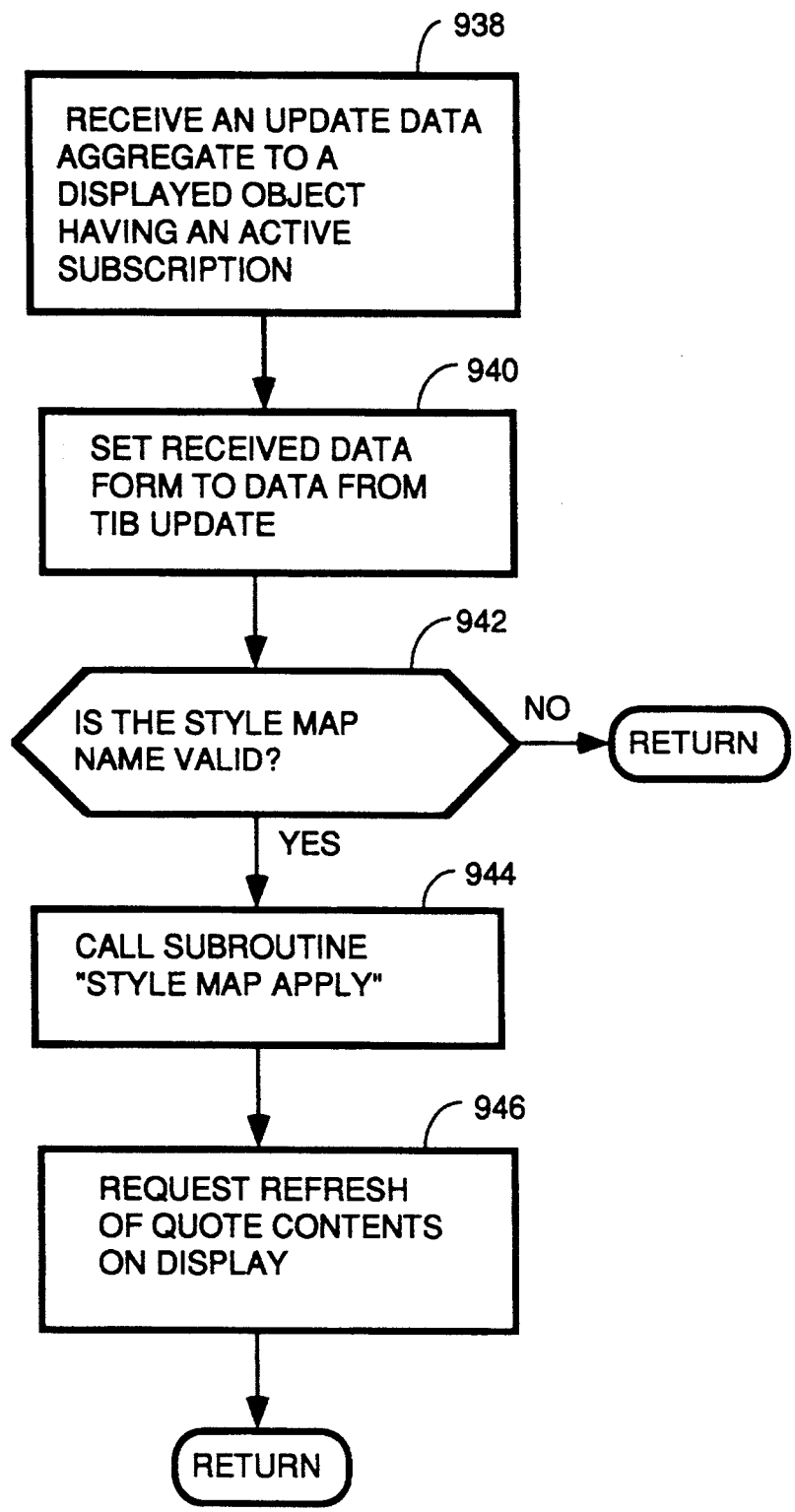
In FIG. 46, there is shown the details of processing to repaint the display using a style map and metadata when an update data aggregate is received on an open subscription.

Referring to the flow chart of FIG. 46, there is shown the details of processing to repaint the display using a style map and metadata when an update data aggregate is received on an open subscription. Block 938 represents the process of receiving an update data aggregate or self-describing data object on an active subscription. An active subscription is represented to the user as a displayed object within his or her "living document", e.g., a quote object or ticker object. The update may be the latest price of the particular stock, bond etc. or some other real time aspect of the subject being monitored through the particular display object. Block 938 generically represents the processing by whatever communication software and other software that is being used to obtain the real time data that is being monitored and forward the data so obtained to the MARKETSHEET ® software that implements the "living document" paradigm.

The processing of Block 940 represents the process of storing the pointer to the data aggregate received in the update in the data structure associated with the quote object being displayed.

The processing of block 942 represents a test to determine if the stylemap pointer associated with the quote object is valid. If the style map is not valid, the newly arrived data is not to be displayed, and processing is returned to whatever other process was being performed when the newly arrived data aggregate arrived and the subroutine of FIG. 46 was called as represented by block 941.

If the style map pointer associated with the quote object is valid, the subroutine "Style Map Apply" is called as symbolized by block 944. In this subroutine call, the style map pointer and a pointer to the storage location in memory of the newly arrived data aggregate are included as arguments. The "Style Map Apply" routine then processes the newly arrived data using the currently selected style map identified in the subroutine call and the metadata within the data aggregate and stores the appropriate characters in an output buffer for display.

The processing of block 946 represents the process of requesting a refresh or repaint of the display using the characters stored in the output buffer by the "Style Map Apply" subroutine. Thereafter processing returns to the calling routine.

Figure 47A:
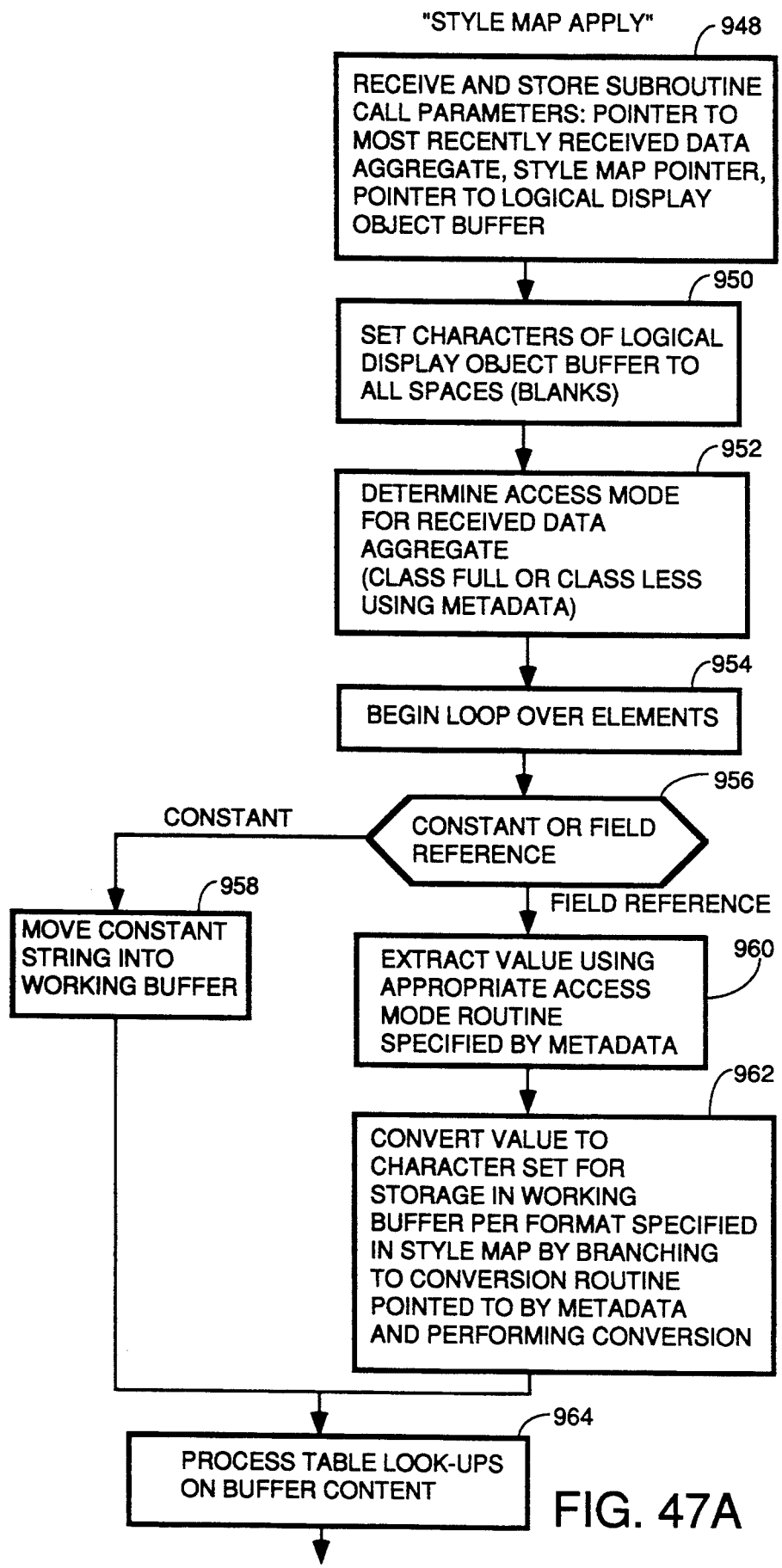
In FIGS. 47A and 47B, the details of the subroutine "Style Map Apply" are given.
Figure 47B:
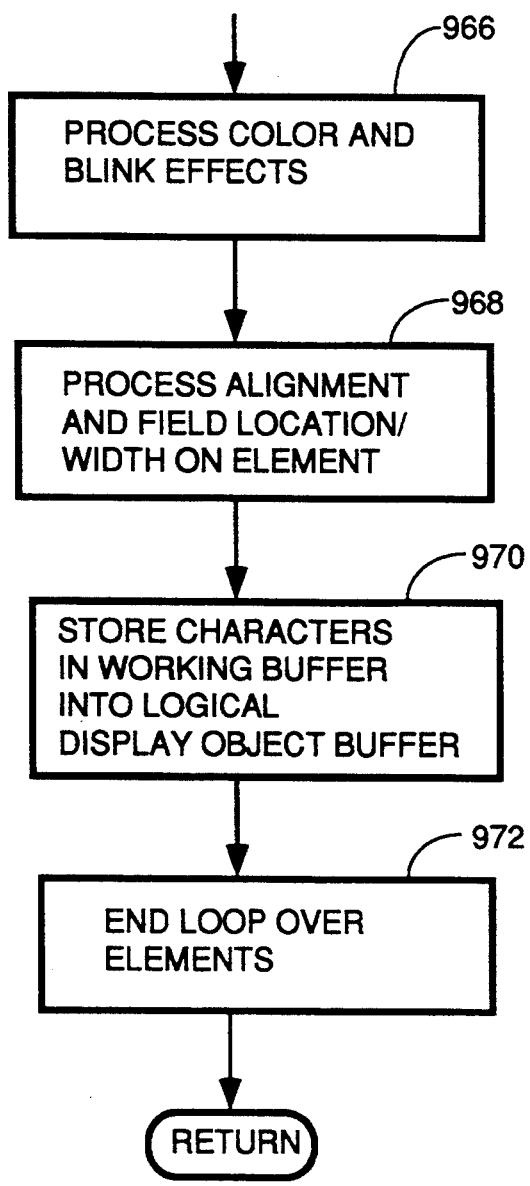

Referring to the flow chart of FIGS. 47A and 47B, the details of the subroutine "Style Map Apply" are given. Block 948 represents the process of receiving from the calling routine a pointer to the most recently received data aggregate, a style map pointer and a pointer to a "logical display object buffer". The logical display object buffer is a portion of memory designated for storage of the data to be displayed with the particular display object in question.

Step 950 represents the process of blanking out the contents of the "logical display object buffer" associated with this quote object by setting the characters to all spaces.

Step 952 determines the access mode for extracting information from the data aggregate, by determining if the metadata of the received data aggregate specifies that the data aggregate is "class-full" or "class-less" which are particular types of data aggregate organization peculiar to the TIB ® communication software. This step is needed if the software implementing the subscription paradigm provides data aggregates having these organizations and requires data extraction routines specific to each type of organization. If all incoming data aggregates can be processed using the same data extraction routines, then step 952 is not needed.

Step 954 begins a loop over the sequential elements of the style map. Each of these elements specifies the processing for one constant or field value to be placed onto the screen.

Step 956 branches according to whether the element being currently processed is a constant or a field reference. If the element is a request to display a constant, processing branches to step 958, which moves the characters of the constant string for the element into a working buffer. The working buffer is a scratchpad memory used temporarily to store results of processing before these results are stored in the logical display object buffer in block 970.

If the element being processed represents a request to display the value associated with a specified field name in the data aggregate, e.g., "display the contents of the 'price' field", then processing branches to step 960.

Step 960 represents the process of extracting from the data aggregate pointed to by the pointer received in the arguments of the subroutine call, the value associated with the field name in the element being processed. The extraction routine used in this step is selected based on the access mode determined in Step 952.

Step 962 represents the process of converting the value received by the extraction process of step 960 into a set of characters for storage in a working buffer This done according to the conversion routine indicated by the metadata and the formatting specifications indicated by the style map element being processed. For example, the metadata might indicate that the extracted value is a floating point number, and the style map element might indicate that for the number to be displayed in the display object being processed requires two decimal places of precision. Thus, the conversion routine chosen will be that which is appropriate for floating point to character conversion, and the number of decimal places, i.e., two, will be given as a parameter to this routine. Other examples would how to handle extracted values which are dates or integers.

At this point, the working buffer contains the characters resulting from the processing symbolized by the two branches taken from step 956 for stylemap elements which are either constants or field references. The following steps are common to both types of style map elements.

Step 964 represents the process of performing the first of three transformations on the characters in the working buffer. This step provides a facility to find strings in the buffer which match code translation table, and then replace those strings with their code translations. For instance, if a data publisher application used the codes U for up and and D for down, yet the desired output is + for up and − for down, a translation of U to + and D to − would be specified in the style map element and that table lookup conversion processing would be performed in step 964.

Step 966 represents the second transformation on the characters of the working buffer, which is to process colors, combinations of colors, or alternating colors in a timed blinking sequence. For instance, a style map element can, by its metadata, cause positive numbers to be displayed in green, while negative numbers are displayed in red. Similarly, numbers may be specified to be shown in blinking black and white during the first two seconds after they are initially displayed.

Step 968 represents the third translation on the characters of the working buffer. The effect of this translation is to specify where the characters are to be placed in the larger logical display object buffer, the number of characters (field width) to use of the logical display object buffer, and how the characters are to be aligned, i.e., left, center, or right within the field width.

Step 970 represents the movement of characters and their associated color information from working buffer into the logical display object buffer.

Step 972 ends the loop over elements in the style map.

After all elements have been processed, Style Map Apply returns to the calling routine.

What is claimed is:

1. An apparatus for transforming a blank display of a computer into an active document having one or more pages of user defined display showing at least the changing values of data the value of which may change over time, said display changing as the values of said data changes, comprising:
- a computer for storing and executing one or more programs, and having a display;
- at least one source of changeable data;
- a data path coupling said computer to said at least one source of changeable data;
- a communication program in execution on said computer for carrying out subject based addressing for receiving subscription requests specifying a subject on which data is desired and for mapping the subject of each said subscription request to the identity and/or location of one or more sources of data on that subject, and for automatically establishing at least one subscription communication path via said data path to at least one of said sources of data on each said subject such that the current value of said data on each said subject for which there is an active subscription and all updates thereto will be obtained and made available for display;
- a dispatcher program in execution on said computer and coupled to said communication program and to said input devices for receiving requests from a user via one or more of said input devices to display on said computer one or more items of said changeable data generated by said source of changeable data, said requests for data specified only by subject, and for generating and sending to said communication program a subscription request for each said subject thereby causing retrieval by said communication program on a subscription basis only said requested items of changeable data and all updates thereto via said data path, and for making said retrieved data and all changes thereto available for display; and
- a document composition program in execution on said computer and coupled at least to said dispatcher program and to said computer display for accepting composition commands entered by a user via said dispatcher program, said compositions commands defining the desired content and appearance on said display of said active document and for receiving from said dispatcher program said changeable data retrieved by said communication program and displaying said changeable data on said display at the location and in the manner specified by said user through said composition commands such that the displayed values virtually instantaneously reflect changes in the value of said changeable data as said values change over time.

2. The apparatus of claim 1 wherein said document composition program includes means for storing said active document as one or more data records in said computer, and upon receiving a command to redisplay said active document from user via said one or more input devices, for displaying the most current value of each item of changeable data previously specified by said user when said active document was composed immediately upon redisplaying said active document.

3. The apparatus of claim 1 further comprising means for storing as a document definition data defining the content, layout and format of each page of said active document excluding the actual values of said changeable data but including the user specification of which items of said changeable data are to be requested and which portions of said changeable data are to be displayed and how and where said portions are to be displayed, and for providing a facility whereby said active document definition may be recalled and displayed with the current values of the changeable data specified in said active document definition being automatically obtained by said communication program by renewal of all subscription requests and renewal of all subscriptions on subjects previously specified by the user and recorded in said active document definition.

4. The apparatus of claim 1 wherein said composition program comprises means for creating in response to said composition commands instances of different classes of active objects which display on a display either real-time, changeable data generated by said source of changeable data or fixed, alphanumeric data entered by the user via said one or more of said input devices, each said active object for displaying data in accordance with an associated style map which defines the portion of said data to be displayed and defining where and how said data is to be display, each said active object having an associated data object storing data for storing an internal computer data representation of one or more data fields which together all the possible data which is available for display on the subject which resulted in retrieval of data and creation of said active object, said style map including a human readable specification of which data fields are to be displayed and which specifies said user's choices regarding selected display characteristics, each said active object also having an associated:
- display object stored in said computer which encapsulates the data and executable instructions for said computer required to display the contents of the data object in the style specified by the user,
- event trigger stored in said computer specifying the conditions under which the user desires additional processing by said computer to occur on this particular active object, typical event triggers being alarm limits, and
- event script stored in said computer comprising a sequence of one or more commands to execute upon the occurrence of an event trigger.

5. An apparatus for creating a displayed image on a display in the form of a custom active document showing changes in real time data, said active document useful in visualizing events in a system characterized by data output by one or more sources of real time data the value of which can charge over time, said apparatus operating in a computing environment including said sources of real time data, a computer having said display and one or more input devices, and coupled to said sources of real time changeable data by a data path and communication software in execution on said computer, said communication software for accessing selected data generated by said sources of real time data using a subscription paradigm where for any item of said real time data for which a subscription has been requested, the current value of said selected items of said real time data and all updates thereto is obtained until the subscription is cancelled, said communication software for transmitting the current value of said selected item of real time data and all updates thereto to said computer until the subscription to the corresponding said item of real time data is cancelled, and said environment including one or more operating system programs in execution on said computer for controlling at least some of those aspects of the processing of at said computer normally controlled by operating system programs, said apparatus comprising:

one or more computer programs in execution on said computer for providing a facility whereby a user can compose from a blank computer display a dynamically changeable display image comprising a document having one or more pages where each page has a user defined composition, format and layout and has displayed thereon one or more user defined display objects some or all of which may display real time data from system displayed at user defined locations thereon, said one or more programs further comprising:

a real time data acquisition and composition program in execution on said computer and coupled to said communication software for receiving user requests to display one or more specific items of said real time data and for requesting said communication software to create a communication channel across said data path for each of said one or more items of specified items of real time data through which a stream of the user requested data may flow back to said acquisition and composition program for each specified item of said real time data, and for receiving said one or more streams of said changeable real time data and for displaying on said computer display one or more layout tool icons each of which may be invoked by said user to request and display in a user specified style one or more items of selected real time data so as to enable said user to compose said active document on said display, said acquisition and composition program for automatically converting said requests of items of said real time data specified by said user through invocation of said layout tool icons into one or more subscription requests to said communication software, and for continuously receiving as said stream of data associated with each said selected item of real time data the the current value thereof and all updates thereto until said subscription is cancelled, said current value of each requested item of real time data and updates thereto being displayed in each of one or more user specified areas of said active document displayed on said computer display, such that the format, style and content of said display of said active document on said computer display may be composed and altered by said user; and input means coupled to said one or more input devices and said communication software for receiving input events comprising user composition commands and values of selected items of said real time data for which subscriptions exist and dispatching these events to said real time data acquisition and composition program for use in updating said displayed image of said document.

6. The apparatus of claim 5 wherein said real time data acquisition and composition program includes means for displaying changes in real time data selected for display in said active document simultaneously while said layout tool icons are being used to compose and alter the image of said active document, said layout and composition process occurring at any time without interrupting the flow of updates for any said real time data currently displayed on said document, and wherein said acquisition and composition program includes first means for displaying on said computer display a layout tool which may be invoked by a user such that one or more areas of said displayed image of said active document may be programmed to show the most current value of one or more user defined items of real time data which have values which change over time as well as showing the the changing value(s) over time of said one or more user designated items of real time data.

7. The apparatus of claim 6 wherein said first means comprises means for displaying the most current value of said real time data and a user defined number of prior values of said real time data versus time as a graph.

8. The apparatus of claim 7 wherein said real time data acquisition and composition program further comprises alarm limit setting means coupled to said first means for displaying a tool which may be invoked by a user to display on any said graph up to two active trend line alarm limits, typically upper and lower limits against which the most current value of said changeable real time data depicted on each said user defined graph may be compared, and for comparing each new updated value received for an item of real time data to the corresponding trend line alarm limits for the corresponding graph, and if an alarm limit established by an active trend line is equalled or exceeded, for generating an alert signal.

9. The apparatus of claim 8 wherein said real time data acquisition and composition program further comprises script means for coupling a script of user defined commands to any said alarm limit such that when said alarm limit is equalled or exceeded, said user defined sequence of commands is automatically executed by said computer.

10. The apparatus of claim 7 wherein said first means includes means for scaling each axis of said graph separately.

11. The apparatus of claim 7 wherein said first means includes means for displaying the numeric values on each axis of said graph for any particular point on the graph representing the value of a selected item of real time data at a particular time for any particular point on said graph which has been selected.

12. The apparatus of claim 7 wherein said first means includes means for causing automatic rescaling of the time axis for any graph wherein one of the axes has been user defined to show time.

13. The apparatus of claim 7 wherein said first means includes means for displaying a tool whereby a user may graphically designate a trend line by defining any two points on the desired trend line.

14. The apparatus of claim 7 wherein said first means includes means for allowing a user to enlarge the displayed view of any portion designated by a user of any said graph.

15. The apparatus of claim 7 wherein said first means includes means for displaying as a graph at least two items of said real time data and for displaying the values of said two items of real time data against the same two axes.

16. The apparatus of claim 5 wherein said real time data acquisition and composition program includes second means for displaying a layout tool which may be invoked by a user such that one or more areas of said display image of said active document may be programmed to show only the most current value of one or more user defined items of real time data.

17. The apparatus of claim 5 wherein said real time data acquisition and composition program includes third means for displaying a layout tool which may be invoked by a user such that one or more areas of said active document being composed on said computer display may be programmed to display the dynamically changeable value or values of real time data contained in one or more user designated portions of one or more user designated pages of data from a user designated, page-oriented financial information service.

18. The apparatus of claim 5 wherein said real time data acquisition and composition program includes fourth means for displaying a layout tool which may be invoked by a user whereby a plurality of pages of said active document may be composed by said user on a computer display, each page having a user defined layout comprising any number of items of user defined text displayed at user defined locations and displayed in user defined style on each page, and the value or values of any number of user specified items of real time data displayed in user designated locations and displayed in user defined style thereon.

19. The apparatus of claim 5 wherein said real time data acquisition and composition program includes:
  alarm limit setting means for displaying a tool which may be invoked by a user so as to establish one or more alarm limits which are associated with one or more items of said real time data, and wherein said real time data includes updated values which arrive from time to time, each said alarm limit being compared with any incoming updated value of a corresponding item of real time data, and said alarm limit setting means also for setting an alert status when any one of said alarm limits is exceeded; and
  script means coupled to said alarm limit setting means for, upon detection of said an alert status for any particular alarm limit, causing one or more user defined sequences of events to occur.

20. The apparatus of claim 19 wherein said script means comprises means for recognizing and carrying out in any user designated sequence commands for at least some of the following functions:
  selection of active objects;
  editing selected active objects;
  moving and resizing of selected active objects;
  moving between pages of said dynamically changeable displayed image of said active document;
  editing a selected page of said dynamically changeable displayed image of said active document;
  causing audible signals, or for causing a command of another program such as an operating system program to be executed or for pausing a user designated amount of time; and
  controlling the display of the computing environment such as by displaying or not displaying the available tool icons for creating and editing said pages of said dynamically changeable displayed image of said active document or displaying or not displaying alignment aids for layout of said pages of said dynamically changeable image of said active document such as grid lines.

21. The apparatus of claim 20 wherein said script means further comprises means for providing a tool whereby a user may enter new commands which are available for execution during a user defined script of actions.

22. The apparatus of claim 19 wherein said script means includes means for selectively changing the format of said displayed image of said document when an alarm limit is exceeded.

23. The apparatus of claim 5 wherein said real time data acquisition and composition program further comprises fifth means for displaying a tool icon which may be invoked by a user to locate at one or more user defined locations on said user defined display image of said active document one or more quote active objects, each said quote active object for receiving and displaying the current price for a user designated financial issue at said designated location of said active document.

24. The apparatus of claim 5 wherein said real time data acquisition and composition program further comprises:
  sixth means for displaying a layout tool which may be invoked by the user to program one or more button active objects at user definable locations on said dynamically changeable display image of said document composed by said user, and
  further comprising seventh means coupled to one or more of said button active objects for causing to occur a specific user defined sequence of events associated with each button active object when the corresponding button active is selected.

25. The apparatus of claim 5 wherein said real time data acquisition and composition program includes means for creating an active object for each said user designated item of real time data displayed within said active document, each said active object having an associated list of properties and an associated list of operations which can be invoked by a user via said one or more input devices to change the values of various properties of said active object.

26. The apparatus of claim 25 wherein said computer in said environment has a memory and wherein each said active object is represented in said memory by a data record containing the values for each said property in said list of properties and a pointer to a library of programs for execution on said computer and which carry out the operations associated with said active object when invoked.

27. The apparatus of claim 26 wherein each said active object comprises:
  a data object record in said memory for storing the internal computer representation of a set of data items pertinent to a particular item displayed on said document;
  a style map record in said memory for storing style data specifying particular ones of the data items stored in said data object which are displayed and where these data items are displayed and the format of the display;
  screen rendering means for rendering information on said display;
  a display object means for storing a representation of the data from said data object record specified by said style map record and for sending said extracted data and one or more appropriate rendering commands based upon said style data to said screen rendering means such that said display is rendered with said data stored by said display object in accordance with said style data;
  means for storing user defined event trigger condition data specifying the conditions for data stored in said data object record under which said user desires further action to occur; and
  means coupled to said means for storing event trigger condition data, for storing one or more scripts of actions programmed by said user and associated with one or more events said actions of each script to be carried out by said computer in a sequence programmed by said user if a condition specified in the corresponding event trigger occurs.

28. The apparatus of claim 27 further comprising means for receiving data updates for a corresponding item of real time data, and for updating the corresponding real time data with its new the update value and storing the updated value in said display object means in accordance with said style data stored in said style map record, and for comparing any updated values for said real time data to any event trigger condition data stored in said means for storing event trigger condition data, and for displaying any special effects on said display according to said style data if any event trigger condition has been satisfied by an update to a corresponding item of real time data.

29. The apparatus of claim 5 further comprising means for displaying a tool which may be invoked by a user to display on said document table tool objects displaying useful reference information such as the names of commonly used pages of page oriented services or securities.

30. The apparatus of claim 5 wherein said real time data acquisition and composition program includes means for displaying a menu of universal commands which can be invoked by a user to edit or manipulate any pages or any active objects displayed on any page of said dynamically changeable displayed image of said document, and for displaying a pop-up menu of commands associated with any command selected by a user from said menu of universal commands.

31. The apparatus of claim 5 further comprising means for highlighting the display of data that has changed.

32. The apparatus of claim 5 further comprising means for displaying a text layout tool which may be invoked by a user such that one or more areas on said displayed image of said document, the positions of which may be selected by said user, may have displayed therein text information supplied by said user through one or more of said input devices.

33. The apparatus of claim 1 or 5 or 6 or 16 or 17 or 18 or 19 or 8 or 23 or 24 or 27 or 28 or 10 or 11 or 12 or 13 or 14 or 15 or 20 further comprising one or more other computers coupled to said data path, and publishing means in execution on said one or more computers and publishing changeable data organized in a page format, said composition program further comprising a page fragment tool means for displaying on said computer display a tool or icon which can be invoked by said user such that said user can cause to be displayed only a selectable portion of a particular page of said page format data by designating any portion of any page of said changeable page format data.

34. An apparatus for transforming a blank image on a computer display into an image of a dynamically changeable document having one or more pages the content, composition and style of each page being user selectable in real time, said document for display of one or more items of data the value(s) of which change over time, comprising:
  a collection of sources that output data items the value(s) of which change over time:
  a computer means having a display and one or more input devices and coupled to said collection of sources for selectively accessing said data sources and retrieving the current values of selected data items and receiving updates to the values of said data items:
  a program in execution on said computer means for receiving composition commands from a user regarding the desired content, composition and layout of each page in the display of said document defining the items of data to be displayed, and for automatically converting those composition commands into subscriptions for the value of any data item specified in said composition commands and all updates thereto, and for receiving any said requested data item and any updates thereto and displaying the value of said received data item on said computer display in the location and format specified by the user through said composition commands, and for continuing to update the displayed value of each item of displayed data until a command is received from said user indicating the user no longer wishes to view that particular item of data.

35. The apparatus of claim 34 wherein said program in execution includes a script processor program which causes said computer to execute a script comprised of a series of commands selected by said user when a predetermined trigger condition programmed by said user occurs.

36. The apparatus of claim 35 wherein said program in execution includes means for displaying icons which, when selected by said user using an input device, set a trigger condition and for linking the trigger condition associated with each said icon to a corresponding script such that when said icon is selected, said script of commands is executed by said computer.

37. The apparatus of claim 35 wherein said program in execution includes means for setting alarm limits for the value of any user selected item of real time data, the value of said alarm limit being selectable by said user, and for setting a predetermined trigger condition associated with each said alarm limit when said alarm limit is equalled or exceeded by the value of the corresponding item of real time data, and for selectively linking each said trigger condition to a corresponding script.

38. The apparatus of claim 34 wherein said program in execution includes means for displaying any user selected item of real time data as a graph showing at least the current value of said item of real time data plotted against any other variable such as time.

39. An apparatus for transforming a blank computer display into a display on a computer terminal of one or more items of data which can change over time in the form of electromagnetic signals which are displayed in a selectable format and location, comprising:
  one or more sources publishing said data which can change over time;
  a computer having a video display and an input device and coupled to said source of data by a data path;
  a data path coupling said computer to said source of said data;
  a communication program in execution on said computer for receiving subscription requests identifying a subject and for converting the subject of said request into a communication link to an appropriate source for data on the selected subject and for retrieving the current value of data published by said source on the selected subject and subsequent updates thereto;

a computer program in execution on said computer for driving said display and controlling said computer, said computer program comprising:

means for receiving requests for data on selected subjects and for issuing a subscription request for each said subject to said communication program; and composition means for receiving said requested data as electromagnetic signals from said communication program, and for virtually instantaneously displaying said data on said video display in a format and at a location which is selectable by said user through composition commands, and when updates to displayed data are received, for virtually instantaneously altering the display to display the new value of the data for which an update was received.

40. The apparatus of claim 39 wherein said composition means comprises tool means for receiving composition data defining the desired type and location of a visual manifestation of each item of said incoming, changeable, real time data, and for rendering said video in accordance with said composition data using the corresponding items of changeable real time data so as to create one or more pages of said changeable real time data displayed in the desired format, thereby allowing a user to create one or more displayed pages of said changeable real time data, each page of which may be composed by a user so as to have a particular theme or utility to said user.

41. The apparatus of claim 40 wherein said tool means of said composition means includes means for providing a facility to change the composition of any said displayed page of data at any time more or less information is desired about an item of data on said display or any time a new item of data is to be displayed, said tool means including means to issue a subscription request to obtain any new item of data as one or more electromagnetic signals.

42. The apparatus of claim 41 wherein said composition means is also for creating one or more pages of data which can change over time, each of said pages having the same appearance on said computer display when viewed by a user as said page had when composed on said computer display using said composition means.

43. The apparatus of claim 42 wherein said data path is a network or other data exchange media, and wherein said communication means carries out an appropriate communication protocol to obtain the requested data via said network or other data exchange media, and wherein said composition means receives said data as electromagnetic signals via said network or other data exchange media.

44. An apparatus for transforming a blank computer display of a computer into one or more pages of user defined video display showing the values of real time data from a source of real time changeable data, said real time data displayed on said computer display at one or more user defined locations on said computer display and in a user defined format, said computer having at least one input device and coupled to said source of real time changeable data by a data transfer path, comprising:

a dispatcher means in execution on said computer for receiving requests from a user via one or more of said input devices to display on said computer display one or more items of real time data generated by said source of real time data, and for causing said real time data to be retrieved via said data transfer path, and for making said retrieved real time data and all changes thereto available for display; and further comprising a document composition means in execution on said computer and coupled to said dispatcher means for accepting composition commands from a user which define the desired content and appearance on said computer display of a document which includes at least some of the real time data generated by said source, the displayed values of said displayed real time data changing as changes to items of real time data at said source occur, said document comprising one or more pages, each page comprised of an image on said display the data contentl layout and format of each said image being defined by said user through entry of said composition commands via one or more of said input devices, the content of some or all of said pages including user defined items of static data and/or selected items of said changeable real time data, said user specifying by entry of one or more composition commands which items of real time data are to be displayed, and what portion of said real time data to display if less than all portions of an item of real time data is to be displayed, and where and how said selected item or items of real time data is to be displayed, and for causing said dispatcher means to request and obtain any item of said real time data specified in any composition command and for receiving said real time data from said dispatcher program and displaying said data at the location and in the manner specified by said user through said composition commands, and for continuing to receive and display said real time data and updates thereto even while processing receipt of new composition commands; and means for storing the collection of said composition commands received by said document composition means as a document definition and for making said document definition available to be re-opened and displayed, and, upon re-opening of said document definition, for automatically causing said dispatcher program to obtain the current values for all the items of real time data specified by said composition commands and for displaying said current values in accordance with said composition commands stored in said document definition.

45. An apparatus for transforming a blank image on a computer display into an image of a dynamically changeable document having one or more pages the content, composition and style of each page being user selectable in real time, said document for display of one or more items of data the value(s) of which change over time, comprising:

a collection of data sources which output items of data the value(s) of which change over time;

a computer having a display and one or more input devices and coupled so as to be able to access said data sources and receive said data items output thereby and updates to the values of said data items;

a program in execution on said computer for receiving, at any time, composition commands from a user regarding the desired content, composition and layout of each page in the display of said document defining the items of data to be displayed, and for automatically converting those composition commands into requests for the value of any data item specified in said composition commands, and for receiving, at any time, any said requested data item and any updates thereto and displaying the value of said received data item on said computer display in the location and format specified by the user through said composition commands, and for continuing, at any time, to update the displayed value of each item of displayed data until a command is received from said user indicating the user no longer wishes to view that particular item of data.

46. An apparatus for transforming a blank image on a computer display into an image of a dynamically changeable document having one or more pages the content, composition and style of each page being user selectable in real time, said document for display of one or more items of data the value(s) of which change over time, comprising:

- a collection of data sources for outputting data items, each of said data items comprised of one or more data components the value(s) of which can change over time, at least some of said data items being self-describing in that each data item is included within a data aggregate which is comprised of said data item and metadata which describes one or more of the following things about the data item: the organization or format, representation or type, or element or field names for the data elements or fields making up said data item;

- a computer having a display and one or more input devices and in coupled so as to be able to access said data sources and having a communication program in execution thereon to access said data sources and obtain the current values of specified data items and to receive updates to the values of said specified data items;

- a program in execution on said computer for storing a plurality of style maps each of which defines a particular style of displaying particular types of data items, and for receiving composition commands from a user regarding the desired content, composition and layout of each page in the display of said document defining the item(s) of data to be displayed, and for automatically converting those composition commands into requests to said communication program to obtain the value(s) of all data item(s) specified in said composition commands, and for receiving the value(s) of said specified data item(s) and any updates thereto and displaying the value(s) of said received data item on said computer display in the location and format specified by the user through said composition commands, and for continuing to update the displayed value of each item of displayed data until a command is received from said user indicating the user no longer wishes to view that particular item of data, and for using said composition commands as a specification for selection of one or more style maps controlling the display style of one or more corresponding items of data, and for using said style map corresponding to each item of data selected by said user for display and the metadata from the corresponding data aggregates containing said selected data item(s) to control a process of selecting and formatting for display particular data components from the corresponding data aggregate(s) containing the selected data item(s) and to control and carry out the process of displaying said selected, formatted data components on said computer display.

* * * * *